(12) United States Patent
Romar et al.

(10) Patent No.: US 12,490,690 B2
(45) Date of Patent: Dec. 9, 2025

(54) METHOD AND SYSTEM FOR REMOTE OR AUTONOMOUS HOLDING A TREE TRUNK

(71) Applicant: AIRFORESTRY AB, Uppsala (SE)

(72) Inventors: Markus Romar, Uppsala (SE); Olle Gelin, Alunda (SE); Mauritz Andersson, Uppsala (SE)

(73) Assignee: AIRFORESTRY AB, Uppsala (SE)

( * ) Notice: Subject to any disclaimer, the term of this patent is extended or adjusted under 35 U.S.C. 154(b) by 423 days.

(21) Appl. No.: 17/920,895

(22) PCT Filed: May 27, 2021

(86) PCT No.: PCT/EP2021/064297
§ 371 (c)(1),
(2) Date: Oct. 24, 2022

(87) PCT Pub. No.: WO2021/239921
PCT Pub. Date: Dec. 2, 2021

(65) Prior Publication Data
US 2023/0166875 A1 Jun. 1, 2023

(30) Foreign Application Priority Data

May 27, 2020 (SE) .................................... 2050611-9
Nov. 16, 2020 (SE) .................................... 2051335-4
(Continued)

(51) Int. Cl.
*A01G 23/00* (2006.01)
*A01G 23/08* (2006.01)
(Continued)

(52) U.S. Cl.
CPC ........... *A01G 23/003* (2013.01); *A01G 23/08* (2013.01); *A01G 23/083* (2013.01);
(Continued)

(58) Field of Classification Search
CPC .... A01G 23/003; A01G 23/08; A01G 23/083; A01G 23/095; B64U 10/16; B64U 30/20;
(Continued)

(56) References Cited

U.S. PATENT DOCUMENTS 3,369,673 A 2/1968 Mosher
3,532,141 A 10/1970 Kamner
(Continued)

FOREIGN PATENT DOCUMENTS

CN 208285919 U 12/2018
CN 109287308 A 2/2019
(Continued)

OTHER PUBLICATIONS

Non-Final Office Action for U.S. Appl. No. 17/921,534, dated May 3, 2024, 16 pages.
(Continued)

*Primary Examiner* — Benjamin P Lee
(74) *Attorney, Agent, or Firm* — Alston & Bird LLP

(57) ABSTRACT

The invention relates to a system for remote and/or autonomous holding at least a portion of a tree trunk, said system comprising: a remotely and/or autonomously controlled Unmanned Aerial Vehicle (100), UAV, at least one remotely and/or autonomously controlled means (105) for holding at least a portion of a tree trunk attachable to said UAV (100), means for detecting at least a portion of a tree, means for detecting at least one tree parameter of at least a portion of a tree and/or at least one growing condition of at least a portion of a tree, a base station for communication with said UAV (100), means configured for directing said means (105) for holding at least a portion of a tree trunk to a particular position of said tree trunk depending on said at least one detected tree parameter and/or said at least one detected growing condition.

27 Claims, 41 Drawing Sheets

(30) Foreign Application Priority Data

| Nov. 16, 2020 | (SE) | .................................... 2051336-2 |
| May 25, 2021 | (WO) | ................ PCT/EP2021/063840 |
| May 25, 2021 | (WO) | ................ PCT/EP2021/063844 |
| May 25, 2021 | (WO) | ................ PCT/EP2021/063845 |

(51) Int. Cl.

| A01G 23/083 | (2006.01) |
| A01G 23/095 | (2006.01) |
| B64D 1/22 | (2006.01) |
| B64U 20/80 | (2023.01) |
| B64U 30/20 | (2023.01) |
| B64U 10/16 | (2023.01) |
| B64U 101/30 | (2023.01) |
| B64U 101/40 | (2023.01) |
| B64U 101/60 | (2023.01) |

(52) U.S. Cl.
CPC ............. *A01G 23/095* (2013.01); *B64D 1/22* (2013.01); *B64U 20/80* (2023.01); *B64U 30/20* (2023.01); *B64U 10/16* (2023.01); *B64U 2101/30* (2023.01); *B64U 2101/40* (2023.01); *B64U 2101/60* (2023.01); *B64U 2201/10* (2023.01); *B64U 2201/104* (2023.01); *B64U 2201/20* (2023.01)

(58) Field of Classification Search
CPC ............... B64U 20/80; B64U 2201/10; B64U 2201/20; B64U 2201/104; B64U 2101/40; B64U 2101/30; B64C 39/024; B64D 1/22
See application file for complete search history.

(56) References Cited

U.S. PATENT DOCUMENTS

| 4,412,569 | A | | 11/1983 | Barnett | |
| 4,554,781 | A | * | 11/1985 | Rogers | ...................... B27B 5/10 |
| | | | | | 56/235 |
| 4,815,263 | A | * | 3/1989 | Hartung | ............... A01G 23/095 |
| | | | | | 56/235 |
| 5,709,254 | A | * | 1/1998 | Argue | ...................... B27B 17/12 |
| | | | | | 144/34.1 |
| 6,041,683 | A | | 3/2000 | Timperi | |
| 6,167,928 | B1 | * | 1/2001 | Jarman | ................ A01G 23/065 |
| | | | | | 144/34.1 |
| 6,263,932 | B1 | | 7/2001 | Chalifoux | |
| 6,418,989 | B1 | * | 7/2002 | Jarman | .................. A01G 23/08 |
| | | | | | 144/34.1 |
| 6,697,724 | B2 | | 2/2004 | Beck | |
| 7,324,881 | B2 | | 1/2008 | Brunnert | |
| 7,480,564 | B2 | | 1/2009 | Metzler | |
| 8,176,954 | B1 | * | 5/2012 | Coulbourn, Jr. | ...... A01G 23/083 |
| | | | | | 144/34.1 |
| 9,117,185 | B2 | | 8/2015 | Vian et al. | |
| 9,795,091 | B2 | * | 10/2017 | Lindbom | ............. A01G 23/091 |
| 10,104,836 | B2 | | 10/2018 | Jamison | |
| 10,159,201 | B2 | * | 12/2018 | LaTendresse | ........ A01G 23/091 |
| 10,314,241 | B1 | | 6/2019 | Dunn | ...................... B64D 1/22 |
| 10,532,485 | B2 | * | 1/2020 | McCracken | ......... A01G 23/091 |
| 10,561,071 | B2 | * | 2/2020 | Hawkins | ................ B64U 10/14 |
| 10,796,275 | B1 | | 10/2020 | Wilkins | |
| 11,297,773 | B1 | * | 4/2022 | Lane | .......................... B27B 5/10 |
| 11,393,193 | B1 | | 7/2022 | Muehlfeld | |
| 11,526,179 | B2 | | 12/2022 | Maor | |
| 11,587,030 | B1 | | 2/2023 | Wilkins | |
| 11,696,536 | B2 | | 7/2023 | Clark | |
| 11,878,440 | B1 | * | 1/2024 | Mercier | .................... B27B 5/10 |
| 12,079,701 | B2 | | 9/2024 | Cella | |
| 2007/0180740 | A1 | | 8/2007 | Crowley | |
| 2009/0000698 | A1 | * | 1/2009 | Beresford | ............. A01G 23/08 |
| | | | | | 144/34.1 |
| 2010/0050585 | A1 | | 3/2010 | Amaro | |
| 2013/0299046 | A1 | | 11/2013 | Helenius | |
| 2014/0163781 | A1 | | 6/2014 | Vian et al. | |
| 2014/0299230 | A1 | * | 10/2014 | Cox, III | ............... A01G 23/095 |
| | | | | | 144/24.13 |
| 2016/0205872 | A1 | | 7/2016 | Chan et al. | |
| 2017/0069214 | A1 | * | 3/2017 | Dupray | .................... G08G 5/55 |
| 2018/0035606 | A1 | * | 2/2018 | Burdoucci | ........... A01D 34/008 |
| 2018/0088598 | A1 | | 3/2018 | Lection et al. | |
| 2018/0215466 | A1 | | 8/2018 | Hall | |
| 2018/0257774 | A1 | * | 9/2018 | Volpi | ..................... B64D 47/00 |
| 2018/0335372 | A1 | | 11/2018 | Orol et al. | |
| 2019/0061028 | A1 | | 2/2019 | Martinsson | |
| 2019/0100310 | A1 | | 4/2019 | Flood et al. | |
| 2019/0166765 | A1 | * | 6/2019 | Maor | ..................... A01G 3/085 |
| 2020/0286034 | A1 | | 9/2020 | Ur | |
| 2020/0367441 | A1 | * | 11/2020 | Guzmán López | ... A01G 23/095 |
| 2021/0253251 | A1 | | 8/2021 | Pass | |
| 2022/0174880 | A1 | * | 6/2022 | Robinson | ............. A01G 23/095 |
| 2022/0174932 | A1 | * | 6/2022 | Ravanat | ................. A01G 3/088 |
| 2022/0225584 | A1 | * | 7/2022 | Farrand | .................. G06V 20/10 |

FOREIGN PATENT DOCUMENTS

| CN | 111071472 A | * | 4/2020 |
| EP | 2743788 A2 | | 6/2014 |
| EP | 3175700 B1 | | 1/2016 |
| EP | 3175700 A1 | | 6/2017 |
| EP | 4156904 B1 | | 2/2024 |
| SE | 1750755 A1 | | 1/2019 |
| WO | WO-2016/123656 A1 | | 8/2016 |
| WO | WO-2018/033925 A1 | | 2/2018 |
| WO | WO 2020/263163 A1 | | 12/2020 |
| WO | WO- 2021/025560 A1 | | 2/2021 |

OTHER PUBLICATIONS

Notice of Allowance and Fees Due for U.S. Appl. No. 17/920,184, dated. Apr. 16, 2024, (9 pages), United States Patent and Trademark Office.

Hagner, Mats. "Propelled Balloons For Harvesting and Transporting Timber," Forestry, vol. 75, No. 4, pp. 495-500, (Year: 2002).

Wikipedia Contributors, "UAV Ground Control Station," *Wikipedia, The Free Encyclopedia*, (3 pages), (online), [Retrieved from the Internet Nov. 18, 2022] <URL:https://en.wikipedia.org/w/index.php?title=UAV_ground_control_station&oldid=1122559421>.

International Search Report and Written Opinion for International Application No. PCT/EP2021/064295, dated Sep. 15, 2021, (15 pages), European Patent Office, Rijswijk, Netherlands.

International Search Report and Written Opinion for International Application No. PCT/EP2021/064297, dated Sep. 23, 2021, (18 pages), European Patent Office, Rijswijk, Netherlands.

International Search Report and Written Opinion for International Application No. PCT/EP2021/064298, dated Sep. 24, 2021, (13 pages), European Patent Office, Rijswijk, Netherlands.

International Search Report and Written Opinion for International Application No. PCT/EP2021/064300, dated Sep. 17, 2021, (17 pages), European Patent Office, Rijswijk, Netherlands.

International Search Report and Written Opinion for International Application No. PCT/EP2021/064301, dated Sep. 17, 2021, (19 pages), European Patent Office, Rijswijk, Netherlands.

International Search Report and Written Opinion for International Application No. PCT/EP2021/064302, dated Sep. 22, 2021, (22 pages), European Patent Office, Rijswijk, Netherlands.

Final Office Action for U.S. Appl. No. 17/921,534, dated Dec. 6, 2023, (19 pages), United States Patent and Trademark Office, US.

NonFinal Office Action for U.S. Appl. No. 17/921,534, dated Jul. 10, 2023, (21 pages), United States Patent and Trademark Office, US.

Non-Final Office Action for U.S. Appl. No. 17/921,529, dated Sep. 11, 2024, 23 pages.

Hagner, Mats, "Propelled Balloons for Harvesting and Transporting Timber", Forestry, (7 pages), Apr. 2002, DOI: 10.1093/forestry/75.4.495.

(56) References Cited

OTHER PUBLICATIONS

Charron, G. et al., "The DeLeaves: a UAV Device for Efficient Tree Canopy Sampling", NRC Research Press, (20 pages), May 28, 2020, doi.org/10.1139/juvs-2020-0005.
Kaslin, F et al., "Novel Twig Sampling Method by Unmanned Aerial Vehicle (UAV)", Methods, vol. 1, Article 2, (6 pages), Oct. 18, 2018, doi:10.3389/ffgc.2018.00002.
Frontiers, "Video S1", Supplementary Material to Novel Twig Sampling Method by Unmanned Aerial Vehicle (UAV) viewed on the Internet at https://www.frontiersin.org/articles/10.3389/ffgc.2018.00002/full#supplementary-material on Mar. 11, 2024, 1 page.
Colin, Chris, "How Mythbuster Jamie Hyneman Hacked a Drone to Trim His Trees", https://www.popularmechanics.com/flight/drones/a26102/jamie-hyneman-drone-plants, Feb. 19, 2024, (6 pages).
Finzgar, D. et al., "Development of A Patented Unmanned Aerial Vehicle Based System for Tree Canopy Sampling", Gozdarski inštitut Slovenije, (5 pages), Dec. 29, 2016.
Wu, Bailey, et al., "Sampler Drone for Plant Physiology and Tissue Research", UC Santa Barbara College of Engineering, (1 page), 2018.
Non-Final Office Action for U.S. Appl. No. 17/921,247, dated Apr. 8, 2025, 26 pages.

\* cited by examiner

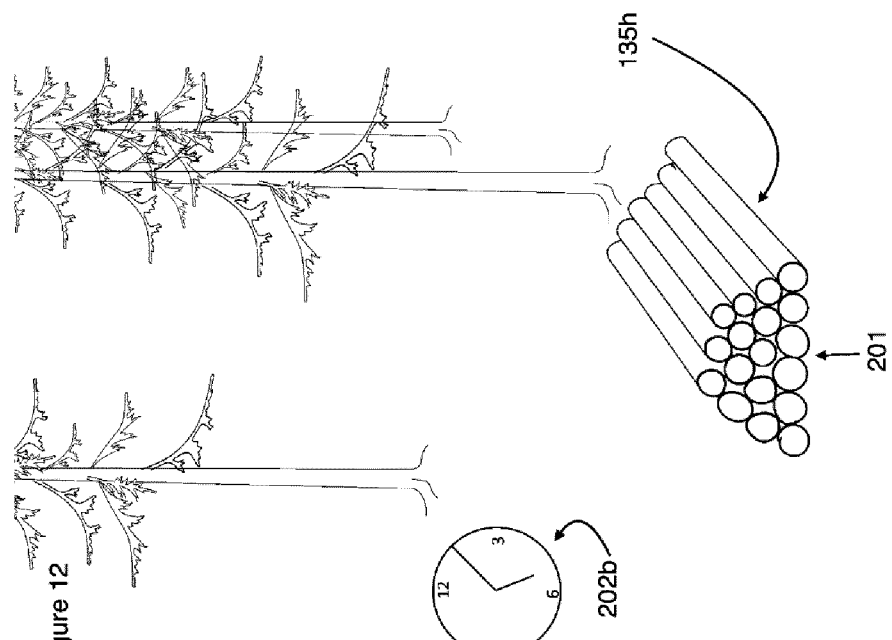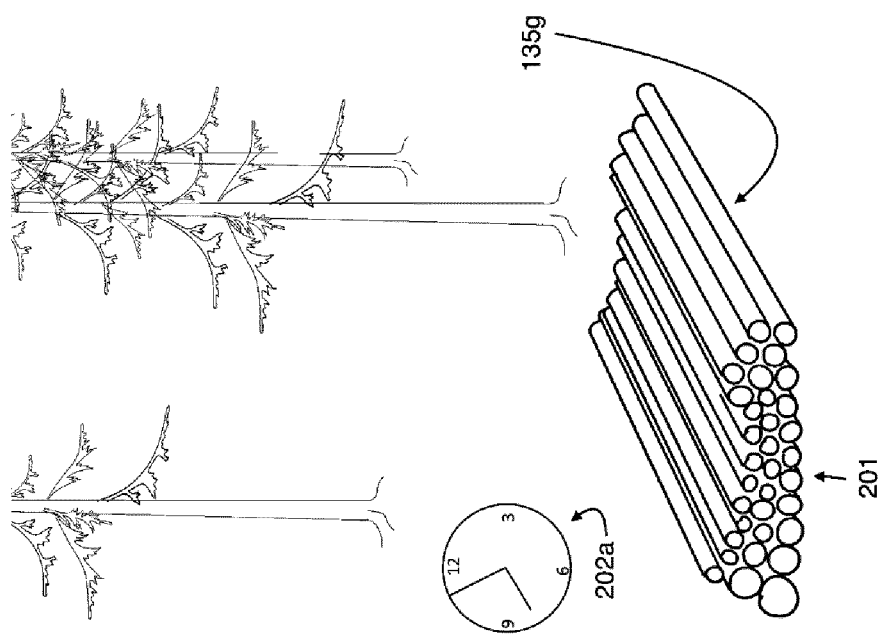

METHOD AND SYSTEM FOR REMOTE OR AUTONOMOUS HOLDING A TREE TRUNK

CROSS REFERENCE TO RELATED APPLICATIONS

This application is a National Stage Application, filed under 35 U.S.C. § 371, of International Application No. PCT/EP2021/064297, filed May 27, 2021, which international application claims priority to and the benefit of Swedish Application No. 2050611-9, filed May 27, 2020; Swedish Application No. 2051335-4, filed Nov. 16, 2020; Swedish Application No. 2051336-2, filed Nov. 16, 2020; International Application No. PCT/EP2021/063840, filed May 25, 2021; International Application No. PCT/EP2021/063844, filed May 25, 2021; and International Application No. PCT/EP2021/063845, filed May 25, 2021; the contents of all of which as are hereby incorporated by reference in their entireties.

BACKGROUND

Related Field

The present invention relates in general to the field of ligno harvesting and/or transporting and in particular to methods and systems for remote and/or autonomous holding at least a portion of a ligno trunk during harvesting or holding at least a portion of a ligno trunk during transporting.

Description of Related Art

Traditional ligno harvesting or ligno falling has long been conducted by persons and equipment based on the ground. In earlier times, from the early twentieth century and going back to the early nineteenth century, little consideration was given to the state of the forest or to the eco-system within the forest. Logging was done on a massive scale to keep up with the demand caused by the industrial revolution and the subsequent expansion of human life at the time. Depending on the terrain, ligno harvesting process usually begins with experienced ligno fellers cutting down a stand of ligno parameter or by using heavy ground based manned harvesting machines.

The above-described methods represent a high level of risk, either to the environment or the people performing the work. Damage can also be done to the delicate ecology of the forest, known as the understory or underbrush, where smaller plants bind the soil together and provide a habitat to insects, birds, lichens, and fungus among other things.

Most importantly, many locations are extremely difficult to reach by land, even with the use of heavy equipment such as bulldozers, and removal of ligno from such locations is expensive.

Sometimes it may be desirable to harvest a single ligno amongst a stand of ligno, so called ligno thinning, without disturbing the surrounding ligno.

In U.S. Pat. No. 6,263,932 it is disclosed an aerial ligno harvesting apparatus. A first body of said apparatus is suspended from helicopter and a second body is suspended by cables from the first body. The apparatus is capable of delimbing and cutting the ligno and thereafter transporting the harvested ligno to another location.

There is a need in the art for a method and apparatus for a more efficient remote or autonomous handling of a ligno trunk during harvesting and/or transportation.

The present invention aims at obviating the aforementioned problem. A primary object of the present invention is to provide an improved system for holding at least a portion of a ligno trunk.

Another object of the present invention is to provide an improved method for holding at least a portion of ligno trunk.

BRIEF SUMMARY

According to the invention at least the primary object is attained by means of the system having the features defined in the independent claims.

Preferred embodiments of the present invention are further defined in the dependent claims.

According to a first aspect of the present invention it is provided a system (10) for remote and/or autonomous holding at least a portion of a harvested ligno trunk and/or at least a portion of a ligno trunk to be harvested and/or at least a portion of a ligno trunk during harvesting and/or at least a portion of a ligno trunk before, during and/or after transporting said at least a portion of a ligno trunk, said system (10) comprising:
a. at least one remotely and/or autonomously controlled Unmanned Aerial Vehicle (100), UAV,
b. at least one means for holding (105) directly and/or indirectly onto at least a portion of a ligno trunk attachable to or integrated with said UAV,
c. at least one means for detecting at least a portion of a ligno,
d. at least one means for detecting at least one ligno parameter of at least a portion of a ligno and/or at least one growing condition of at least a portion of a ligno,
e. at least one base station (120) for communication with said UAV,
f. at least one means configured for directing said at least one means for holding onto at least a portion of a ligno trunk, where said holding is directly or indirectly onto at least a portion of a ligno trunk, to a particular position of at least a portion of a ligno trunk depending on said at least one detected ligno parameter and/or said at least one detected growing condition and/or
g. at least one means configured for directing at least a portion of a ligno trunk to a particular position, where said particular position is directly or indirectly onto said at least one means for holding, depending on said at least one detected ligno parameter and/or said at least one detected growing condition, wherein said at least one means for holding is configured to be transported by said at least one UAV to said at least a portion of a ligno trunk to be held by said at least one means for holding and/or is transported by said at least one UAV away from said at least a portion of a ligno trunk held by said means for holding and/or where said at least one means for holding is attached to said at least one UAV at least once when holding during transporting and/or harvesting said ligno trunk.

An advantage of this embodiment is that the holding position of at least a portion of a ligno trunk may be optimized depending on the ligno itself and/or of the characteristics of the area where it is located.

Still another advantage of the present invention is that transportation of at least a portion of a ligno may be faster and more efficient compared to prior art since its holding position is taking into account not only characteristics of the ligno itself but may also take into account parameters of its surrounding. This may result in a more efficient and/or secure transportation.

Yet another advantage is that the present invention provides for an integrated solution for unmanned holding of at least a portion of a ligno trunk.

In various example embodiments of the present invention said means for holding is remotely and/or autonomously controlled.

The advantage of these embodiments is that the means for holding may be controlled together with and/or from the UAV or controlled separately from said UAV at a distance from said means for holding.

In various example embodiments of the present invention, it further comprising at least one means for delimbing, at least one means for debarking, at least one means for cutting and/or at least one means for harvesting.

The advantage of these embodiments is that not only cutting may be controlled at distance but also additional harvesting steps such as debarking, delimbing.

In various example embodiments the present invention said at least one remotely and/or autonomously controlled means for holding (105) directly and/or indirectly at least a portion of a ligno trunk is configured to move directly or indirectly on ground and/or move directly or indirectly up and/or down on a ligno trunk.

An advantage of these embodiments is that said means for holding may transport itself to a predetermined ligno on ground and later be attached to the UAV for transportation of the ligno trunk.

In various example embodiments of the present invention, said means for detecting said at least one ligno parameter and/or at least one growing condition comprising a camera and/or using a database with digital information about said at least a portion of a ligno and/or a ligno within a predetermined distance from said at least a portion of a ligno.

An advantage of these embodiments is that ligno features may be detected on the fly and/or being detected prior to transporting/harvesting and stored digitally together with a position of the ligno. In various example embodiments a digital marker may be attached to the ligno configured to communicate with the UAV and transmitting information about at least one ligno feature.

In various example embodiments of the present invention said UAV and said means configured for holding directly and/or indirectly at least a portion of the lignotrunk is communicating with each other via one or more of WiFi, Bluetooth, radio communication, optical fibre and/or electrical wire.

An advantage of these embodiments is that the means configured for holding the ligno trunk and said UAV can be physically separated from each other.

Another advantage of these embodiments is that said means for holding at least a portion of a ligno trunk and said UAV may be controlled individually independently of each other.

In various example embodiment of the present invention, it further comprising means configured for automatically detect a final destination and/or locating a ligno in a predetermined area and/or locating a ligno at a final destination.

An advantage of these embodiments is that the ligno localization may be performed fully automatic without the help of an operator. Such means may include one or more of a GNSS and/or a camera and/or optical sensor. Such means may also include machine learning/artificial intelligence in order to recognise a suitable ligno and/or a suitable position of a ligno trunk to attach said means configured for holding the ligno trunk.

In various example embodiments of the present invention, it may comprise a synchronization unit for synchronizing the movement of at least two UAV for transporting cutting, holding, delimbing, harvesting and/or debarking of at least a portion of a ligno trunk.

An advantage of these embodiments is that a plurality of UAV may be used in synchronism with each other for transporting heavy ligno/trunks or portions thereof and that it is more efficient, less expensive and easier to use. The synchronisation unit may either be arranged in one of the UAV being a master UAV for the other slave UAV or in a remote-control unit for synchronising all UAV at a remote distance.

In various example embodiments of the present invention, it further comprises means for determining the number of UAV to be used together for transporting and/or holding said at least a portion of a ligno trunk depending on said at least one ligno feature and/or the distance between an original location of said at least a portion of a ligno trunk to a final destination.

An advantage of this embodiment in that the load capacity of the UAV may be optimized, i.e., not using overly large UAV and/or excessive number of UAV. Another advantage of this embodiment is that the size of UAV may be reduced resulting in an increased maneuverability, less power consumption and/or usability.

In various example embodiments of the present invention further comprising means configured for selecting at least a portion of a ligno trunk to be transported depending on at least one detected ligno parameter and/or at least one detected growing condition of said ligno trunk to be transported and/or of another portion of a ligno from which said ligno trunk originates and/or of at least one ligno grown within a predetermined distance from said ligno trunk to be transported and/or a ligno at said final destination.

An advantage of this embodiment is that the selection of a portion of a ligno trunk to be transported can be made from a remote location.

Another advantage of the present invention is that it may have none or at least very little impact on the nature. In various example embodiments of the present invention it further comprising means configured for selecting at least one cutting position on at least a portion of a ligno trunk depending on the at least one detected ligno parameter and/or the at least one detected growing condition of at least a portion of a ligno.

An advantage of these embodiments is that the holding position of the tree trunk may be selected depending on the desired cutting position of said tree trunk.

In various example embodiments of the present invention it further comprising means configured for directing said remotely and/or autonomously controlled UAV with at least a portion of a ligno trunk to a final destination a certain point in time where said final destination and/or said certain point in time is depending on at least one detected ligno parameter and/or at least one detected growing condition of said transported portion of a ligno and/or of a remaining portion of a ligno and/or of at least one ligno grown within a predetermined distance from said transported portion of a ligno.

An advantage of these embodiments is that transportation of at least a portion of a ligno may be faster and more efficient compared to prior art since different kinds of portions of ligno are directed to different locations depending on at least one ligno feature, which means that a sorting is already made prior to arriving at a final destination depending on said at least one ligno feature. This may result in a more efficient transportation chain to a customer.

In various example embodiments of the present invention it further comprising means configured for selecting at least a portion of a ligno trunk to be harvested and/or transported depending on at least one detected ligno parameter and/or at least one detected growing condition of said harvested and/or transported portion of a ligno trunk and/or of a remaining portion of a ligno trunk and/or of at least one ligno grown within a predetermined distance from said transported and/or harvested portion of a ligno trunk.

An advantage of these embodiments is that transportation of at least a portion of a ligno trunk may be faster and more efficient compared to prior art since different kinds of portions of ligno trunk may be selected out of customer needs, profit maximation and/or total harvesting time.

In another aspect of the present invention it is provided a method for remotely and/or autonomously holding during, before and/or after harvesting at least a portion of a ligno trunk or holding at least a portion of a ligno trunk during, before and/or after transporting said at least a portion of a ligno trunk, said method comprising the steps of:
 a. controlling remotely and/or autonomously at least one Unmanned Aerial Vehicle, UAV,
 b. identifying said at least a portion of a ligno trunk to be held,
 c. operating at least one means for directly and/or indirectly holding said at least a portion of a ligno trunk, where said at least one means for directly and/or indirectly holding said at least a portion of a ligno trunk is integrated with or attachable to said at least one UAV,
 d. detecting at least one ligno parameter of said at least a portion of a ligno trunk and/or at least one growing condition of said at least a portion of a ligno trunk and/or detecting at least one ligno parameter and/or at least one growing condition of at least one ligno grown within a predetermined distance from said at least a portion of a ligno trunk and/or detecting at least one ligno parameter and/or at least a growing condition of a another portion of a ligno from which said ligno trunk originates, wherein a directly or indirectly holding position of said at least a portion of a ligno trunk is depending on at least one ligno parameter of said at least a portion of a ligno trunk and/or at least one growing condition of said at least a portion of a ligno trunk and/or detecting at least one ligno parameter and/or at least one growing condition of at least one ligno grown within a predetermined distance from said at least a portion of a ligno trunk and/or detecting at least one ligno parameter and/or at least a growing condition of a another portion of a ligno from which said ligno trunk originates, wherein said means for holding is attached to said at least one UAV at least once when holding during transporting and/or harvesting said ligno trunk.

In various example embodiments of the present invention further comprising the step of selecting a cutting position of a trunk of said at least a portion of a harvested ligno trunk, at least a portion of a ligno trunk to be harvested, at least a portion of a ligno trunk during harvesting or at least a portion of a ligno trunk during transporting depending on at least one detected ligno parameter and/or at least one detected growing condition of said harvested portion of a ligno trunk and/or of a remaining portion of a ligno trunk and/or of at least one ligno grown within a predetermined distance from said harvested portion of a ligno and/or at least one ligno at a final destination for said harvested and/or transported ligno.

In various example embodiments of the present invention further comprising the step of transporting said at least a portion of a ligno trunk, by said UAV, away from the original location of said at least a portion of a ligno trunk to a final destination a certain point in time, where said final destination and/or said certain point in time is depending on said at least one detected ligno parameter and/or said at least one detected growing condition of said at least a portion of a ligno trunk and/or of a remaining portion of a ligno trunk and/or of at least one ligno grown within a predetermined distance from said at least a portion of a ligno trunk and/or at least one ligno at a final destination for said harvested and/or transported ligno.

Further advantages with and features of the invention will be apparent from the following detailed description of preferred embodiments.

BRIEF DESCRIPTION OF THE FIGURES

A more complete understanding of the abovementioned and other features and advantages of the present invention will be apparent from the following detailed description of preferred embodiments in conjunction with the appended drawings, wherein:

FIG. 1-5, 7-12 depict schematic pictures of different inventive remote and/or autonomous harvesting steps by using a system according to the present invention.

DETAILED DESCRIPTION OF VARIOUS EMBODIMENTS

The word ligno used hereinabove and hereinbelow is a generic term for any tree(s) and/or any bush(es).

The word harvesting used hereinabove and hereinbelow is a generic term for removing at least a portion from a ligno, i.e., cutting a portion of the ligno, cutting the full ligno and/or removing the ligno with at least a portion of its roots from the ground.

FIG. 1-5, 7-12 depict schematic pictures of different inventive remote and/or autonomous harvesting and/or transporting steps of at least a portion of a ligno by using an example embodiment of a system 10 according to the present invention. Said system may comprise a remotely and/or autonomously controlled means configured for harvesting and/or transporting at least a portion of a ligno 110, a remotely and/or autonomously controlled Unmanned Aerial Vehicle 100, UAV, comprising, at least one means for holding 105 said ligno trunk and being configured for transporting said harvested portion of said ligno to another location, wherein said system comprising at least one means for detecting said ligno to be harvested and/or transported, and a base station 120 for controlling said means configured for harvesting and/or transporting at least a portion of a ligno and said UAV. Said system further comprising means for detecting at least one ligno parameter of at least a portion of a ligno and/or at least one growing condition of at least a portion of a ligno. Said system further comprising means configured for selecting least a portion of a ligno to be harvested and/or transported depending on at least one detected ligno parameter and/or at least one detected growing condition of said transported/harvested portion of a ligno and/or a remaining portion of a ligno and/or of at least one ligno grown within a predetermined distance from said transported portion of a ligno.

Figure 1:
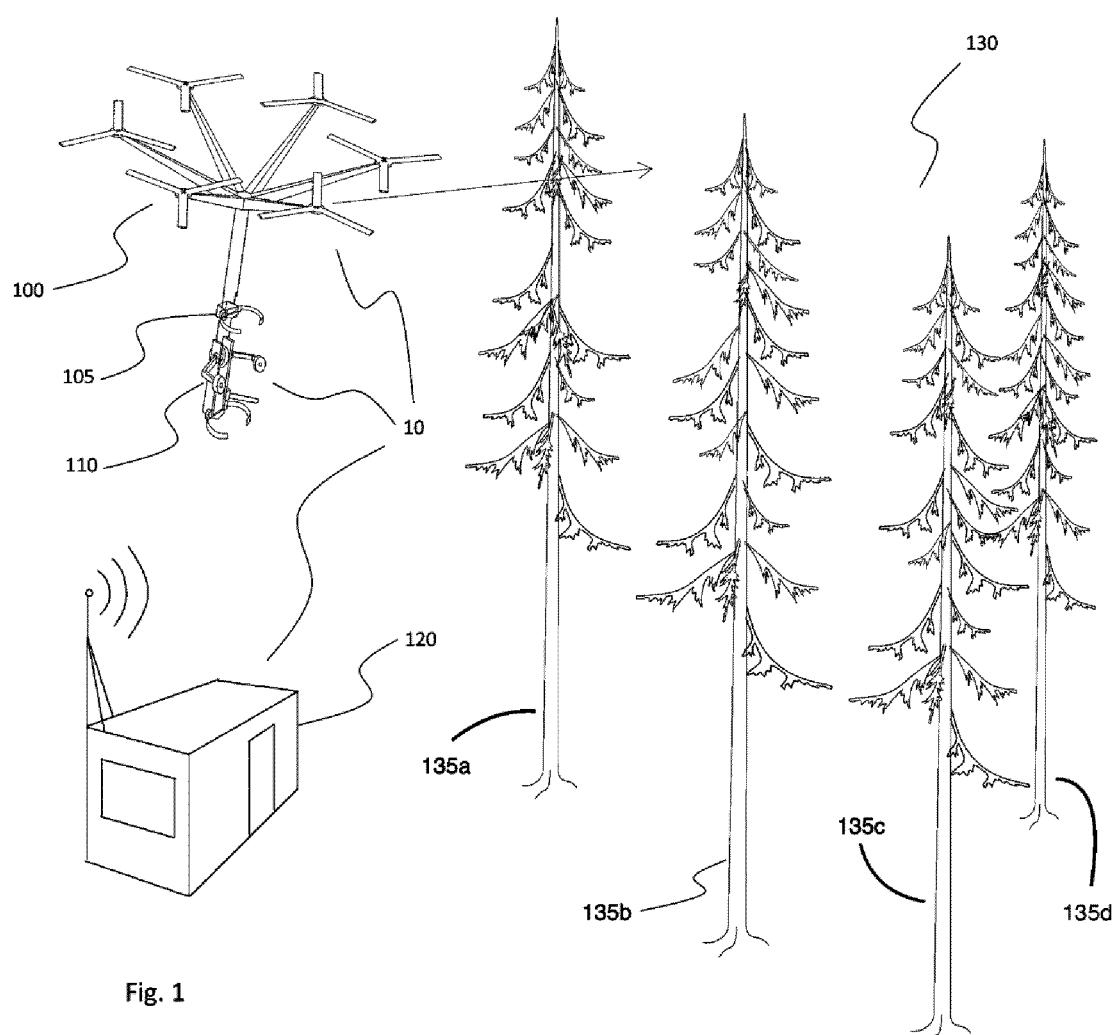

In FIG. 1 said UAV 100 is carrying said remotely and/or autonomously controlled means configured for harvesting at least a portion of a ligno 110 on its way to harvest a at least a portion of a ligno 135a, 135,b, 135c, 135d in a forest 130. The UAV is remotely controlled by said base station 120 and/or autonomously controlled and optionally communicating with base station 120. The base station 120 may be a stationary unit or a mobile unit.

In FIG. 1-4, 7, 9, 10 the UAV 100 can be considered as a forestry forwarder and said means configured for harvesting at least a portion of a ligno 110 can be considered to be a forestry harvester.

In an autonomously controlled means configured for harvesting at least a portion of a ligno said means is able to operate without being controlled directly by humans whereas in a remotely controlled means configured for harvesting at least a portion of a ligno said means is able to be operated from a remote distance controlled directly by humans. In various example embodiment said means configured for harvesting at least a portion of a ligno and said UAV are remotely controlled. In various example embodiment said means configured for harvesting at least a portion of a ligno and said UAV are autonomously controlled. In various example embodiments said means configured for harvesting at least a portion of a ligno is remotely controlled and said UAV is autonomously controlled. In various example embodiments said means configured for harvesting at least a portion of a ligno is autonomously controlled and said UAV is remotely controlled.

Said means for detecting a ligno may be at least one of a camera or an optical sensor. The camera may be at least one of for example an IR-camera (Infrared-camera), NIR-camera (Near Infrared-camera), a VISNIR-camera (Visual Near Infrared-camera), a CCD camera (Charged Coupled Device-camera), a CMOS-camera (Complementary Metal Oxide Semiconductor-camera), a digital camera, a 3D camera e.g., stereo camera, time-of-flight camera or LiDAR. The optical sensor may at least one of a photodetector, pyrometer, proximity detector and/or an infrared sensor.

Said means for detecting a ligno may be arranged on said UAV and/or said means configured for harvesting at least a portion of a ligno.

Said means for detecting at least one of the group of ligno parameters may be the same means as being used for detecting a ligno and/or an additional means. The additional means may be at least one of a camera or an optical sensor. The camera may be at least one of for example an IR-camera (Infrared-camera), NIR-camera (Near Infrared-camera), a VISNIR-camera (Visual Near Infrared-camera), a CCD camera (Charged Coupled Device-camera), a CMOS-camera (Complementary Metal Oxide Semiconductor-camera), a digital camera, a 3D camera e.g., stereo camera, time-of-flight camera or LiDAR, a spectral camera, a heat sensitive camera, an ultrasonic measurement device, a radar device, a vibration device. The optical sensor may be at least one of a photodetector, pyrometer, proximity detector and/or an infrared sensor. A 3D picture may see through foliage and/or branches. A mean value of multiple 3D images may result in mm precision images. 3D pictures may reveal lots of information about branches, ligno trunk and/or ligno species. 3D images may be taken from an air born vehicle such as an UAV. The spectral camera may be used for measuring vegetation index (NDVI), i.e., a measure of the photosynthesis in a particular area. Heat sensitive cameras may be used for measuring the temperature of the surface of the ligno trunk which in turn may be a measure of the health of the ligno, an insect infestation ligno has a higher surface temperature than a non-infested ligno. Ultrasonic measurement and/or radar may be used for determining the inner form of the ligno, i.e., rotten or hollow inner structure and/or the inner moisture content of the ligno. Computer tomography and/or magnetic resonance imaging can give information about a portion of a ligno down to a ligno cell level.

Said means for detecting at least one of the group of ligno parameters may be a camera or optical sensor in combination with Artificial Intelligence AI. AI may be used for training a model for recognizing one or a plurality of said ligno parameters. Ligno parameters may be recognized visually and/or by measurement and/or by at least on physical sample. Measurement may be made by optical inspection at a distance from the ligno and/or by physical measurement, for instance integrated in said means for gripping/holding 105 said ligno trunk. Said means for detecting at least one ligno parameter may be a laser scanner attached to said UAV and/or said means for holding said ligno trunk and/or said means for harvesting said at least a portion of a ligno. By laser scanning the ligno trunk the ligno species may be determined and other surface conditions of the ligno trunk such as the presence of any moss and/or any damage. Detected ligno parameters may be compared with stored ligno parameters in a data base for categorization and/or future choice and/or prioritization.

The final destination of said at least a portion of the ligno may be determined by at least one of said detected ligno parameters and/or at least one detected growing condition. Ligno parameter can be considered to be intrinsic features and growing condition can be considered to be extrinsic features.

Ligno parameters may for instance be a diameter of said at least a portion of a ligno (top diameter, base diameter, mean diameter, median diameter), length of said at least a portion of a ligno, ligno species of said at least a portion of a ligno and/or the weight of said at least a portion of a ligno, dry content, age of ligno, number of annual rings, distance between annual rings, color of annual rings, width of annual rings, amount of leaves, amount of fir needle, color, chemical composition of the ligno, twig-free, deformation(s), cracks (dry cracks (partial or all trough), end crack, ring crack), rootstock, density, rot, discolored, dead ligno, insect infested, microorganism infested, weather damage (storm, wind, fire, drought), machine damage (root, ligno trunk), amount of fruits, seeds, berries, nuts, cones, flowers on the ligno, form of root, root structure, root depth, root volume etc. The color of the ligno may be an indicator of ligno species. The color may be the color of the outer surface of the ligno trunk or the color of a cut area. The form of the ligno may be determined by a 3D camera. Form may comprise total volume of ligno, leaves or fir needles, deformations, shape deviations etc. Ligno parameters may also comprise material properties of the ligno such as moisture content (%), tensile strength (MPa), flexural strength (MPa), compressive strength (MPa), shear strength (MPa), impact strength (KJ/$m^2$), hardness (Brinell, Vickers, Rockwell), elasticity module (MPa), thermal conductivity (W/m° C.), heat capacity (J/kg° C.), Calorific value (MJ/kg), etc.

In various example embodiments said ligno parameters may be detected manually by human or remote and/or autonomous by a separate unit prior to harvesting. Ligno parameters may be stored digitally together with GPS position. In various example embodiments a digital marker may be arranged physically on ligno prior to cutting the ligno or when the ligno is laying on ground. The digital marker may have stored information about at least one ligno parameter. The input of ligno parameters may be made manually prior to harvesting. The digital marker may be configured to communicate with said UAV. The communication may be performed by Bluetooth, wifi, radio communication and/or telecommunication (3G, 4G, 5G). A physical sample for detecting ligno parameters such as density, rot and/or dry content may be made manually prior to harvesting and/or automatically by a sample detection means added to the means for holding the ligno trunk and/or the means configured for harvesting at least a portion of a ligno. Such sample detection means may be a suitable tool for removing a predetermined amount of the ligno to be analysed. The removal of said predetermined amount to be analysed may be made by drilling, sawing or cutting. The analyzation of said predetermined amount of the ligno may be made while the UAV is at or near the ligno or said predetermined amount of ligno may be brought to an analyzation station at a distance from the ligno. A selection of where to remove said predetermined amount of the ligno may be made by using said camera. Suspected rotten or insect infested area may be detected by the camera and thereafter a sample of such area may be removed and analyzed. Different portions of a single ligno and different ligno may be catagorized differently depending on the outcome of the analysis, i.e., depending on the ligno parameters a specific portion of a ligno may fall into one or a plurality of different categories. If a specific portion of a ligno may fall in a plurality of different categories a selection may be based on the value or the current demand in the market.

Growing conditions may for instance be #ligno per unit area and/or growth potential.

Growing condition may also be biotic environmental factors (interaction of organism of the same species and/or interaction of organisms of other species) such as mount of dead ligno/wood within a predetermined area, interaction and/or competition of other species, gas and fragrance from plants, temperature of other plants etc. Fungal infestation and insect infestation may be spread over a large area. It may be advantageous to harvest non infested ligno within a predetermined time after having detected an infested ligno in a predetermined area. Fungal and insects may spread over several km. Competition for water, nutrition, and sun hours may be within a distance of 0-50 m. Advantageous interaction/competition situation may be made through sorting out plants in predetermined positions in order to get optimal conditions for the remaining ones.

Growing conditions may also be abiotic environmental factors climate (temperature, precipitation etc), topography, ground temperature, geology, hydrology, vegetation, soil, earth deposit, soil depth, surface blockage, minerals, ground carbon contents, ground nitrogen content, ground carbon nitrogen ratio, PH value, bas kat ions, amount of trace elements, physical or chemical erosion, environmental condition, wind etc. Abiotic environmental factors may also be the type of land such as forest land, arable land, agricultural land, natural pasture, mountain impediment, protected area, power line area, military area, built up land etc.

At least one ligno parameter and/or growing condition may be used as a factor for determining the usage, demand, storage, quality of the at least a portion of ligno. This in turn may be used for determining the final destination of a particular portion of a ligno.

Gas sensors may be used to detect water quality (carbon oxide content, methane content, oxygen content etc.).

The UAV may have one or a plurality of propellers. In FIG. 1-4 said UAV is exemplified to have 6 propellers arranged symmetrically around an origin.

The base station 120 may, when remotely controlled, be operated by at least one human being, whereas, when autonomously controlled, be a base station 120 with programmed software algorithms used for supporting the autonomous UAV and/or the means configured for harvesting at least a portion of a ligno. The base station 120 may be a stationary unit or a mobile unit.

Said means for holding the said ligno 105 may be at least one movable gripping arm. In various example embodiments said means for holding said ligno 105 may be one or a plurality of metal bars which may at least partially penetrate a ligno trunk. In various example embodiments said means for holding said ligno 105 may be a unit surrounding said ligno trunk and being able to change its holding area and thereby compress around the ligno trunk for securing purpose and decompress for releasing a ligno trunk or entering a ligno to be harvested. Said means for holding said ligno 105 may comprise said sample detection means.

In various example embodiments said means configured for harvesting at least a portion of the ligno may be arranged with means for attaching itself to said ligno trunk. In various example embodiments said means configured for harvesting at least a portion of a ligno is also configured for moving up and down along the trunk of the ligno. The movement may be performed by at least one electrically driven wheel travelling on said ligno trunk. In various example embodiments at least one wheel may be electrically driven for enabling movement up and down said ligno trunk and at least one other wheel is arranged for friction reduction during said movement. In various example embodiments at least to wheels are configured to attach, secure and move said means configured to harvesting at least a portion of a ligno.

In various example embodiments said means configured for harvesting at least a portion of the ligno is also configured for moving on ground. The movement can be made via a plurality of wheels or legs and/or as a tracked vehicle.

Said UAV 100 and said means configured for harvesting at least a portion of the ligno may be communicating with each other via one or more of WiFi, Bluetooth, radio communication, telecommunication (3G, 4G, 5G), optical fibre and/or electrical wire. In various example embodiments said control unit and said UAV and/or said means configured for harvesting at least a portion of the ligno may be communicating with each other via one or more of WiFi, Bluetooth, radio communication, telecommunication (3G, 4G, 5G). Depending on the distance and/or communication quality between the control unit and said UAV and/or said means configured for harvesting at least a portion of a ligno the communication may change from one type of communication to another.

In various example embodiments said means configured for harvesting at least a portion of the ligno is connectable to an underside of said UAV 100. In various example embodiments said means configured for harvesting at least a portion of the ligno may be released from said UAV directly onto a ligno to be harvested or on the ground at or near the ligno to be harvested. In various example embodiments said means configured for harvesting at least a portion of the ligno may be provided at a distance from said ligno to be harvested from a land vehicle. The means configured for harvesting at least a portion of the ligno may of its own motion move from the position on ground to the desired ligno to be harvested. Communication between said UAV and said means configured for harvesting at least a portion of a ligno may at any desired time result is a pick-up of said means configured for harvesting at least a portion of a ligno by said UAV. The pickup of said means configured for harvesting at least a portion of a ligno by said UAV 100 may be made on ground if there is enough space or on a trunk of a ligno.

In various example embodiments the UAV 100 may comprise a power unit for powering said UAV 100 and said means configured for harvesting at least a portion of said ligno 110. The power from said power unit in said UAV 100 may be delivered to said means configured for harvesting at least a portion of a ligno 110 via at least one power cable. The power unit may be an electric motor and/or an internal combustion engine.

In various example embodiments said UAV 100 may comprising at least a first power unit for powering said UAV 100 and said means configured for harvesting at least a portion of a ligno 110 may comprise at least a second power unit for powering said means configured for harvesting at least a portion of a ligno 110. The power unit in said UAV 100 may be electrical and/or an internal combustion engine. The power unit in said means configured for harvesting at least a portion of a ligno 110 may be electrical and/or an internal combustion engine.

In various example embodiments said means configured for harvesting at least a portion of a ligno 110 is also configured for delimbing a ligno. The delimbing may be performed from top to bottom if said means configured for harvesting at least a portion of the ligno is initially arranged on said ligno to be harvested from above. In various example embodiments said delimbing may be performed from bottom to the top if said means configured for harvesting at least a portion of a ligno is moved by its own motion from ground to the ligno to be harvested or attached to a lower section of the ligno to be harvested from the UAV. The delimbing may be performed by one or a plurality of cutting means, snapping means, and/or shearing means. The cutting means may be by cutting chains and/or by rotary cutting disks. The cutting may be performed by a straight movement along said trunk of said means configured for harvesting at least a portion of a ligno and/or by a serpentine movement along the trunk by said means configured for harvesting at least a portion of a ligno.

In various example embodiments said means configured for harvesting at least a portion of a ligno 110 is configured to be in direct communication with a remote operator and/or a remote base station 120 or indirect communication via said UAV 100 with a remote operator and/or a base station 120. The indirect communication, i.e., the UAV 100 as access point, with said means configured for harvesting at least a portion of a ligno 110 may be used if the same information is to be sent to both UAV 100 and said means configured for harvesting at least a portion of a ligno 110. The UAV 100 may be in various example embodiments work independently from a remote base station 120. The indirect communication may also be used if said UAV 100 is arranged in between said base station 120 and said means configured for harvesting at least a portion of a ligno 110.

In various example embodiments said UAV and/or said means configured for harvesting at least a portion of a ligno may comprise means configured for automatically locating a ligno and/or a predetermined area to be harvested. Said means configured for automatically locating a ligno and/or said predetermined area to be harvested may comprise at least a Global Navigation Satellite System, GNSS. Said means configured for automatically locating a ligno and/or a predetermined area to be harvested may comprise at least one camera or optical sensor. Said means configured for automatically locating a ligno and/or a predetermined area to be harvested may comprise at least a camera in combination with Artificial intelligence or machine learning algorithms for speeding up the detection of a suitable area to arrange said means configured to cut a ligno trunk.

Now returning to FIG. 1 where the UAV 100 is on its way to a ligno 135 in forest 130 to be harvested. The ligno 135 may be preselected, i.e., selected prior to arrival to the ligno 135. Alternatively said ligno 135 may be selected by the UAV 100 in combination with the base station 120 once the UAV 100 is at or near a position above said ligno 135. The selection may be performed by identifying a picture of the ligno 135 from above with stored pictures in said control station 120 and by means of a selection algorithm select a ligno for ligno thinning purpose or other selection criteria.

In FIG. 1 the forest 130 comprises four ligno 135a, 135b, 135c, 135d, all of which may have equal or different ligno parameters and/or growing conditions. The forest may of course have a larger or smaller amount of ligno than the depicted 4 as shown in FIG. 1-4. A ligno to be harvested may be determined by at least one of said detected ligno parameters and/or growing conditions. In various example embodiments the order of harvesting ligno 135a, 135b, 135c, 135d may be selected out of minimizing a total harvesting time. In various example embodiments a particular ligno may be selected because there is a demand of such ligno parameters from a particular customer. In various example embodiments a particular ligno may be selected to be harvested due to a particular ligno thinning strategy, e.g., smallest or largest ligno in a group of ligno, diameter of said at least a portion of a ligno, length of said at least a portion of a ligno, ligno species of said at least a portion of a ligno and/or the weight of said at least a portion of a ligno, dry content, twig-free, rootstock, density, rot, discolored, dead ligno and/or insect infested. Ligno parameters may be detected prior to arriving with the UAV 100 to the forest 130. This may be made manually and/or automatically. Manual detection may be made by human beings registering at least one ligno parameter in a digital data base. Automatic ligno parameter may be made by a separate UAV and/or a land-based vehicle. Detection may be non-destructive and/or destructive. Non-destructive methods may be made by visual inspection by a human being or by registering the ligno by a suitable optical means such as a camera. Destructive detection may be made by removing a predetermined amount of a ligno and analyzing it on site or at a remote site. A ligno to be harvested may be selected depending on its distance to the final destination, e.g., choosing ligno with a particular set of ligno parameters as close to the final destination as possible. A ligno to be harvested may be selected in order to maximize the value of the total amount of harvested ligno in a particular time frame. A ligno to be harvested may be selected in order to maximize the value of the remaining ligno in the forest. A decision of how much of a particular ligno to be harvested may be made depending on at least one ligno parameter.

In various example embodiments the selection of already harvested portions laying on ground may be made depending on at least one ligno parameter. In various example embodiments a correct size of UAV may be made depending on at least one ligno parameter of said at least a portion of ligno laying on the ground. In various example embodiments a correct choice of number of UAV for transportation may be made depending on at least one ligno parameter of said at least a portion of ligno laying on the ground.

In various example embodiments the system further comprising means configured for determining a certain point in time said at least a portion of a ligno should be harvested and/or transported. A ligno 135a having a first set of ligno parameters may be selected to be harvested and/or transported prior to a ligno 135c having a second set of ligno parameters.

Figure 2:
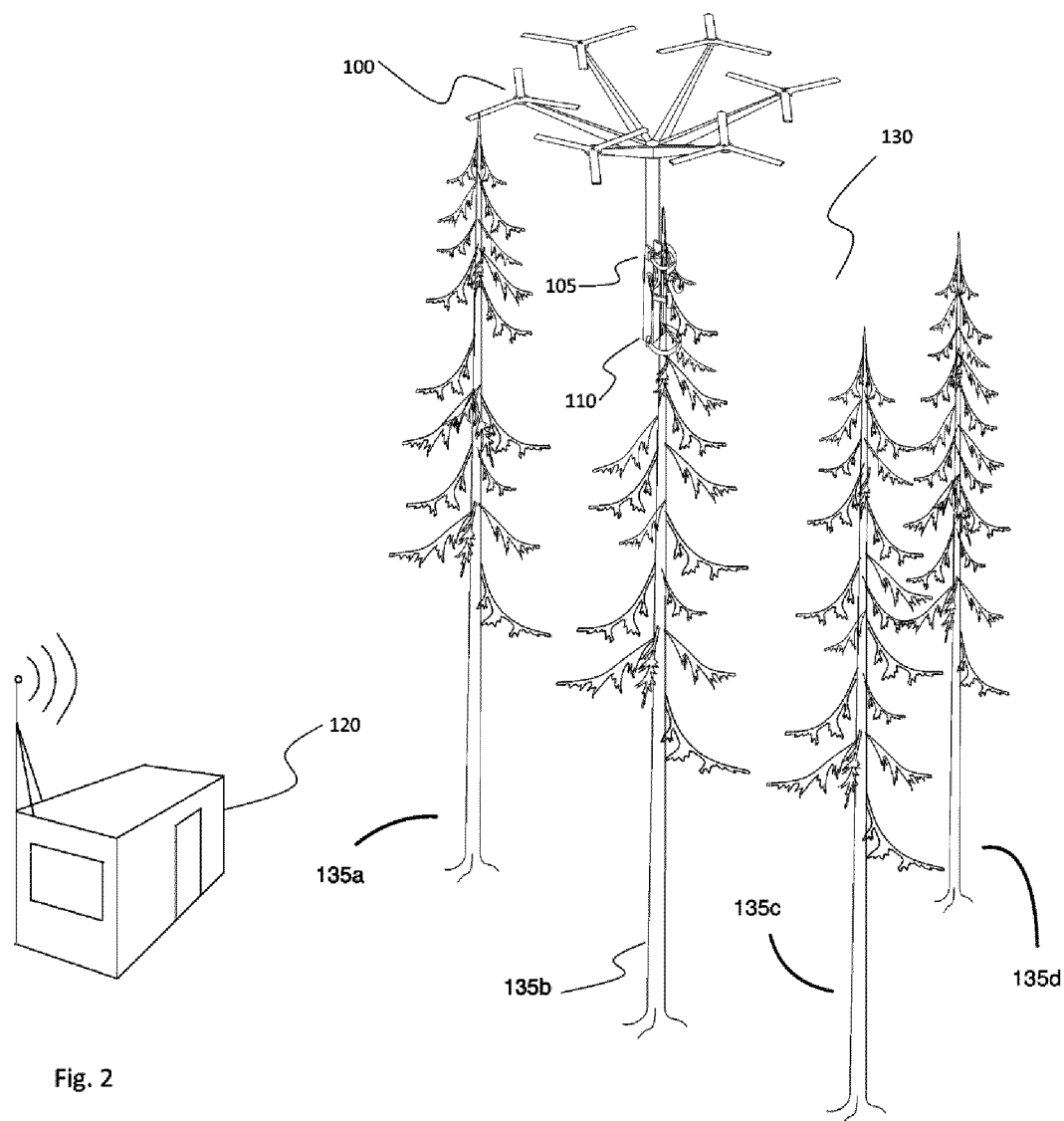

In FIG. 2 the selected ligno 135 has been attached on its top portion by at least one means for gripping 105 said ligno trunk. A gripping position on said ligno 135 may be selected depending on the expected lift weight of the harvested portion of said ligno. If the full ligno is to be harvested a greater diameter of said trunk of the ligno is to be chosen as a gripping position compared to if just a portion of the ligno is to be harvested.

Figure 3:
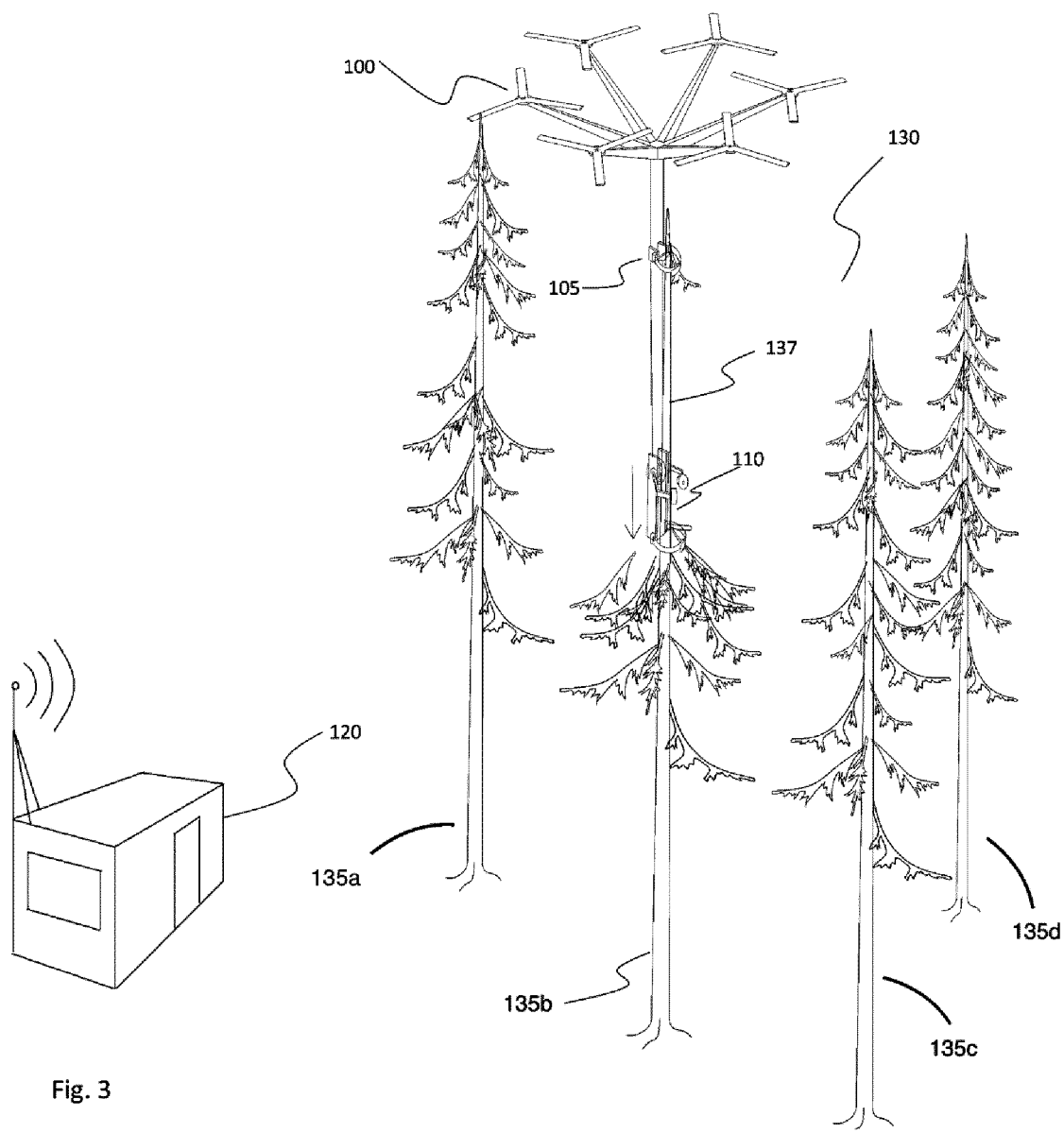

In FIG. 3 the autonomously controlled means configured for harvesting at least a portion of a ligno 110 has been moved a distance down from said at least one means for gripping 105 said ligno trunk. On its way down said means configured for harvesting at least a portion of a ligno 110 also has delimbed the ligno 135 leaving a bare ligno trunk 137 without twigs and limbs. The powering of said means configured for harvesting at least a portion of a ligno 110 may be provided by said UAV 100 or by a power unit in said means configured for harvesting at least a portion of a ligno 110. In case of power supplied from said UAV to said means configured for harvesting at least a portion of a ligno 110 said power may be delivered via one or a plurality of power cables arranged on between said UAV 100 and said means configured for harvesting at least a portion of a ligno 110. A power unit in said means for cutting a ligno trunk 110 may be one or a plurality of battery packs. In various example embodiments a first battery pack maybe used for communication with the UAV 100 and/or a base station 120. A second battery pack may be used for moving said means for harvesting at least a portion of a ligno 110 up/down on a ligno trunk and/or for moving said means for harvesting at least a portion of said ligno 110 on ground.

Instead of harvesting trees and/or bushes (ligno) by means of cutting at least a portion of said ligno, said ligno may be removed from ground with at least a portion of its root system. This removal may be made by using the UAV as removal means, i.e., gripping a ligno and using the upward traction power of the UAV for removing the ligno from ground. This technique may only be used for small ligno, for instance when invasive arts is to be removed from a particular area at an early stage for not causing damage on the remaining portion of the forest.

Figure 4:
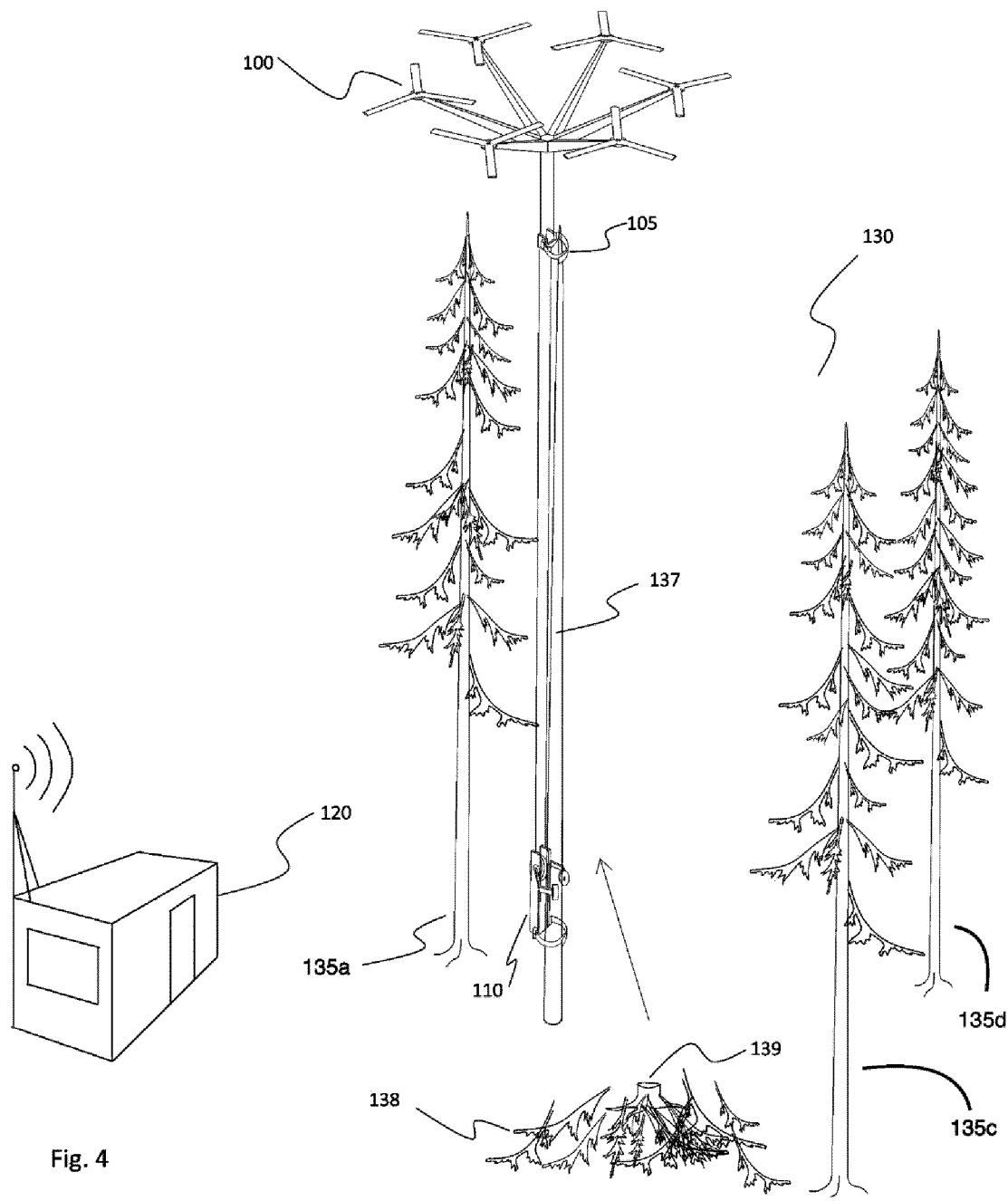
Figure 5:
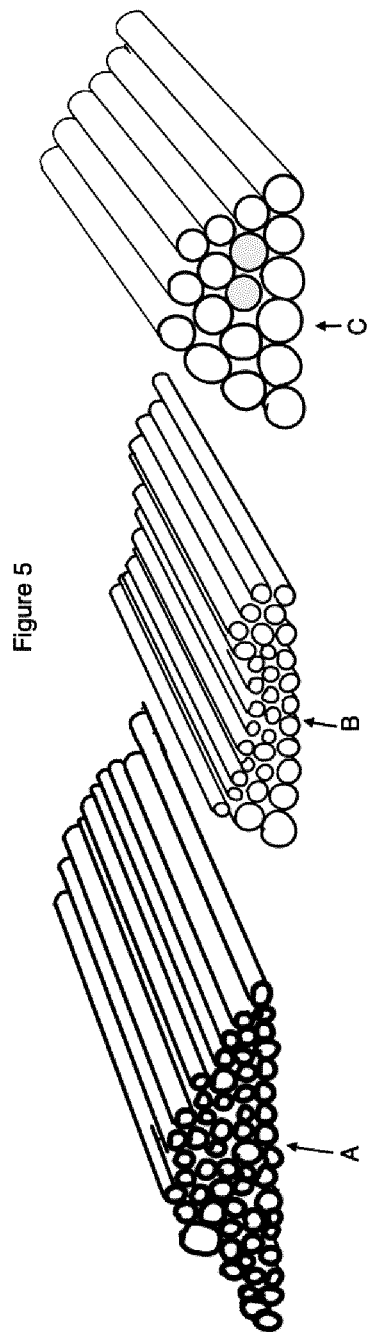

In FIG. 4 the ligno 135 has been delimbed, harvested and on its way to a location away from the original location of the ligno. What is left of the original ligno 135 at its original location is a pile of limbs 138 and a ligno stump 139. In the depicted example embodiment said means configured for harvesting at least a portion of a ligno 110 is still arranged on said ligno trunk when the ligno is transported away from the original location of the ligno. In various example embodiments it is provided means configured for directing said remotely and/autonomously UAV 100 with said at least a portion of a ligno to a final destination where said final destination is depending on said detected ligno parameters. In various example embodiments a first type of ligno species may be transported to a first final destination whereas a second type of ligno species may be transported to a second final destination. FIG. 5 illustrates 3 different final destinations A, B and C respectively. The final destination may have a first set of ligno parameters, final destination B may have a second set of ligno parameters and final destination C may have a third set of ligno parameters. Said first, second and third set of ligno parameters may be different. Ligno parameters may for instance be a diameter of said at least a portion of a ligno, length of said at least a portion of a ligno, ligno species of said at least a portion of a ligno and/or the weight of said at least a portion of a ligno, dry content, twig-free, rootstock, density, rot, discolored, dead ligno, insect infested. At least one of said final destinations A, B or C may be an intermediate storage on ground. At least one of said final destinations A, B or C may be a mobile storage, for instance a timber truck.

In various example embodiments said final destination A, B or C may as in FIG. 5 be close to each other. In various example embodiments said final destination A, B or C may be remote to each other. In various example embodiments more or less final destinations than 3 as depicted in FIG. 5 may be present.

In various example embodiments the final destination A may be for timber having a length within a predetermined interval. The final destination B may be for timber having a predetermined weight per unit of timber. The final destination C may be for rotten ligno, discolored ligno, dead ligno and/or insect infested ligno.

In various example embodiments the final destination A may be allocated with timber having a first set of ligno parameters and a requirement to be filled with timber prior to a final destination B which may have the same ligno parameters but will be filled with timber later in the ligno harvesting process. It may be that the final destination A is close to a road or at a timber truck, whereas final destination B may be an intermediate storage closer to the harvesting area compared to final destination A and far away from any available road.

In various example embodiments the first final destination A may be for timber to be used as pulp. The second final destination B may be for building material, such as plank. The third final destination C may be for biomass material.

Depending on the location of said first second and third final destination, A, B and C respectively, and the location of the ligno to be harvested an optimization may be performed prior to harvesting in order to minimize the time required to harvest and transport a given number of ligno in various categories. A forest having numerous ligno, such optimization may result in harvesting a first set of ligno parameters first and a second set of ligno parameters later in time for a first harvesting area whereas in a second harvesting area a third set of ligno parameters, different to said first and second may be chosen to be harvested first. The optimization may be depending on the density of ligno per unit area, the topography of the nature where the ligno are located, the type of ligno present in a predetermined area and/or the purpose of the harvesting technique, sorting out or complete disforestation.

At least one ligno parameter and/or growing condition may steer the final destination. Coordinates for different final destinations may be pre stored in the UAV and/or base station. Different sets of ligno parameter and/or growing condition may be linked to different final destinations, i.e., coordinates.

A plurality of portions of ligno may be transported simultaneously by at least one UAV. The choice of portions of ligno to be transported may depend on the distance between the portions of ligno and/or the distance between the plurality of portions of ligno to be transported and the final destination. The choice of portions of ligno to be transported may also depend on the total remaining battery power and/or remaining fuel of the UAV(s).

Said means configured for directing said remotely and/autonomously UAV with said at least a portion of a ligno to a final destination depending on said detected ligno parameters may also be configured for determining a certain point in time said at least a portion of a ligno should be arrived at said final destination. Not only the destination may be determined depending on one or a plurality of ligno parameters, also the certain point in time a particular at least a portion of a ligno should arrive at a predetermined location may depending on one or a plurality of ligno parameters. In a first example embodiment a particular ligno parameter is to be picked up by a timber truck and transported away days or weeks from a particular harvesting time. This may be a trigger factor for either just harvesting the particular ligno and let them lay on the ground or simply postpone the actual harvesting said days or weeks until said pickup by timber truck is to take place. In a second example embodiment timber at a particular final destination A, B, or C may be sorted so that a particular set of ligno parameters arrives first, time A, at a particular final destination, i.e., furthest down in a pile of timer. A second set of ligno parameters arrives later, time B and will be arranged on the middle of the pile of timber. A third set of ligno parameters arrives latest, time C, and will be arranged on a top portion of the pile of timber. Having sorted different sets of ligno parameters at one and the same location may make transport logistics more effective in picking up the correct type of timber.

The predetermined distance of at least one ligno grown from said transported portion of a ligno may depend on topography and/or invasive species. An insect infested and/or fungal infested tree in a predetermined area may result in harvesting relatively far away from the infested tree, i.e., a large predetermined distance up to several hundred of meters, whereas in a healthy environment said predetermined distance may be less than 50 meters and in some cases may be less than 20 meters. The predetermined distance from said at least a portion of a ligno may be at least one final destination of said at least a portion of a ligno. The holding position of said ligno trunk to be transported may be chosen with respect to how ligno trunks are stored at said final destination. A final destination may be chosen during transporting and/or harvesting. A final destination may be determined before a ligno trunk is harvested. A final destination may be shosen depending on at least one ligno parameter and/or growing condition. The system may be configured to detect at least one final destination by use of a camera, map and/or data base with information of the forest. The final destination may be chosen with respect to the particular characteristics of the ligno trunk to be transported, the power capacity of the UAV, the terrain and/or actual position of timber trucks.

The system may further comprising means for determining the number of UAV to be used together for transporting at least one portion of a ligno depending on said at least one ligno parameter and/or the distance between an original location of said at least a portion of a ligno to and said final destination. Long and/or heavy portions of ligno and/or a transport of a plurality of portions of ligno may require more than one UAV for transporting said portion of the ligno(s) from its original location to its final destination. At least one ligno parameters may be used to allocate the correct number of UAV to be used in synchronism for transporting said portions of ligno(s). The plurality of UAV may either attach to the portion of ligno to be transported or attach to another UAV for synchronously transporting said portion of ligno away from its original location to its final destination. The attachment of one UAV to another UAV may be made directly via a connection arrangement or via a wire or bar in between said two UAV. A plurality of UAV may also be necessary if the distance between the original location and the final destination is very long. If the distance between the original location and the final destination is long, an intermediate storage location in between said original location and the final destination may be necessary for later pick up and transport to the final destination. By using a plurality of UAV in synchronism may be advantageous since smaller UAVs may be used which is easier to handle and easier to use in a dense forest. Synchronization of a plurality of UAV for working together in transporting at least a portion of a ligno may be made through a base station and/or a master UAV. When it is determined that more than one UAV is needed, one of said UAV may be assigned a master role and the other UAV a servant role. The master role may be assigned to the UAV first approaching the portion of ligno to be transported or to a specific type of UAV. Alternatively, the plurality of UAV may be attached together for transport and the base station assigned one of them as a master and the other as servant UAV. Each and every UAV may communicate with each other and to the base station. In yet an alternative embodiment the base station is the synchronization unit, i.e., all UAV are assigned as servant UAV and follow one and the same instructions sent out from said base station.

In various example embodiments single UAV transportation may be prioritized before plurality of UAV transportation. This may be the case in an early stage of harvesting when the forest is still dense and there are lots of UAV available.

In various example embodiments transportation is based on total lift capacity of the UAV(s). A transportation optimization may in such case be based on the order the ligno should be picked up in order to minimize the clearing of a particular area. In various example embodiments only ligno having a predetermined ligno parameter should be prioritized before all other ligno parameters and/or growing conditions.

In various example embodiments a particular type of UAV, size and/or capacity may be used depending on at least on ligno parameter. In various example embodiments ligno parameters sent to said base station may allocate a particular type of UAV out of a UAV fleet which may make the transportation as effective as possible.

Ligno parameters may be detected by non-destructive evaluation, such as camera or optical sensors. Ligno parameters may also be detected by removing physical sample from the ligno and analyzing said sample. The removal may be in form of cutting drilling or sawing and predetermined amount of the ligno at a predetermined position. The analyzing may take place directly in the UAV or means attached to said UAV. Alternatively said analyzing may be made at a remote location from the ligno. Ligno parameter(s) may be detected by means attached to the same UAV which is used for transporting/harvesting the portion of ligno and/or by a human being prior to harvesting/transportation and/or by a land based remotely and/or autonomously controlled Unmanned Vehicle (100) and/or by means attached to a separate UAV only used for detecting tree parameters and/or growing conditions. In various example embodiments detection of ligno parameters and/or growing conditions may be made simultaneously and by separate means (UAV, human being, remotely and/or autonomously controlled Unmanned Vehicle) as harvesting and/or transportation in a particular area.

Instead of as in FIG. 4 delimbing and cutting the full ligno, said ligno may be harvested in sections starting from above and going down the trunk of the ligno. When a section of the ligno has been harvested, said means configured for harvesting at least a portion of a ligno 110 may be left on the still uncut portion, the stump, of the ligno while the UAV is transporting away the harvested portion from the original location of the ligno. A cutting position on a ligno trunk may be determined before arriving with means for cutting to a particular ligno, i.e., It may have been detected by a human or information may be taken from data storage. The cutting position may be determined during harvesting and/or transporting. In such case the determining of a cutting position may be made by means of at least one camera attached to the UAV. The cutting position may also be determined by a previous cutting position, i.e., when a ligno is first cut for producing a first harvested ligno trunk the second cut on said remaining ligno may be determined with respect to said first cut for producing a ligno trunk with a predetermined length. The remaining ligno may be a transported ligno, un unharvested ligno or a ligno laying on ground. A cutting position may also be selected to be within a predetermined interval of the ligno trunk. Said means for cutting a ligno may also be capable of debarking and/or delimbing a ligno trunk.

Delimbing means may be arranged on a top portion and on a bottom portion of said means configured for harvesting at least a portion of a ligno 110. By arranging said delimbing means on both sides of said means configured for harvesting at least a portion of a ligno 110 makes it possible to provide said means configured for harvesting at least a portion of a ligno 110 from above on the ligno or from root of said ligno. The delimbing means is provided at the front position with respect of the direction of movement of said means configured for harvesting at least a portion of a ligno 110.

In various example embodiments said means configured for harvesting at least a portion of a ligno 110 may be provided by said UAV directly on a portion of the ligno to be harvested where there are no limbs.

In various example embodiments said means configured for harvesting at least a portion of a ligno 110 may be dropped on the ground at or near the ligno to be harvested.

Figure 6:
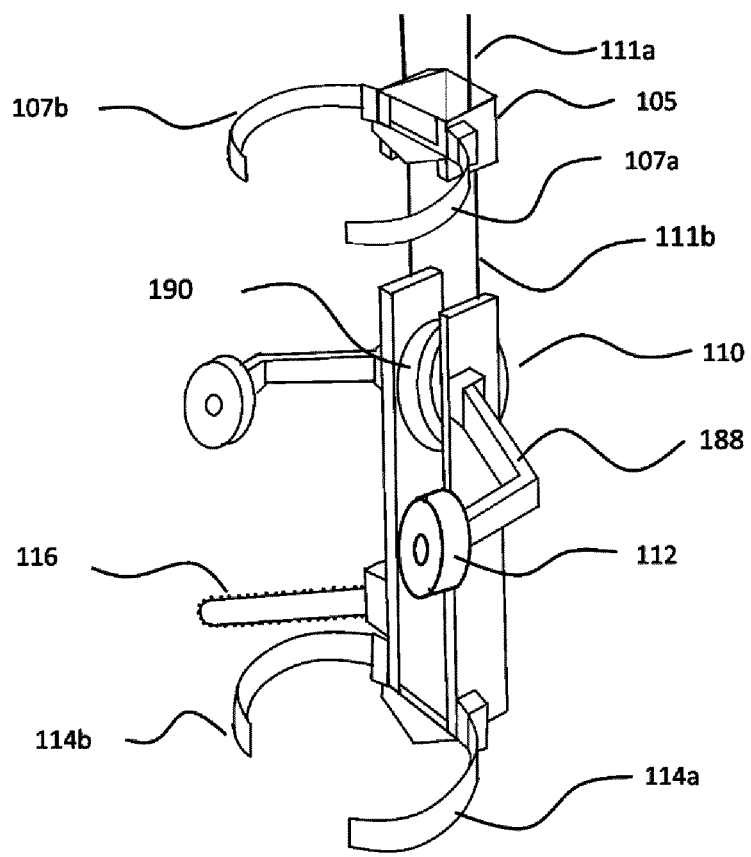
FIG. 6 depicts an example embodiment of a unit comprising a remotely and/or autonomously controlled means configured for harvesting at least a portion of a ligno and at least one means for gripping/holding said ligno trunk and FIG. 13-41 depict schematic pictures of various means for holding directly and/or indirectly at least a portion of a ligno trunk.

In FIG. 6 it is depicted a schematic picture of an example embodiment of said means configured for harvesting at least a portion of a ligno 110 and said means for holding said ligno 105. Said holding means 105 may be provided at a distance from said UAV 100, for instance via one or a plurality of wires 111*a*. The holding means 105 is in this example embodiment in the form of a first movable curved arm 107*a* and a second movable curved arm 107*b*. Said arms (107*a*, 107*b*) can be set to any position between a fully open position and fully closed position in order to allow to embrace a ligno trunk and also to grip and release the same. Said means configured for harvesting at least a portion of a ligno 110 comprises in FIG. 6 a first movable curved fixing/delimbing arm 114*a* and a second movable curved fixing/delimbing arm 114*b*. Said first and second movable curved fixing/delimbing arms (114*a*, 114*b*) may be set to any position between a fully open position and fully closed position in order to allow to embrace a ligno trunk and also to fixing the same. Said fixing/delimbing arms may have a sharp edge on its top portion and/or its bottom portion for delimbing the ligno as the means configured for harvesting at least a portion of the ligno moves along the trunk of said ligno. Said means configured for harvesting at least a portion of a ligno 110 also comprises a cutter 116. The cutter may be in the form of an electrically driven or internal combustion engine driven chain saw. The chain saw may be arranged movable in said means 110 in order to cut a ligno while said means is in a fixed position on said trunk of the ligno.

The delimbing means 114*a*, 114*b* may be optional. The holding means 105 may be provided at a distance from said means configured for harvesting at least a portion of a ligno 110. Said holding means 105 may be attached at said means configured for harvesting at least a portion of a ligno 110 with at least one wire 111*b* or at least one metal bar or other suitable attaching means. In various example embodiments said holding means 105 may be mechanically separable from said means configured for harvesting at least a portion of a ligno 110 meaning that the holding means may attached at a fixed position at the ligno while the means configured for harvesting at least a portion of the ligno may of its own motion move along the trunk of the ligno with no mechanical attachment to the holding means 105. The means for harvesting at least a portion of a ligno may cut a portion of a ligno and stay on the still not harvested portion of the ligno while said UAV is moving away with the harvested portion to another location. Delimbing may take place by said means configured for harvesting at least a portion of a ligno 110 while said UAV is moving away said harvested portion of the ligno. The UAV may return to the same ligno and remove yet another portion of it and said means configured for harvesting may stay on the not yet harvested portion or attach to the harvested portion or the UAV and move together with the UAV to another location. The holding means 105 and the means configured for harvesting at least a portion of a ligno 110 may communicate with each other and/or independently of each other communicate with the UAV and/or the base station 120. A camera may be used, attached either on said UAV or said may be used for means configured for harvesting at least a portion of a ligno 110, in order to simplify attachment of said UAV with said means configured for harvesting at least a portion of a ligno 110. The attachment of said UAV and said means configured for harvesting at least a portion of a ligno 110 may be a fully automatic process. Said means configured for harvesting at least a portion of a ligno 110 may have at least one electrically driven wheel 190 for allowing movement of said means configured for harvesting at least a portion of a ligno 110 along a trunk of a ligno. One or a plurality of supporting wheels 112 may be used for securing said means configured for harvesting at least a portion of a ligno 110 onto said trunk of said ligno and for reduce friction while moving along said trunk of said ligno. Said supporting wheel(s) may be arranged on arms 188 which may be movable in order to secure said means configured for harvesting at least a portion of a ligno 110 on said trunk of said ligno.

In various example embodiments said means configured for harvesting at least a portion of a ligno 110 may be made of two separable parts, a first part that is mainly configured for holding the ligno and a second part, capable of moving up and down along the trunk of the ligno, which can delimb and/or cut the ligno.

Said means for holding 105 may change its position onto said ligno trunk during cutting, delimbing, harvesting, transporting and/or debarking said ligno trunk.

A selection of lignos to be harvested may be made by harvesting all lignos within a predetermined area, every second ligno within a predetermined area, lignos of a particular type, lignos having a specific age, lignos having a specific length and/or lignos with a predetermined growing condition or similar.

In various example embodiments said means configured for harvesting at least a portion of a ligno 110 may be provided at or near the ligno to be harvested either by the UAV or by a land vehicle. Said means configured for harvesting at least a portion of a ligno 110 may of its own motion move towards a predetermined ligno to be harvested and arrange itself at a predetermined position on the trunk. An UAV may, before said ligno is cut, be arranged at a top position of said ligno and grip the trunk of the ligno on a position safe to lift the portion to be cut. Said means configured for harvesting at least a portion of a ligno 110 cuts the ligno and the UAV moves the harvested ligno away from the original location of the ligno. The harvested ligno has all of its limbs left on the ligno. Said means configured for harvesting at least a portion of a ligno 110 may follow the harvested ligno from the original location of the ligno or stay at the ligno stump.

In various example embodiments said means configured for harvesting at least a portion of a ligno 110 may be provided at or near the ligno to be harvested either by the UAV or by a land vehicle. Said means configured for harvesting at least a portion of a ligno 110 may of its own motion move towards a predetermined ligno to be harvested and arrange itself at a predetermined position on the trunk. An UAV may, before said ligno is cut, be arranged at a top position of said ligno and hold/grip the trunk of the ligno on a position safe to lift the portion to be cut. Said means configured for harvesting at least a portion of a ligno 110 first moves upwards the trunk of the ligno in order to delimb the same. Thereafter said means configured for harvesting at least a portion of a ligno 110 moves to a predetermined position and cuts the ligno. The UAV moves the harvested ligno from the original location of the ligno. The harvested ligno is delimbed. Said means configured for harvesting at least a portion of a ligno 110 may follow the harvested ligno from the original location of the ligno or stay at the ligno stump.

The system may comprise a plurality of UAV and a plurality of means configured for harvesting at least a portion of a ligno all of which may work together for efficiently harvesting ligno in a forest.

A plurality of UAV may work together synchronously for transporting a harvested portion of a ligno or a plurality of harvested ligno. This may be arranged so that a first UAV is a master UAV and at least a second UAV is a slave UAV. The master UAV may grip the ligno to be harvested at a predetermined position on its trunk. Said at least one slave UAV may be attached to said master UAV via wires. Said at least one slave UAV may be arranged at an elevated position with respect to the master UAV. A synchronisation unit makes sure the master UAV and the at least one slave UAV works in synchronisation with respect to movement and distance to each other. The synchronisation unit may be arranged in the master UAV or arranged in the control unit controlling said master UAV and said at least one slave UAV.

Instead of a single UAV gripping said portion of the ligno to harvest a plurality of UAVs may grip the same ligno to be harvested.

In various example embodiments of the present invention said UAV is designed to be capable of flying as to control position, velocity, orientation and rotational speed and via a rigid connection impart its motion to the means for cutting/delimbing said ligno. In this embodiment the UAV controls the movement of the means for cutting/delimbing said ligno.

In various example embodiments of the present invention the UAV may be used to reduce load on said cutting means 116 during cutting. This may be performed by first holding a predetermined portion of the ligno by said holding means 105 and thereafter apply a lift force by said UAV while cutting the ligno by the means for harvesting at least a portion of the ligno 110. This may be advantageous since a reduced load on the cutting means 116 from the weight of the ligno may increase the efficiency of the cutting procedure and/or require less power compared to cutting a ligno with the full load onto said cutting means 116.

In various example embodiments a separate land vehicle may be used with means for harvesting at least a portion of said ligno while the UAV is lifting the ligno. This may be advantageous since there is no load on the cutting means from the weight of the ligno which may increase the efficiency of the cutting procedure and/or require less power compared to cutting a ligno with the full load of the portion to be cut on said cutting means.

Figure 7:
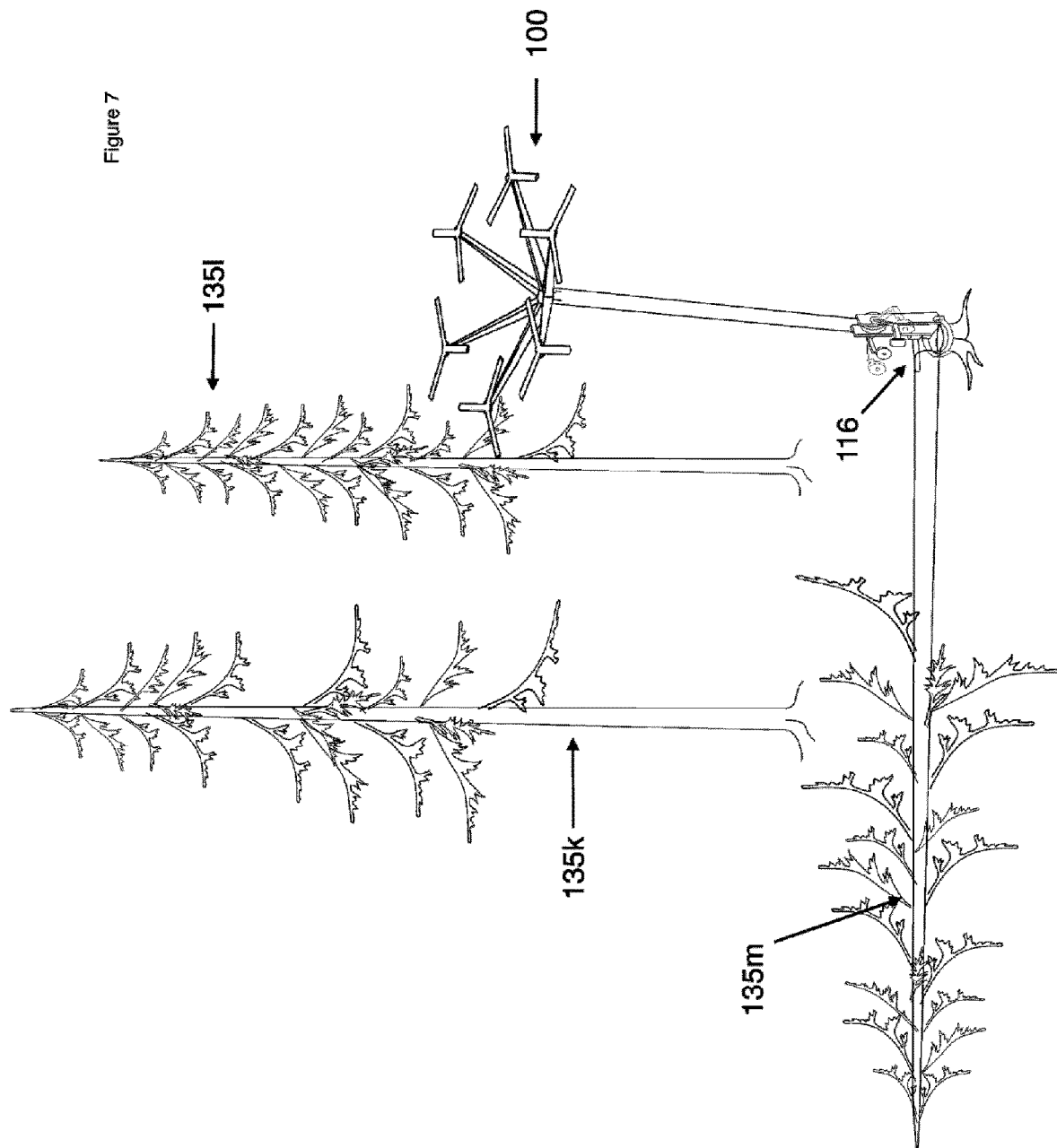

FIG. 7 depicts an UAV 100 with means for harvesting 110 or cutting at least a portion of a ligno. In FIG. 7 a ligno 135*m* is only cut with means for cutting 116. In various example embodiments the cut ligno may be with or without delimbing. The decision which ligno to cut may depend on several factors. It may depend on ligno parameters and/or growing conditions for ligno 135*k* and/or 135*l*. Those ligno may have a specific quality which may have been detected by ligno parameters and/or growing condition, which specific quality one wants to improve. The improvement may be achieved by cutting ligno 135*m* with means for cutting 116. With ligno 135 removed the economical growth value and/or growth potential of ligno 135*k* and/or 135*l* may be increased. Ligno 135*k* and/or 135*l* may have an increased growth potential after ligno 135*m* has been removed just because ligno 135*m* was too close to ligno 135*k* and/or 135*l*.

In another example embodiment ligno 135*m* is cut because ligno 135*m* has at least one ligno parameter and/or growing condition which may be inferior, for instance ligno 135 may be storm damaged and is cut for fertilizing and/or give more sunlight, water and nutrition to the remaining lignos 135*k* and/or 135*l*. In the depicted example embodiment in FIG. 7 the ligno is cut without being taken care of. It may be economically advantageous to fertilize remining trees with trees of low value. Cutting trees without taking care of them may also depend on nature conservation goals or to fulfil environmental certification where some trees must be left on ground for favouring other living species.

Figure 8:
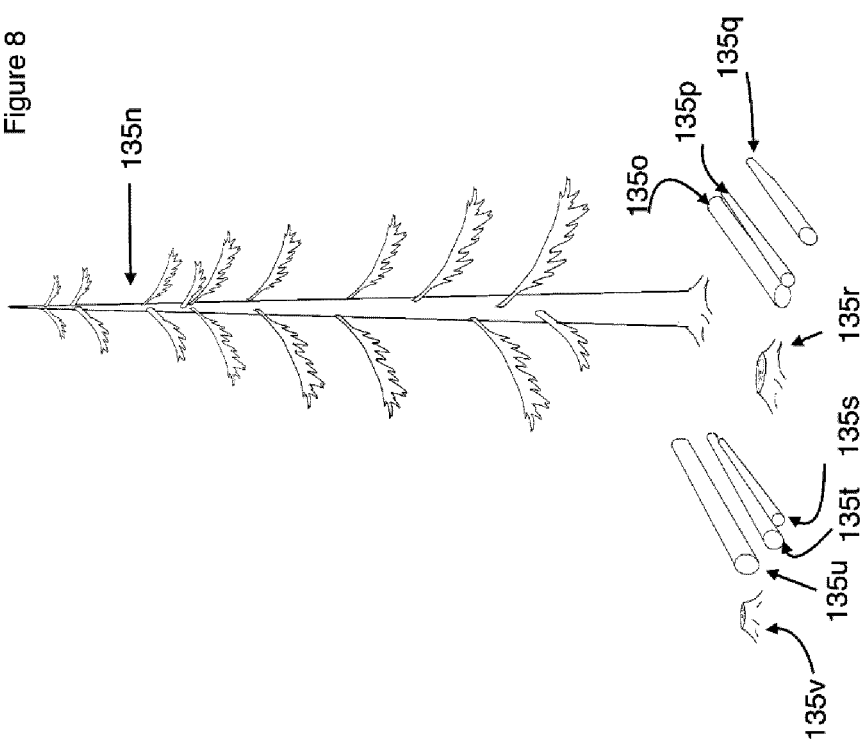

FIG. 8 depicts tree ligno, whereof one 135*n* is not harvested while the other two has been cut down and cut in portions. The three ligno may have different ligno parameters and/or growing conditions, which may have determined which of the ligno to be cut down and how the ligno is cut in portions. Ligno 135*o*, 135*p*, 135*q* and remaining ligno 135*r* are portions of a first harvested ligno. Ligno 135*s*, 135*t*, 135*u* and remaining ligno 135*v* are portions of a second harvested ligno. The different portions of said first and second harvested ligno may have different ligno parameters, i.e., different portions of a single ligno may have varying ligno parameters. Said first and second harvested ligno may have been harvested by a UAV and/or by a land going harvesting equipment. If said first and second harvested ligno has been harvested by an UAV, it may be advantageous to leave said first and second harvested ligno on the ground as an intermediate storage location for later transportation to another location when it is more logistically advantageous. The reason for not transporting away a ligno from its original location immediately after having cut it down may depend on limited storage capacity at a nearby forest road. Harvesting can either be made with UAV and/or land based harvesting machines. Ligno parameters may be detected during harvesting by means attached to the UAV and/or the land based harvesting machine. For instance, when ligno 135p is harvested it may give indirect information about weight and other ligno parameters of ligno 135o and/or ligno 135q. Ligno parameters of for instance a top scrap portion of a ligno may determine if the remaining portion of the ligno should be transported when harvested or be cut and stored at its original location for transportation at later point in time. Annual rings in 135r may be detected with a camera and give information about ligno parameters for the other portions 135o, 135p, 135q.

In various example embodiments ligno parameters and/or growing condition for ligno 135n may give indication of the quality of ligno 135o, 135p, 135q, 135s, 135t, 135u. Ligno parameters and/or growing condition from ligno 135n may determine the priority of harvesting and/or the order of transportation and/or the final destination for ligno 135o, 135p, 135q, 135s, 135t, 135u.

In various example embodiments information about ligno parameter and/or growing condition for ligno 135o, 135p, 135q, 135s, 135t, 135u may be stored digitally during harvesting. Such digitally stored information may not be visible on the harvested portions 135o, 135p, 135q, 135s, 135t, 135u, but may be stored together with coordinates in three dimensions. The digitally stored information may determine which quality the different portion may have and when, in time, said different portion shall be transported. In various example embodiments harvesting and transportation may be made at different times due to ground condition, wet, snow etc or other temporary weather conditions.

Information about ligno parameters and/or growing condition which is detected during harvesting may be performed by a land-based machine and/or a UAV, may be used for determining the number of UAV needed for lifting the ligno portions 135o, 135p, 135q, 135s, 135t, 135u.

Figure 9:
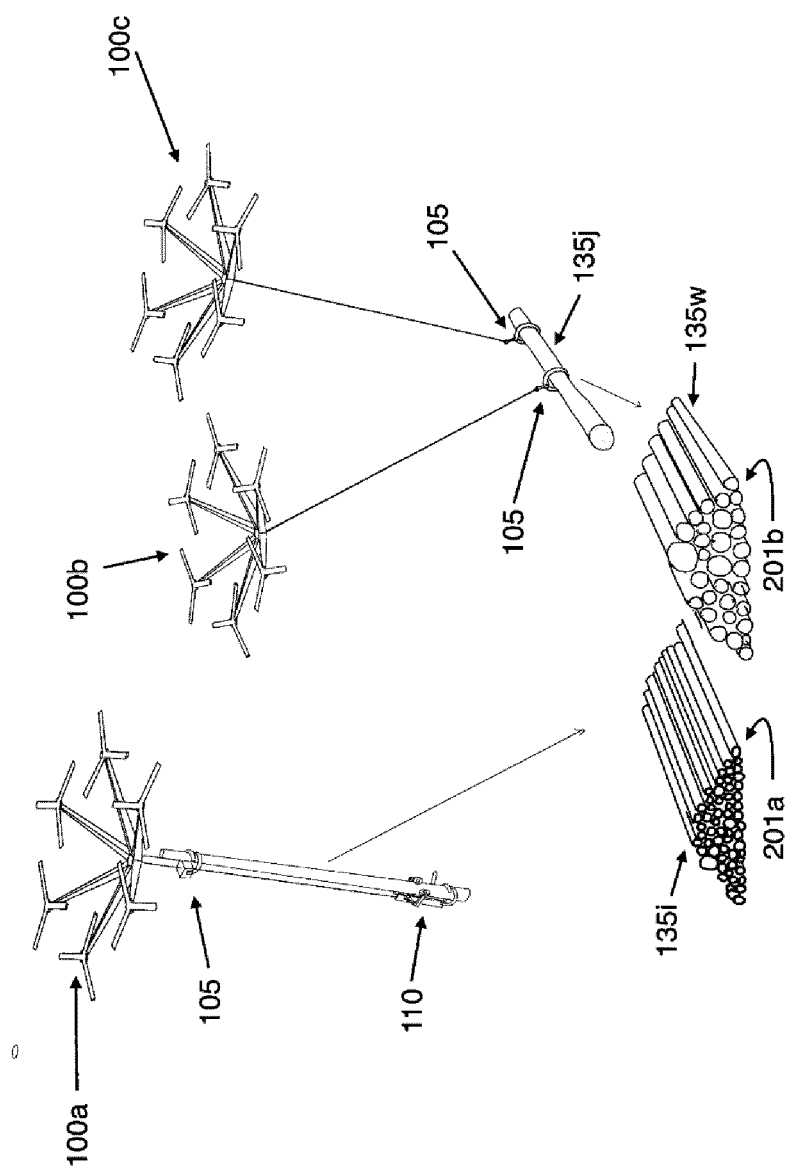

FIG. 9 depicts transportation of ligno with at least one UAV to different storage locations 201a, 201b. Storage location 201a has a first ligno quality (first set of ligno parameters and/or growing conditions) and storage location 201b has a second ligno quality (second set of ligno parameters and/or growing conditions). A weight of a specific portion of a tree may be estimated based on information about a ligno average diameter length and volume.

The UAV 100a may have harvested ligno in pile 135i at location 201a. Ligno in pile 135i at location 201b may have lower weight than ligno in pile 135w. Ligo in pile 135w may require two UAV, 110b, 110c, for transportation of each individual ligno due to its weight.

The UAV 100b has a first means 105 for holding the ligno 135j and said UAV 100c has a second means 105 for holding the same ligno 135j. As indicated in FIG. 9, attachment point for holding means 105 for UAV 100b is different than attachment point for holding means 105 for UAV 100c. Based on ligno parameters and/or growing condition a location for storage of different portions of ligno is determined. Different number of UAV may be necessary for lifting different ligno depending on ligno weight, max lifting capacity for UAV may determine the number of UAV necessary for transportation.

Figure 10:
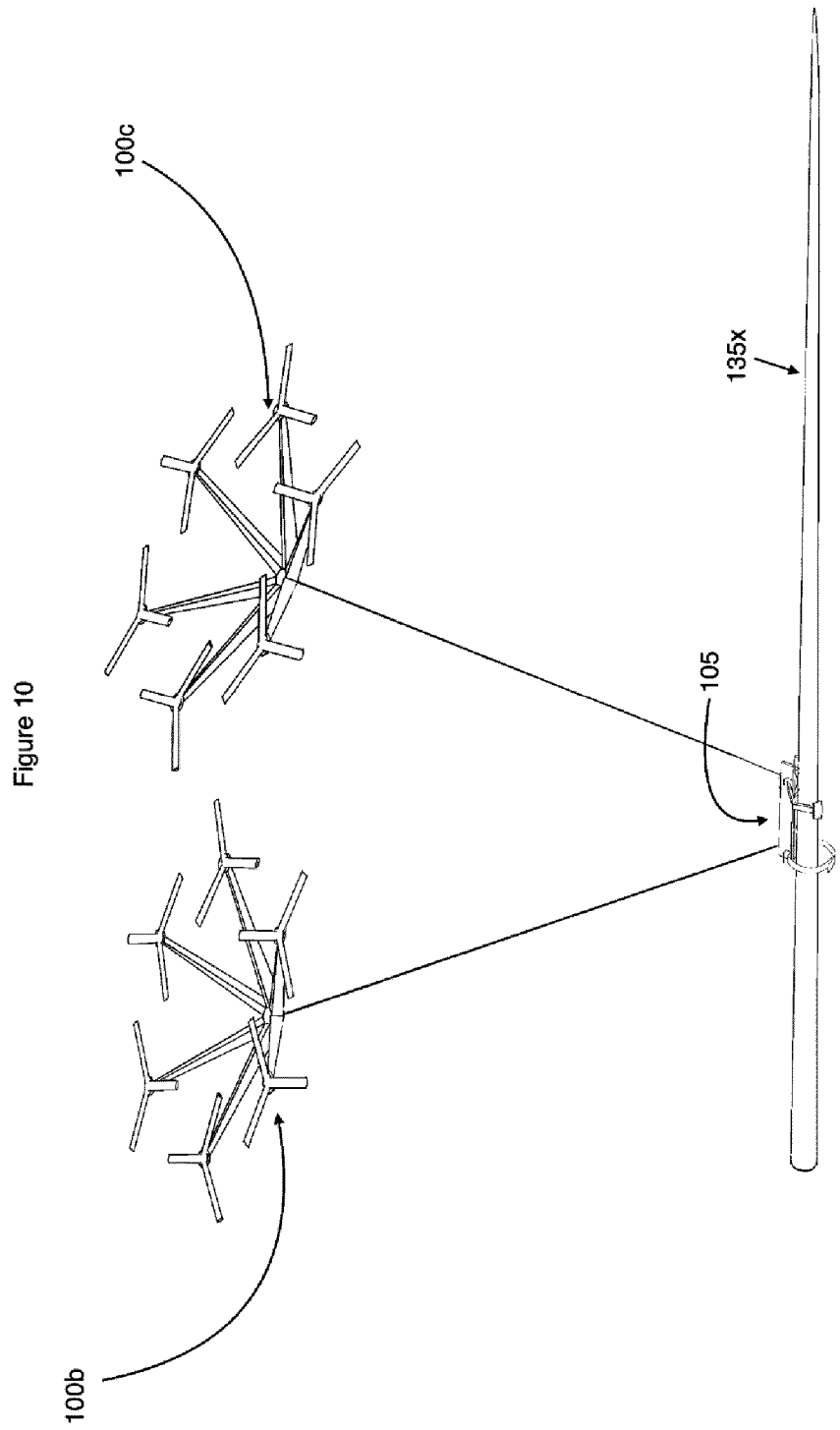

Two or more UAV 100b, 100c may, as depicted in FIG. 10, use a common means for holding 105 the ligno 135x and transporting said ligno 135x in synchronism to a final destination. Using a common means for holding the ligno may increase the load capacity.

Figure 11:
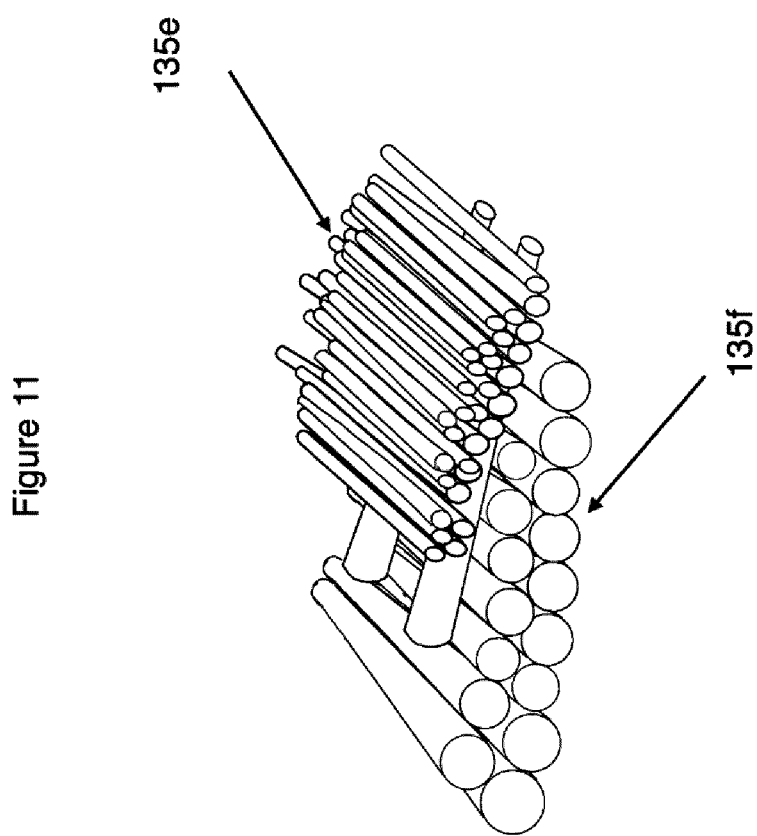

FIG. 11 depicts ligno of different quality stored at a common destination. Ligno 135e and ligno 135f have different ligno parameters, in this case diameter, volume and weight is different, meaning that ligno 135e has a lower value than ligno 135f. In FIG. 11 ligno 135e is on top of ligno 135f, meaning that ligno 135e was arrived earlier to the common destination than ligno 135e. Ligno parameters has in this case determined that higher value ligno 135f has arrived earlier to the common destination than the lower value ligno 135e. Although a common destination is used for different value ligno and no marking has been made further transportation of the different ligno types 135e, 135f may be easily separated due to its evident difference in size and shape. The common destination may not only be tagged with longitude and latitude but also its spatial location, height, in the pile. Transportation from the common destination may be made in different time slots so that different transportation means may select the correct ligno for further transportation. Storing different types of ligno spatially differently at a common destination may be advantageous logistically due to the fact that different quality of ligno may have different final destinations.

FIG. 12 depicts that different classes of quality of ligno may be transported to the same location but at different points in time during a day. Ligno 135h of a first mix of ligno parameters and/or growing condition is transported to common destination 201 at a first time 202b. ligno 135h is picked up for further transportation before ligno of a second mix of ligno parameters and/or growing condition arrives at said common destination 201. Ligno 135g arrives at time 202a, which is later than 202b. Using a common destination may be necessary when space is limited.

A certain point in time may be a specific time, a specific time range, between time A and time B, after time B or before time A. A certain point in time may be before or after a specific occasion or that specific requirements are fulfilled. It can also mean that specific ligno, based on ligno parameters and/or growing condition may be transported, cut, harvested and/or left at a final destination when specific requirements are fulfilled. It may also mean that specific command, functions or the like is activated and when such commands or functions are activated, transportation, cutting, harvesting and/or drop of ligno at a final destination is started based on ligno parameters and/or growing condition in a specific order. It may also mean when specific requirements are fulfilled transportation is always or never started for a specific ligno parameter and/or growing condition. Ligno may mean at least a portion of a tree, bush, or other wood-like species such as bamboo. A ligno may be cut with or without delimbing.

A certain point in time may be the moment when directing a UAV to a predetermined destination for harvesting, transportation and/or cutting and/or delivery of ligno at a predetermined location. Harvesting, transportation, cutting and/or leaving functions as a trigger for setting a speed and/or acceleration of a UAV with or without load in a predetermined direction to a predetermined destination. A certain point in time may be when a predetermined capacity per hour is reached, e.g., a predetermined harvested amount per hour is reached, a predetermined amount of ligno per hour is transported and/or a predetermined amount of ligno per hour is cut. Said capacity and/or speed may be controlled or optimized based on weather condition, detected ligno parameter, detected growing condition, transporting distance, power consumption and/or logistic prerequisites. A certain point in time may be a capacity such as a cut area or length per second, or number of cut trees, it can be mean, median or fastest or slowest.

A certain point in time may be, for both selection of a ligno and selection of a final destination, at which time different portions of a ligno is to be transported, harvested, cut and/or delivered.

A certain point in time may be a targeted point in time and/or an estimated/predicted (based on simulations) point in time. A targeted point in time may mean that transportation, harvesting, cutting and/or delivering is intended to happen a certain point in time. An estimated/predicted point in time may mean that transportation, harvesting, cutting and/or delivering is expected to happen a certain point in time.

A final destination may be a place or position where the ligno is expected to be delivered. The final destination may be a position in air where the ligno is dropped from the UAV to the ground.

In various example embodiments the UAV is configured with aerodynamic means, comprising rotors, fans, wings, or equivalent combination, interacting with the air so as to be capable to precisely control the UAV position, velocity, orientation and/or angular velocity.

A ligno trunk may have a length above 2 m and/or a diameter larger than 10 cm and/or a weight larger than 10 kg. I various example embodiments the weight of the ligno trunk is larger than 50 kg. In various example embodiments the weight of the ligno trunk is larger than 100 kg. In various example embodiments the length of the ligno trunk is larger than 3 m. In various example embodiments the diameter of the ligno trunk is larger than 20 cm. In various example embodiments the diameter of the ligno trunk is larger than 30 cm.

Figure 13:
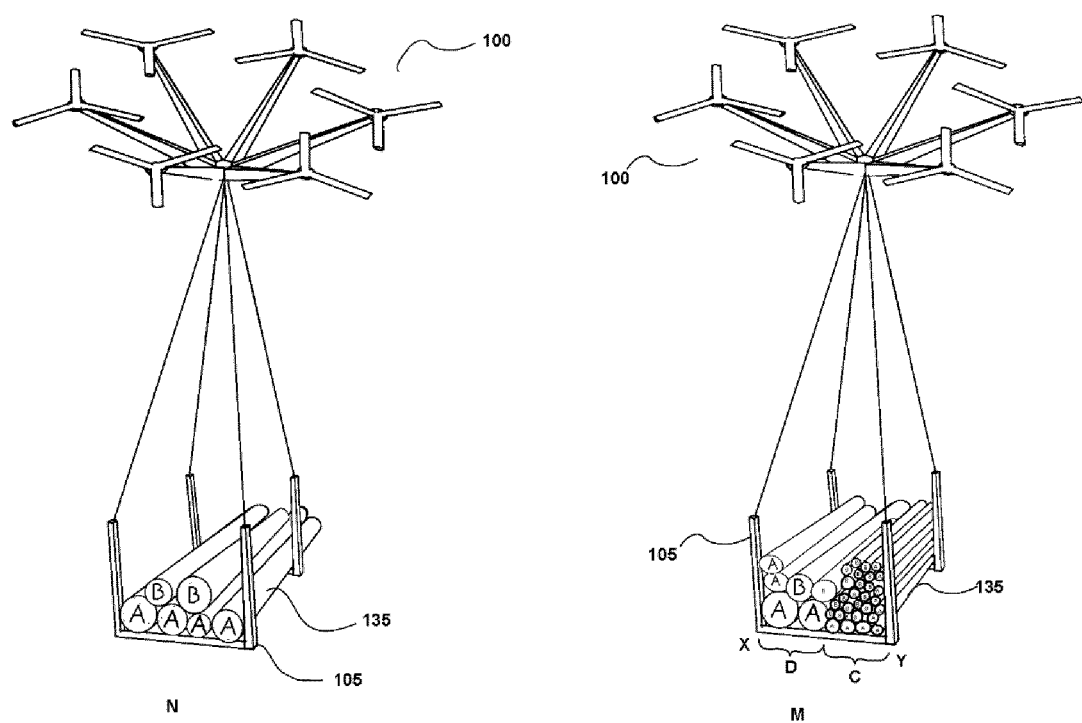

FIG. 13 depict an example embodiment of a means for holding 105 directly and/or indirectly onto at least a portion of a ligno trunk 135. In FIG. 13 a plurality of ligno trunks 135 are held by said means for holding 105. Ligno trunks 135 denoted with A are directly in contact with the means for holding 105 whereas ligno trunks 135 denoted with B are only indirectly in contact with the means for holding 105. Ligno trunks B are held by ligno trunks A. Ligno trunks B are only touching ligno trunks A whereas ligno trunks A are touching the means for holding 105 and ligno trunks B. Heterogenous ligno trunks may be arranged for optimizing, weight distribution and/or load capacity. Stacking of ligno trunks in the means of holding 105 in FIG. 13 may be based on ligno parameters and/or growing condition. The stacking of ligno trunks 135 in means for holding 105 may also be based on the final destination of the individual ligno trunks 135, i.e., ligno trunks 135 to be delivered first on top of the stack and ligno trunks 135 to be delivered later further down in the stack of ligno trunks 135. Said means for holding may have a first type of ligno trunks and/or ligno trunks to be delivered a first point in time to the left in said means for holding 105 and a second type of ligno trunks and/or ligno trunks to be delivered a second point in time to the right in said means for holding. The means for holding may together with stacked ligno trunks form a new type of means for holding.

Figure 14:
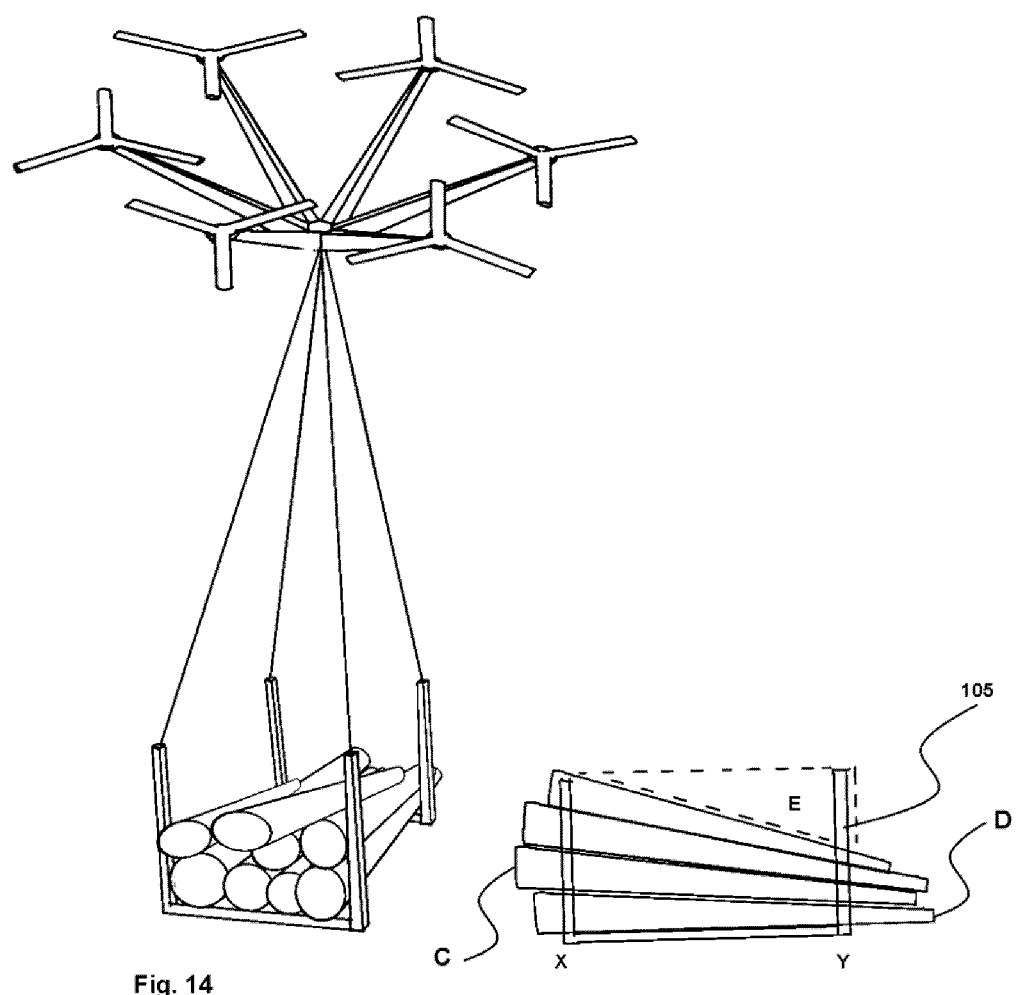

FIG. 14 depicts an example embodiment of a non-optimal stacking of ligno trunks. In FIG. 14 the load of ligno trunks is heavily skewed. Ligno trunks with its large diameter C are all arranged to the same end X of the means for holding 105 whereas the smaller diameter D are arranged to the other end Y. This skewed stacking may not only result in a non-optimal weight distribution but also in a non-used load capacity volume E.

Figure 15:
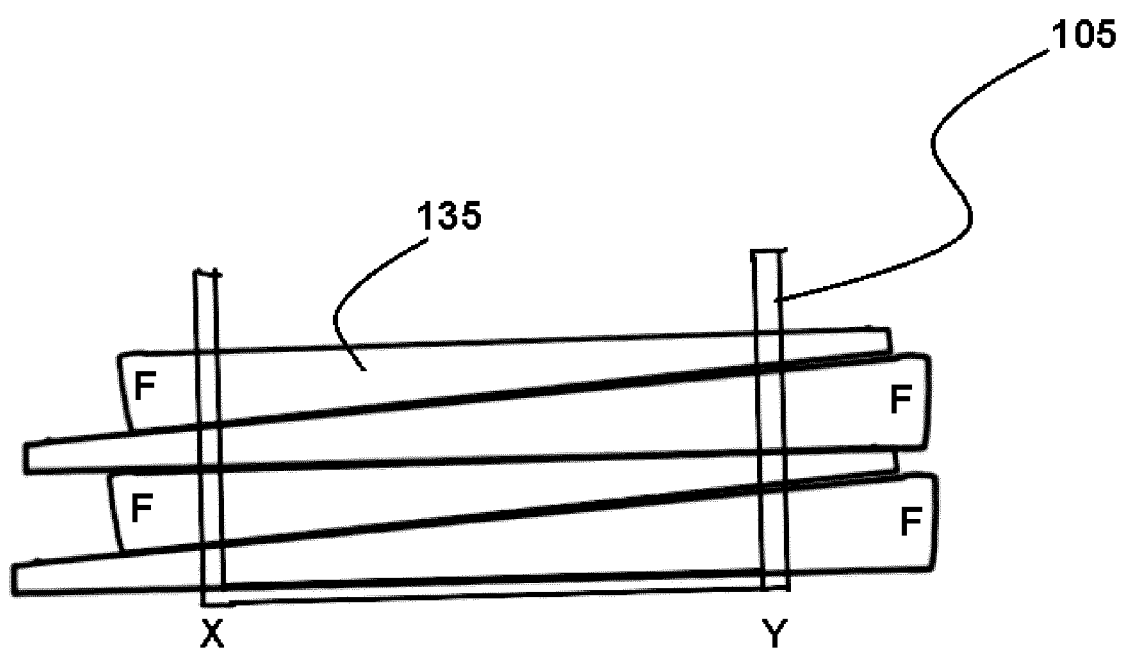

FIG. 15 depicts a more efficient stacking of ligno trunks 135. Here every other ligno trunk is having the large end F to a first end X and second end Y of the holding means 105. Ligno parameters and/or growing conditions may be used for optimizing the stacking for achieving a desired weight distribution and/or load of ligno trunks 135.

Figure 16:
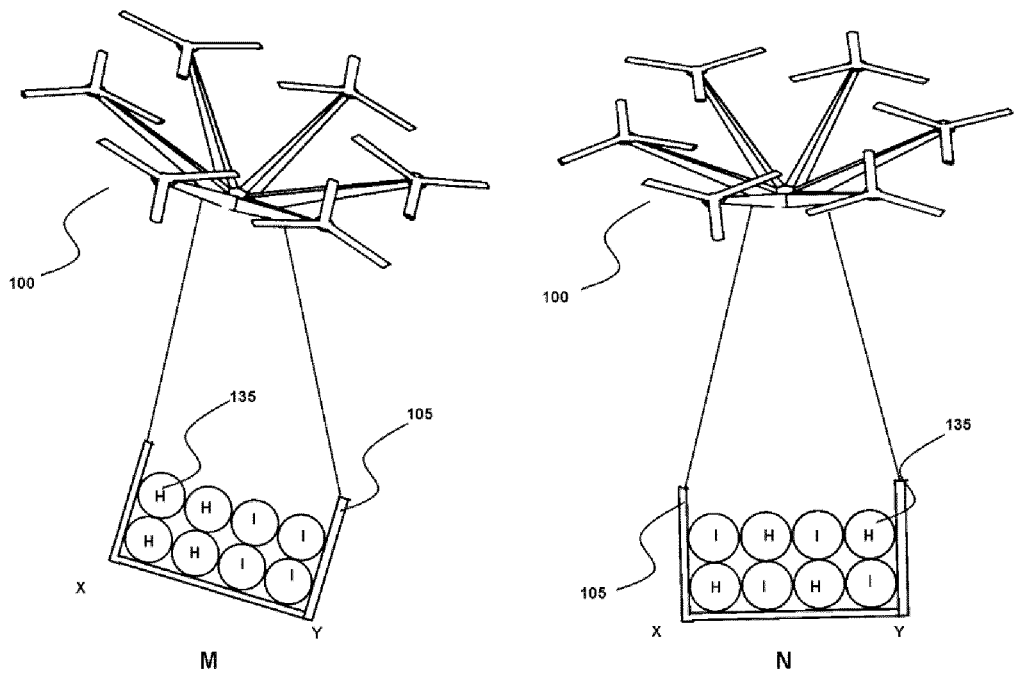

FIG. 16 depicts an example embodiment of stacking of ligno trunks 135 having essentially homogenous shape but of different density. In case of stacking the means for holding 105 with high density ligno trunks I towards Y and low density ligno trunks H towards X, said means for holding 105 will tilt in a clockwise direction due to the uneven weight distribution, see FIG. 16M. Taking into account ligno parameters and/or growing condition a more efficient stacking may be achieved with a desired weight distribution by mixing the position of high and low density lignos 135 in the means for holding 135, se FIG. 16N.

Figure 17:
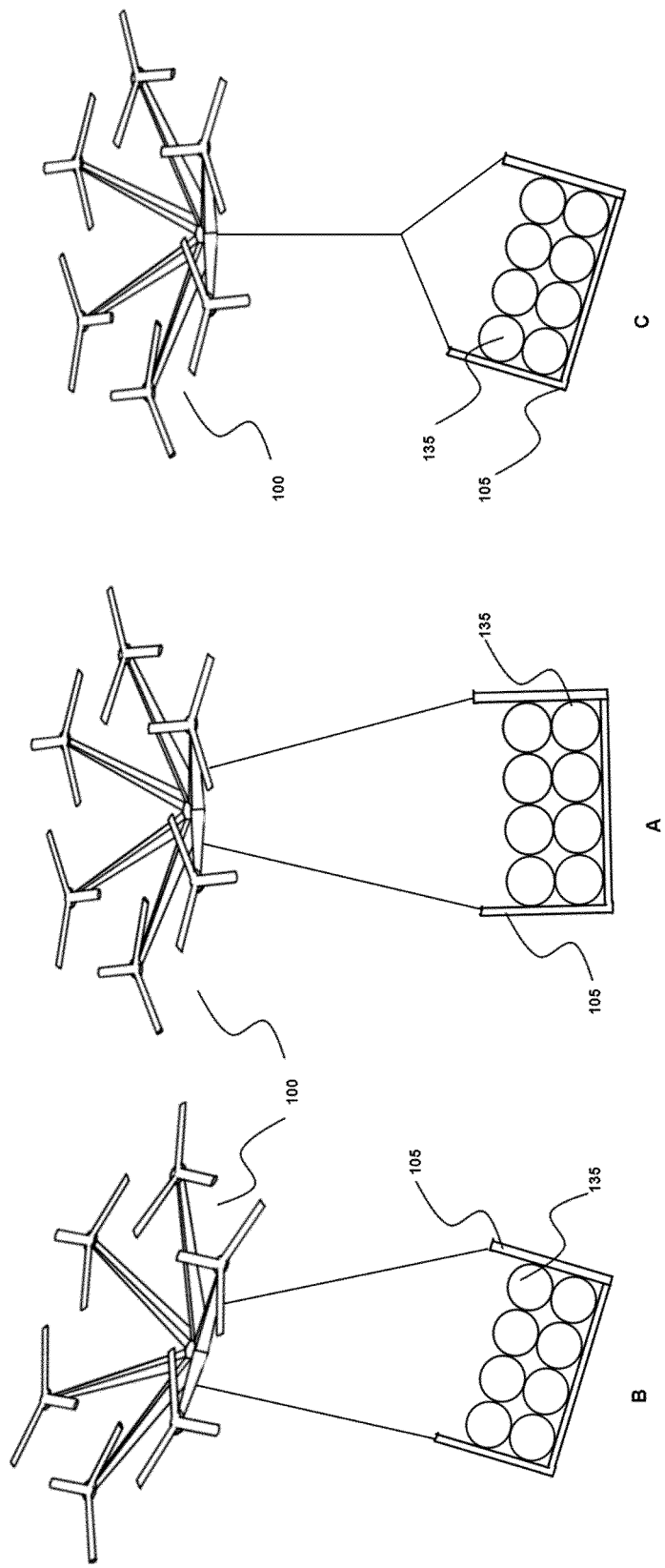

FIG. 17a-c depicts three different load scenarios. In FIG. 17a there is an even weight distribution of ligno trunks 135 resulting in a means for holding 105 in an essentially horizontal direction with respect to ground. In FIG. 17b there is an uneven weight distribution of ligno trunks 135 and due to the type of attachment of the UAV 100 to the means for holding 105, both UAV and the means for holding 105 are tilted out of an horizonal plane. In FIG. 17b the attachment means between the UAV 100 and means for holding 105 are provided on the outskirts of the means for holding 105 and out of a center of gravity of said UAV. The attachment means may be in the form of metal wires, metal rods, ropes or similar means. In FIG. 17c the weight distribution of ligno trunks 135 is uneven and due to the attachment of the means for holding 105 to a centre of gravity of said UAV 100, the UAV 100 may remain untilted while the means for holding 105 may be tilted.

Figure 18:
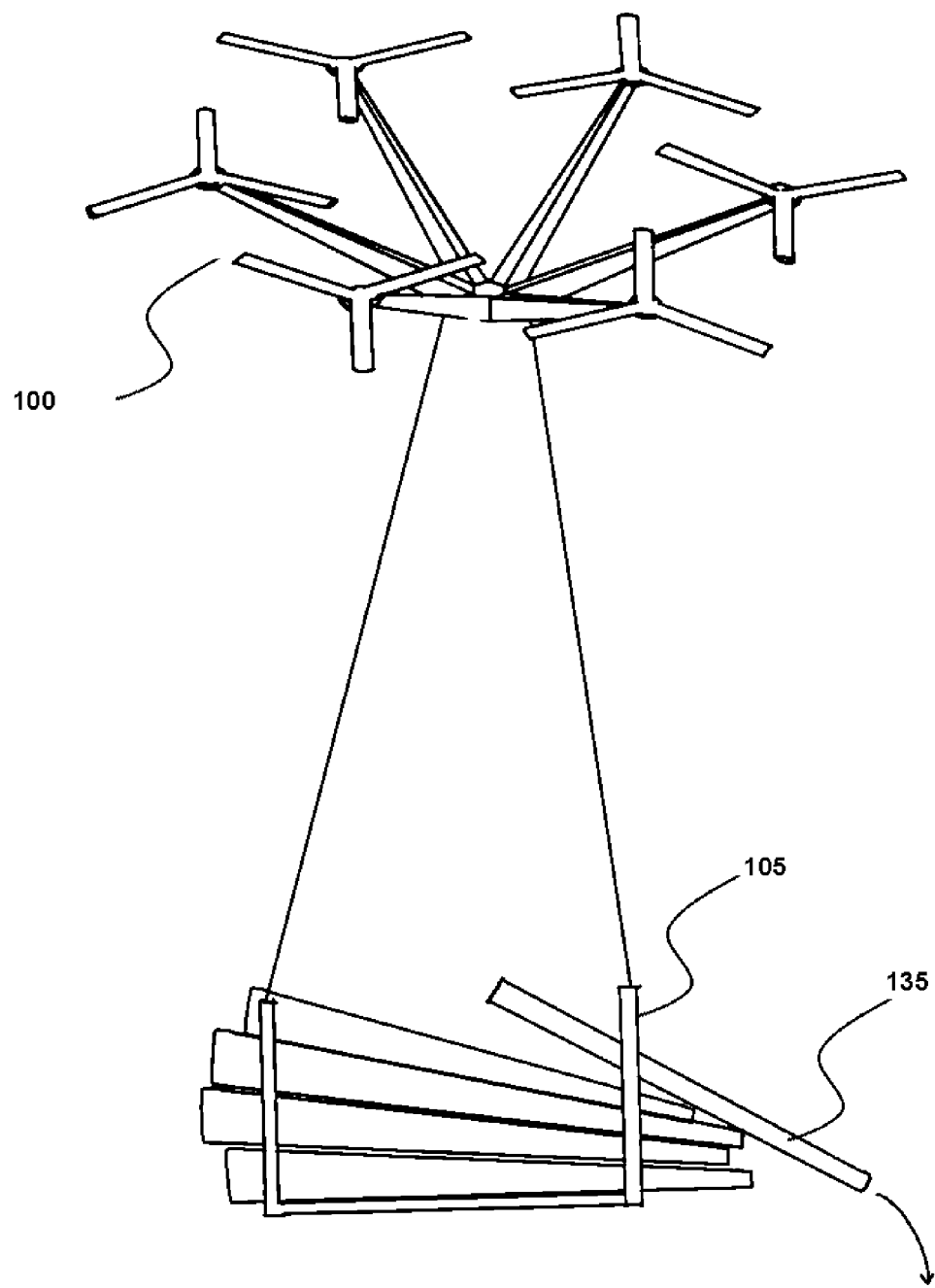

FIG. 18 depicts a possible scenario with a tilted means for holding 105 where ligno trunks 135 in said means for holding 105 risking to drop from the means for holding 105 due to its tilted position. Ligno trunks 135 may drop from the means of holding 105 in windy transportation conditions or slippery ligno trunks 135.

The load capacity may be alterable due to the weight of the ligno trunks. A first support member and a second support member may be rotatable with respect to each other around a rotation point. The first support member may be attached with its top end to the UAV 100 and the second support member may be attached with its top end to the UAV 100. When the volume of the load and/or the weight of the load in said means for holding varies the load capacity may vary within a predetermined load range.

Figure 19:
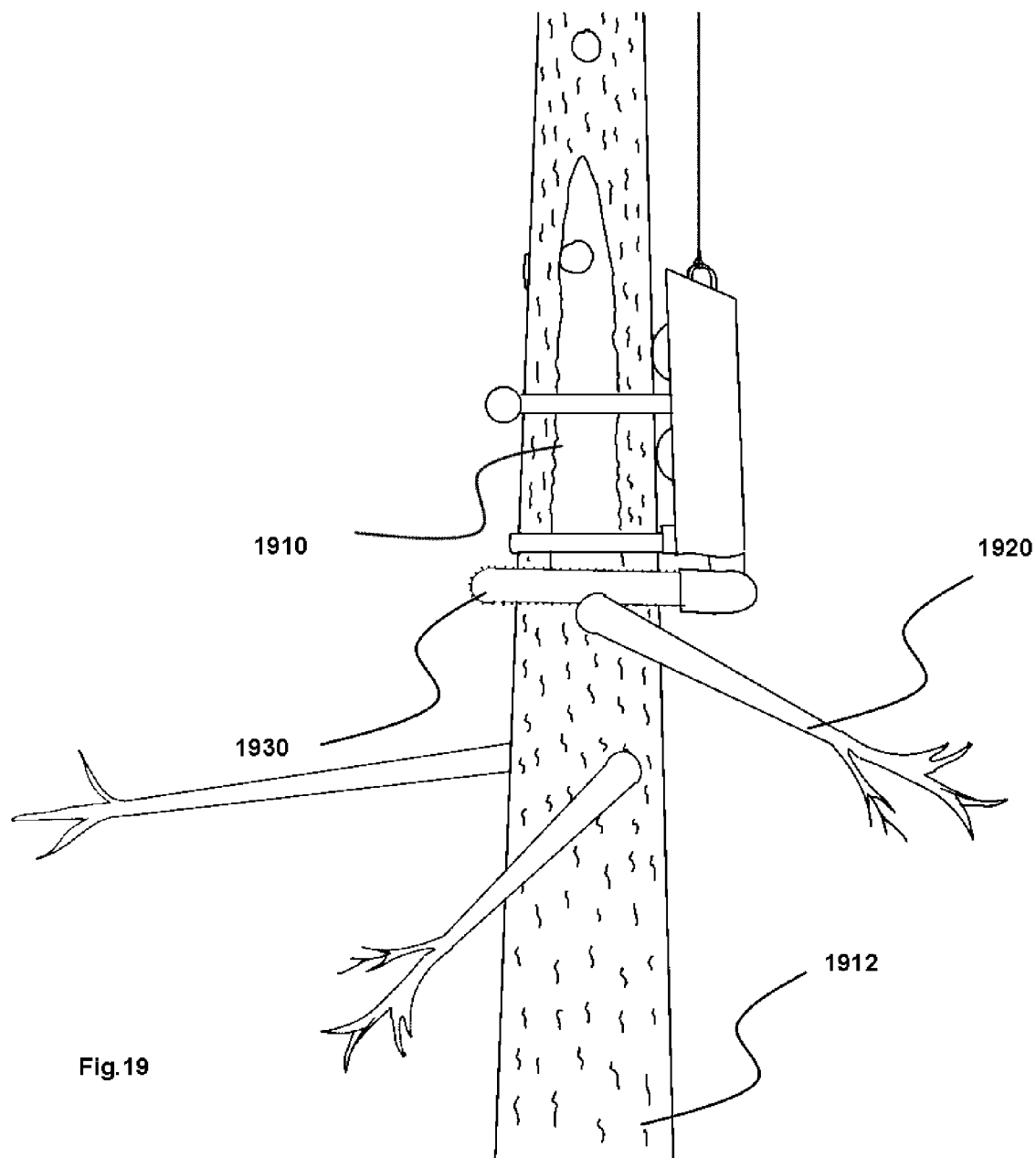

FIG. 19 depicts a means for cutting 1930 delimbing and debarking a ligno which has a hollow inner portion 1910 which may be caused by insect infestation, fungis, age or similar. By debarking a tree not only the tree will die but also most likely the insects causing the insect infestation. Means for delimbing and means for debarking may be one and the same tool or different tools.

Figure 20:
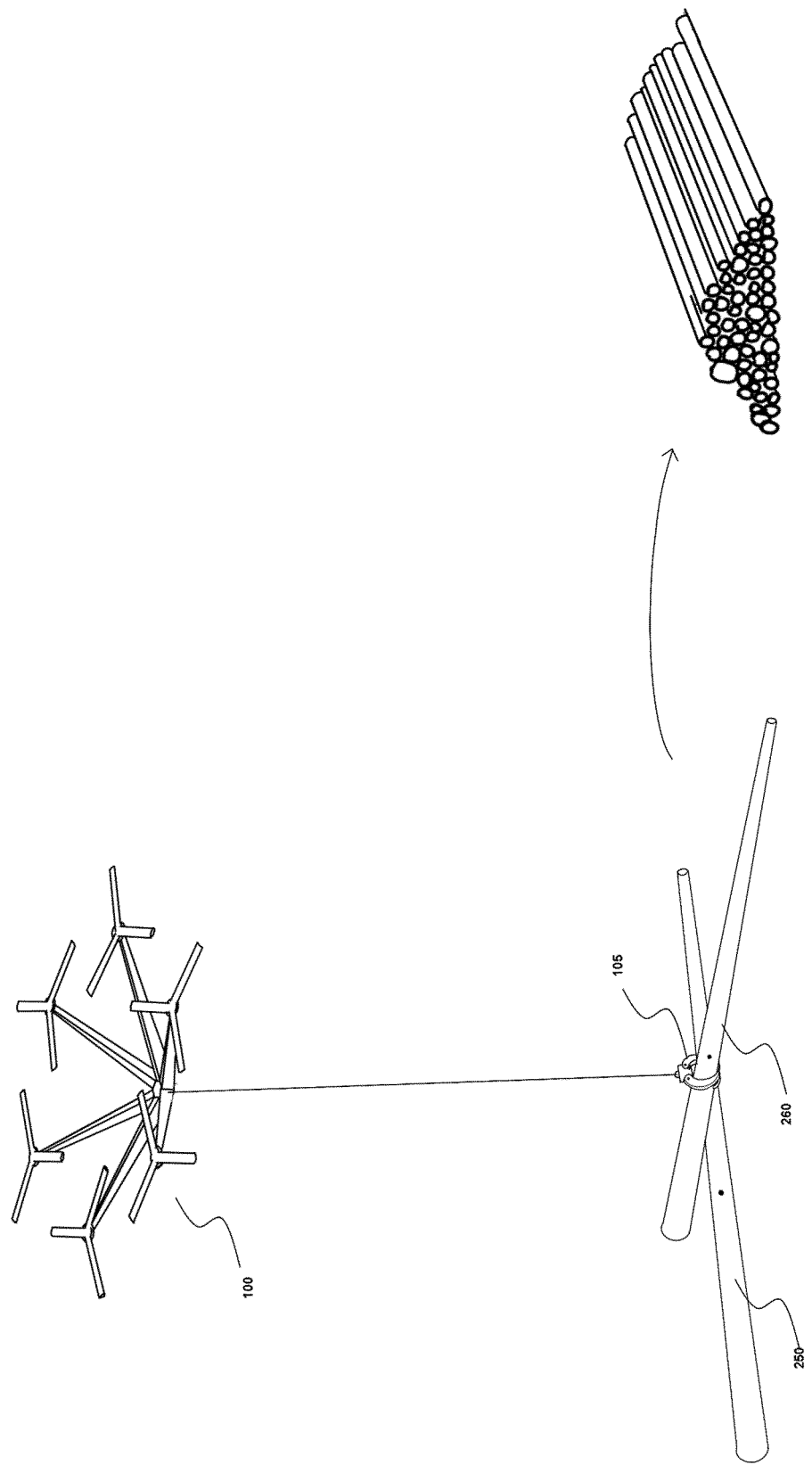

FIG. 20 depicts a possible scenario with a single holding means 105 holding two ligno trunks 250, 260. Here the ligno trunks are non-parallel with each other causing a relatively high air resistance. The relatively sprawling load of ligno trunks 150, 260 may be a result of a single holding position of said means for holding in combination with a lifting said ligno trunks 150, 260 out of their own and/or combined centre of gravity.

Figure 21:
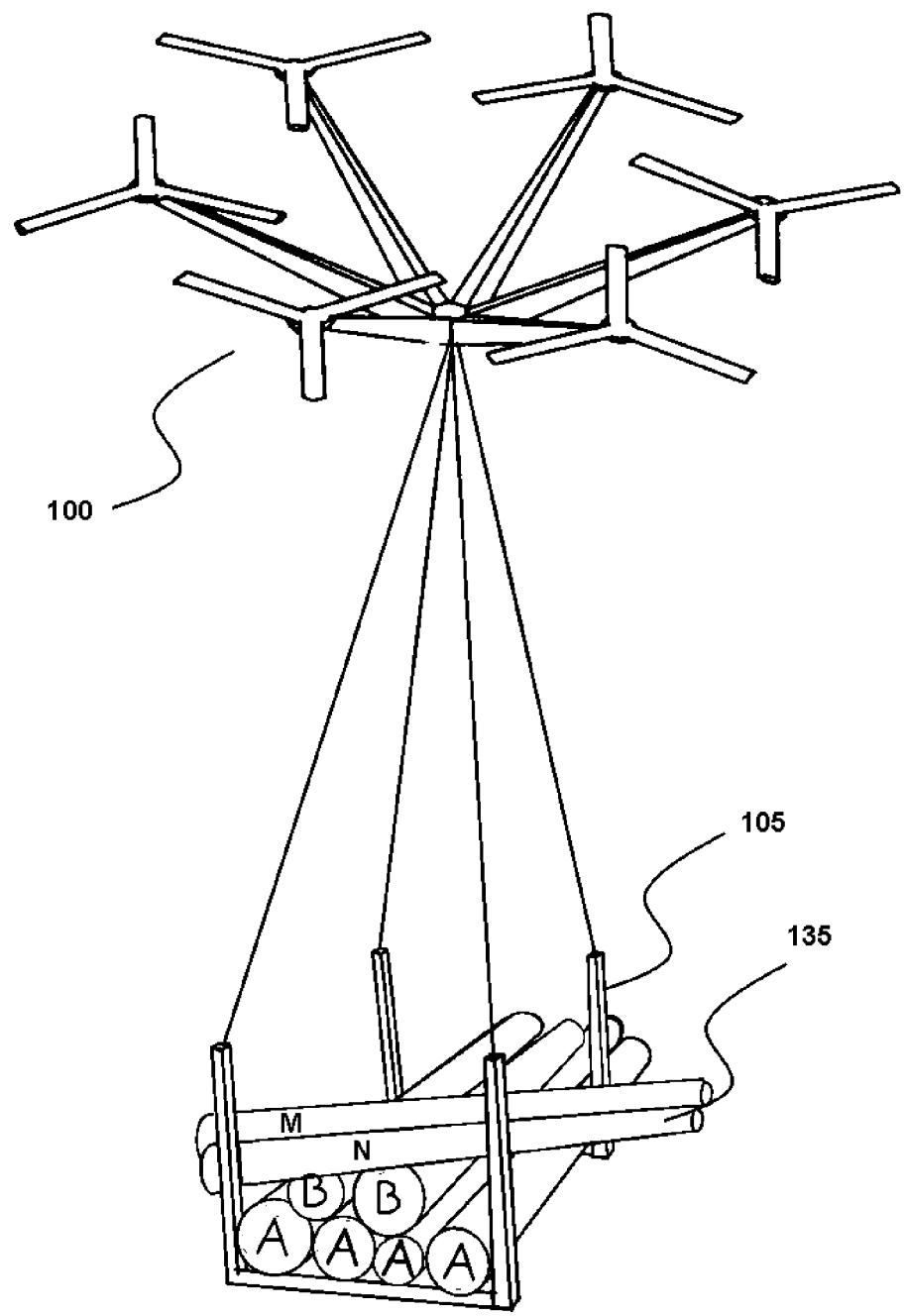

FIG. 21 depicts a possible scenario with a fixed volume holding means 105 and a plurality of ligno trunks 135 as a load. With ligno trunks 135 arranged irregularly in the means for holding 105 may cause transportation difficulties due to a risk of irregularly ligno trunks being jammed in other trees in the forest. Another problem with an irregular arranged load of ligno trunks is the larger air resistance it may create which may increases the risk of drop of ligno trunk(s) in heavy winds and/or unstable transportation. In FIG. 21 ligno trunks A and B are provided in said means for holding 105 in such a way that any ligno trunks protruding from said means of holding 105 is taking place in a predetermined direction. However, ligno trunks M and N are provided in said means for holding 105 in an irregular manner with respect to ligno trunks A and B and any protruding of ligno trunks M and N may take place in any direction. Ligno trunks M and N may risk to drop of said means of holding 105 in case of said means of holding and/or said ligno trunks M and/or N are touching any object during its transportation or if there is a windy condition during transportation.

Figure 22:
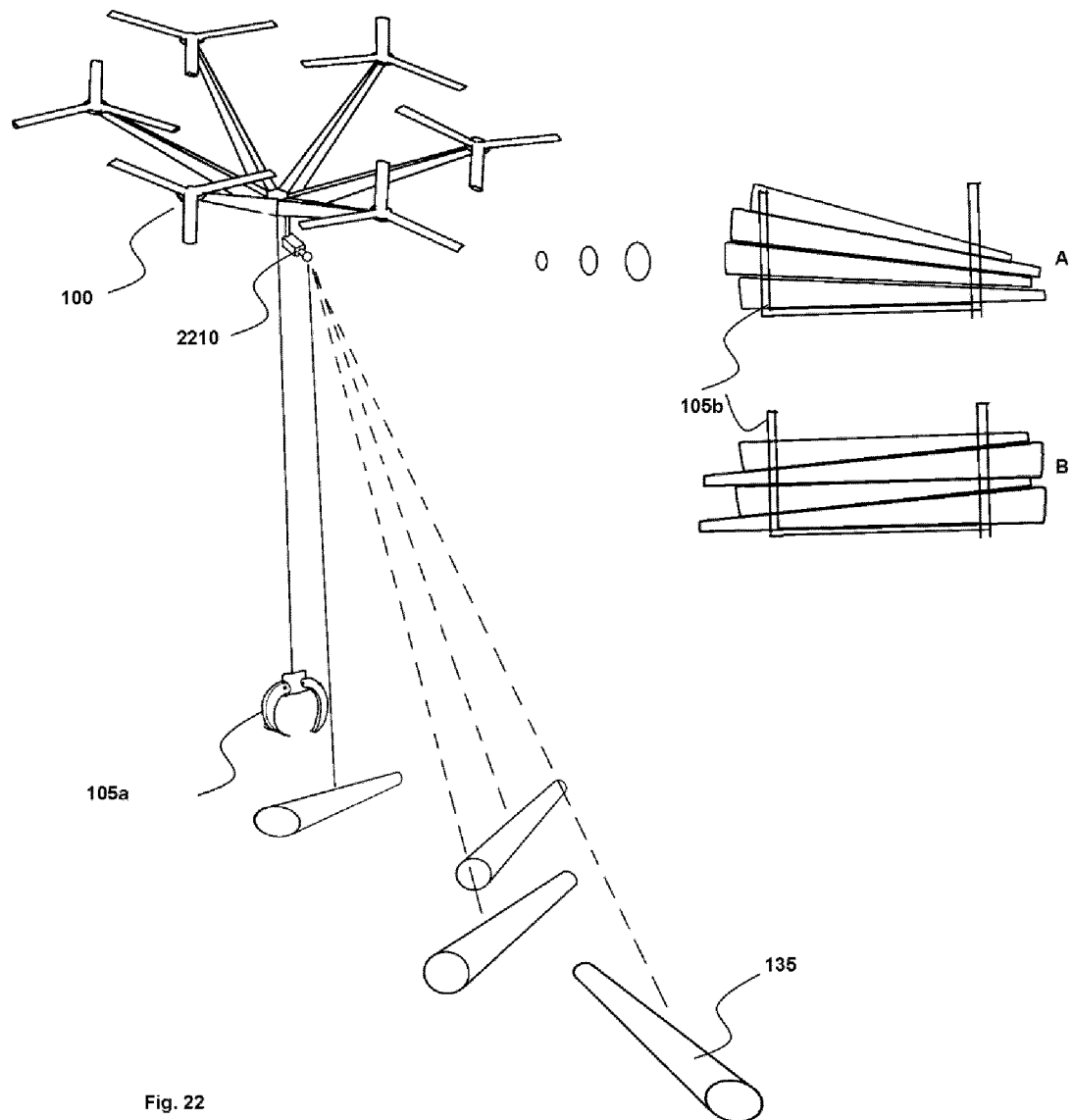

FIG. 22A depicts a load of ligno trunks with an uneven weight distribution. This may be created by arranging all of the ligno trunks with its large end diameter in the same direction in said means of holding 105. FIG. 22B depicts a load of ligno trunks with an even weight distribution. This may be created by arranging some of the ligno trunks with its large end diameter in a first direction and the remaining ligno trunks with its smaller diameter in the same direction. The arrangement of ligno trunks may be planned by using ligno parameters and/or growing conditions of the ligno trunk(s). A camera 2210 provided on said UAV 100 may for instance be used for determining how to grip a first ligno trunk 135 so that its geometry in known already before the gripping moment. Any information of how said first ligno trunk is held by holding means 105 attached to said UAB 100 may later be used for providing said ligno trunks another holding means and or gripping a second ligno trunk with the same holding means as holding said first ligno trunk for creating an even weight distribution of a combined load of said first and second ligno trunks.

Figure 23:
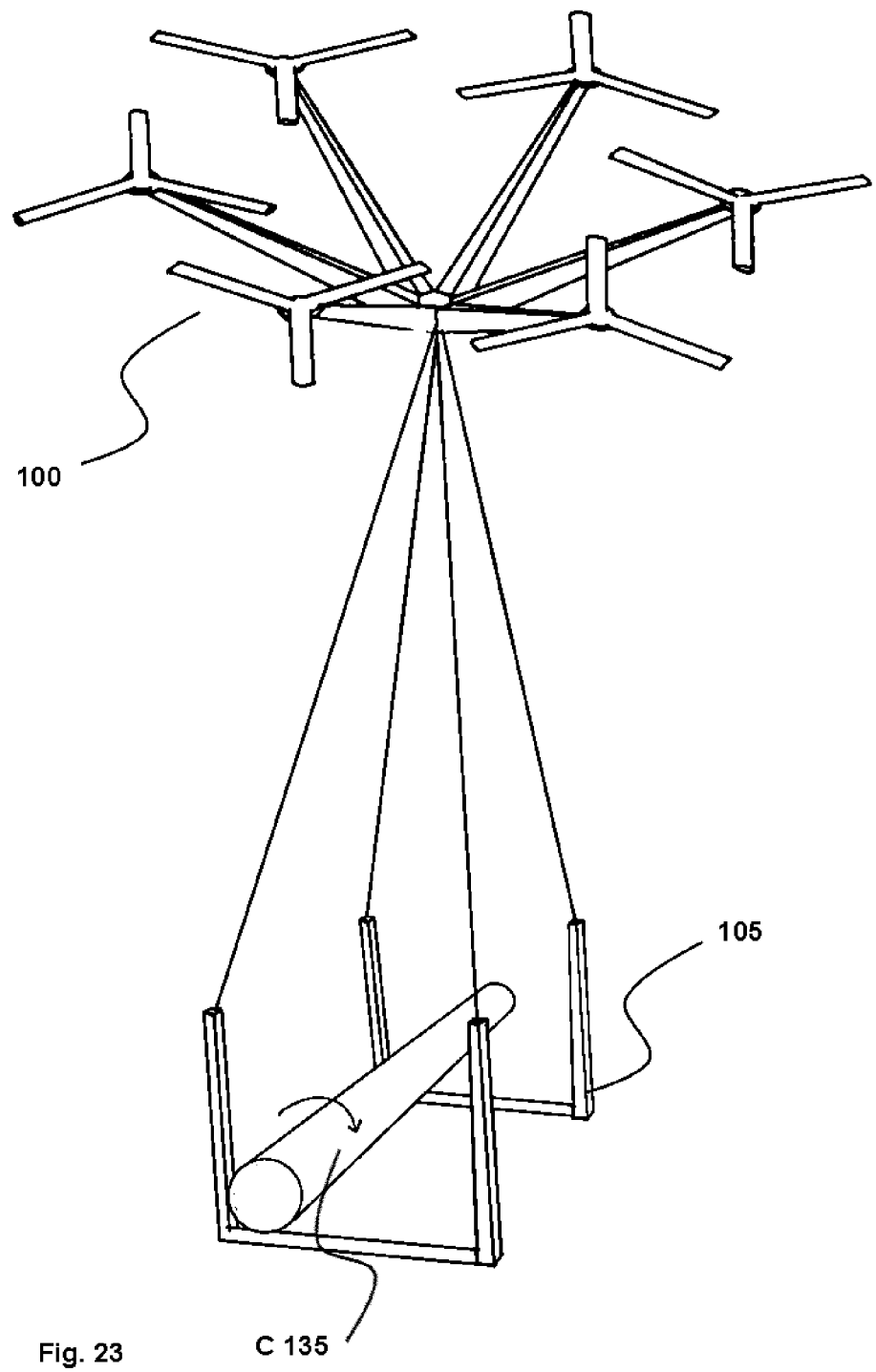

FIG. 23 depicts a single ligno trunk C 135 in a means of holding 105. Due to the size of the means for holding 105 and the size of the ligno trunk C 135, said ligno trunk C 135 may during transportation vary its position and cause an unstable transportation. This problem may be remedied by transporting a plurality of ligno trunks which may secure each other in the means for holding 105.

Figure 24:
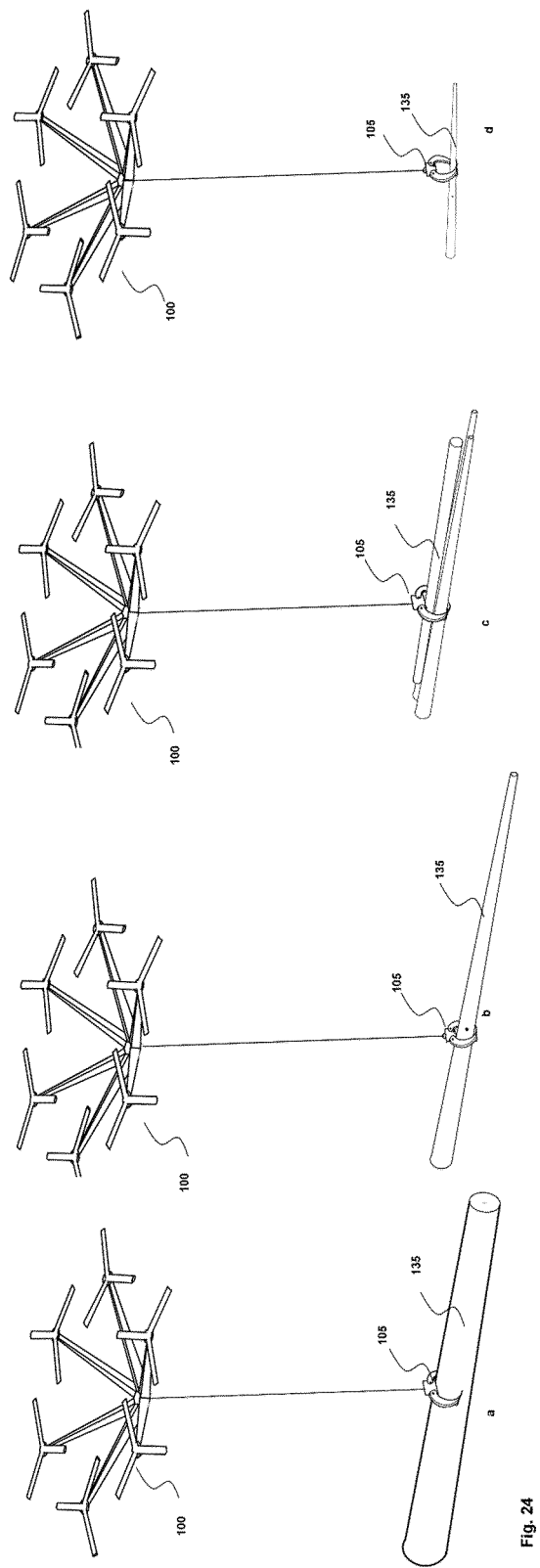

FIG. 24a depicts a means for holding 105 being too small for the diameter of the ligno trunk 135. The means for holding 105 does not enfold the full diameter of the ligno trunk 135 which may increase the risk of drop of ligno trunk 135 in a windy condition. In FIG. 24b the full diameter of the ligno trunk 135 is enfolded by the means for holding 105. In FIG. 24c a plurality of ligno trunks 135 are completely enfolded by the means for holding 105. In FIG. 24d the means for holding 105 is holding a ligno trunk 135 having a much smaller diameter than the load capacity of said holding means 105. Said holding means may cut itself into the ligno trunk 135 in FIG. 24a for increasing the lift capacity of said means for holding 105 and/or for further securing its load.

Figure 25:
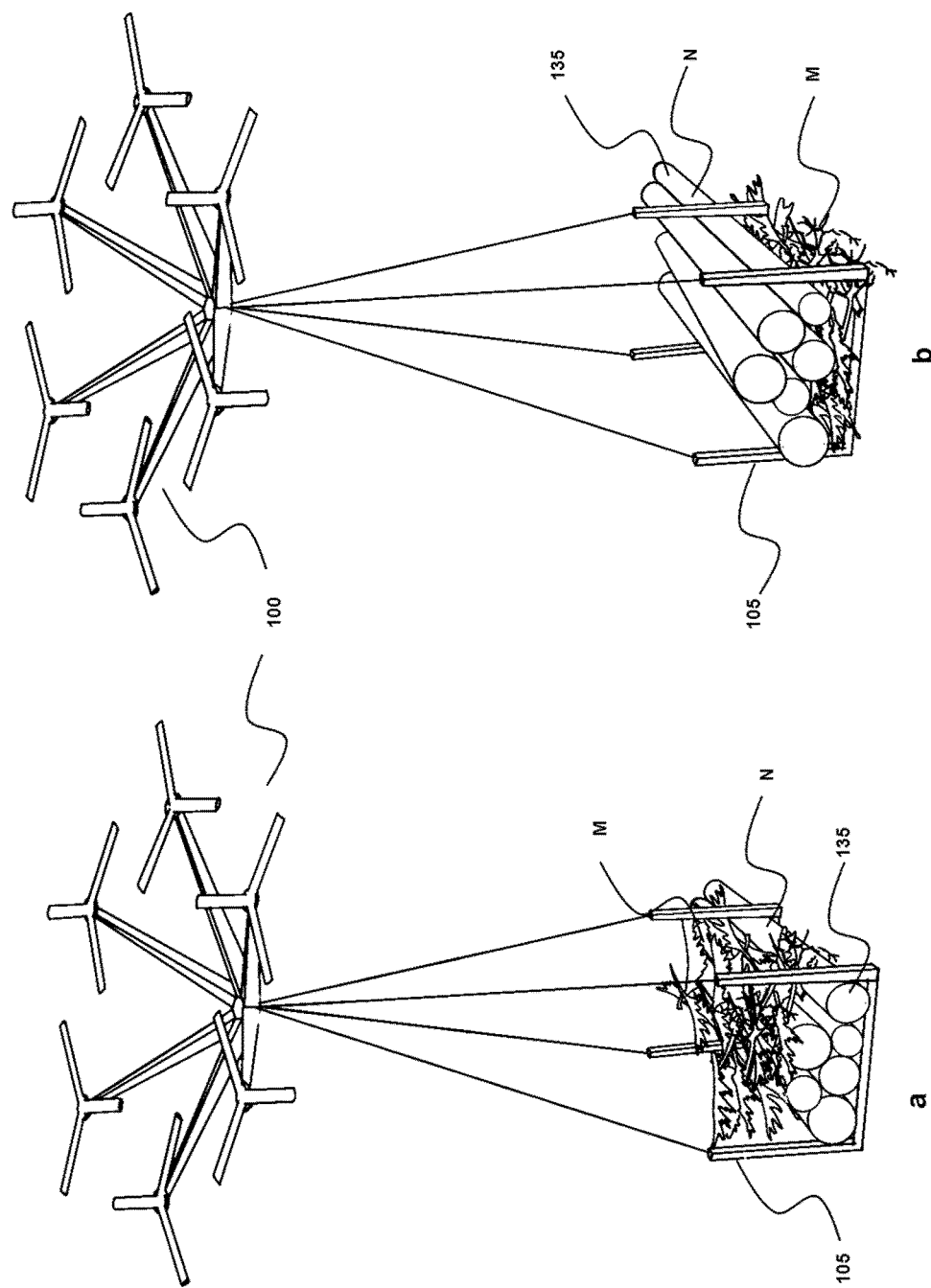

FIG. 25a depicts a means for holding 105 having ligno trunks 135 N at the bottom and twigs M on top of said ligno trunks 135 N. Here the twigs M may risk falling out of said means for holding 105 whereas the ligno trunks 135 N are relatively secured at the bottom of said means for holding 105. FIG. 25b depicts a means for holding 105 having the twigs M in the bottom and the ligno trunks 135 N on top of said twigs M. Here the ligno trunks 135 N may risk rolling out of the means for holding 105 whereas the twigs M is secured at the bottom of the means for holding 105 by the weight of the ligno trunks 135 N.

Figure 26:
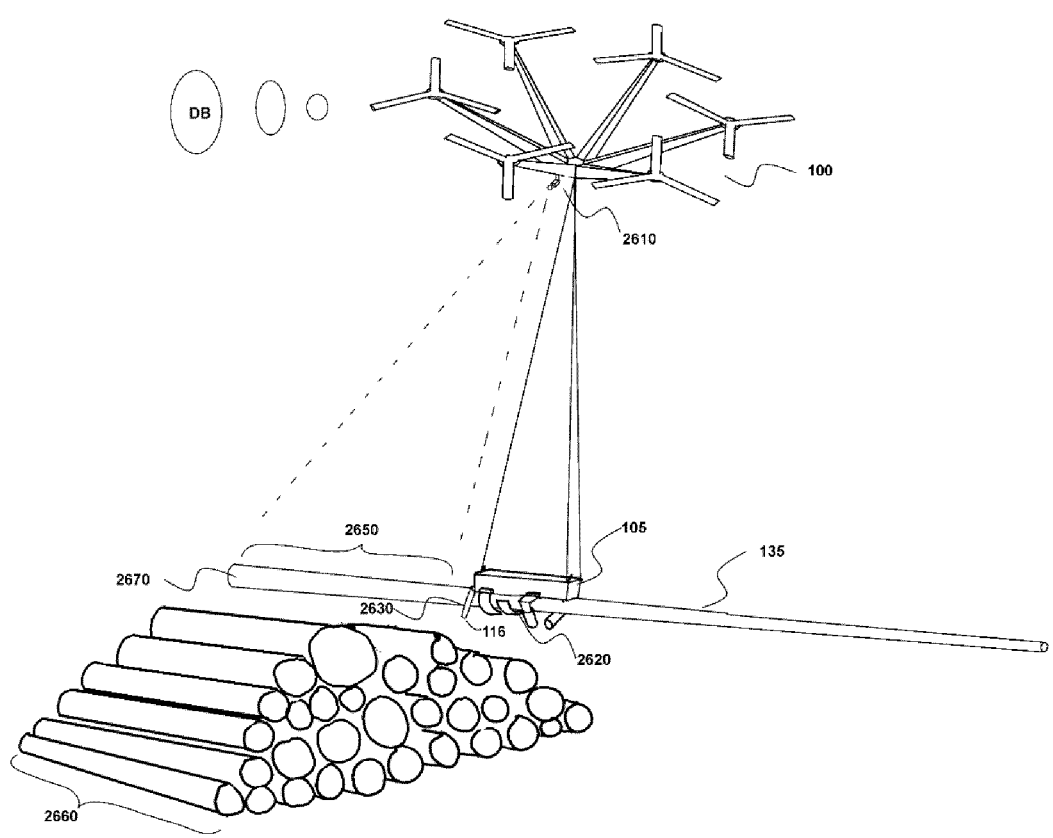

FIG. 26 depicts a UAV 100 having attached to it a means for holding a ligno trunk 105 and a means for cutting a ligno trunk 2670. In FIG. 26 a holding position is denoted by 2620 and a cutting position is denoted by 2630. A ligno trunk may be cut with a means for cutting 116 based on at least one ligno parameter of at least one ligno trunk in the pile of ligno trunks 2660. One such ligno parameter may be the length of the ligno trunk. A ligno trunk held by holding means 105 may be cut for producing a new ligno trunk 2650 having the same length as the ligno trunks in the pile of ligno trunks 2660. A remaining ligno trunk 2640 may further be cut by said means for cutting 116 for producing yet another ligno trunk to said pile of ligno trunks 2660 or being too short to be cut and maybe transported to another storage position. A camera 2610 provided on said UAV 100 may detect the length of the ligno trunks in said pile of ligno trunks 2660 and the length of the new ligno trunk 2650. The cutting position may be determined by said camera 2610 and/or from a database.

Figure 27:
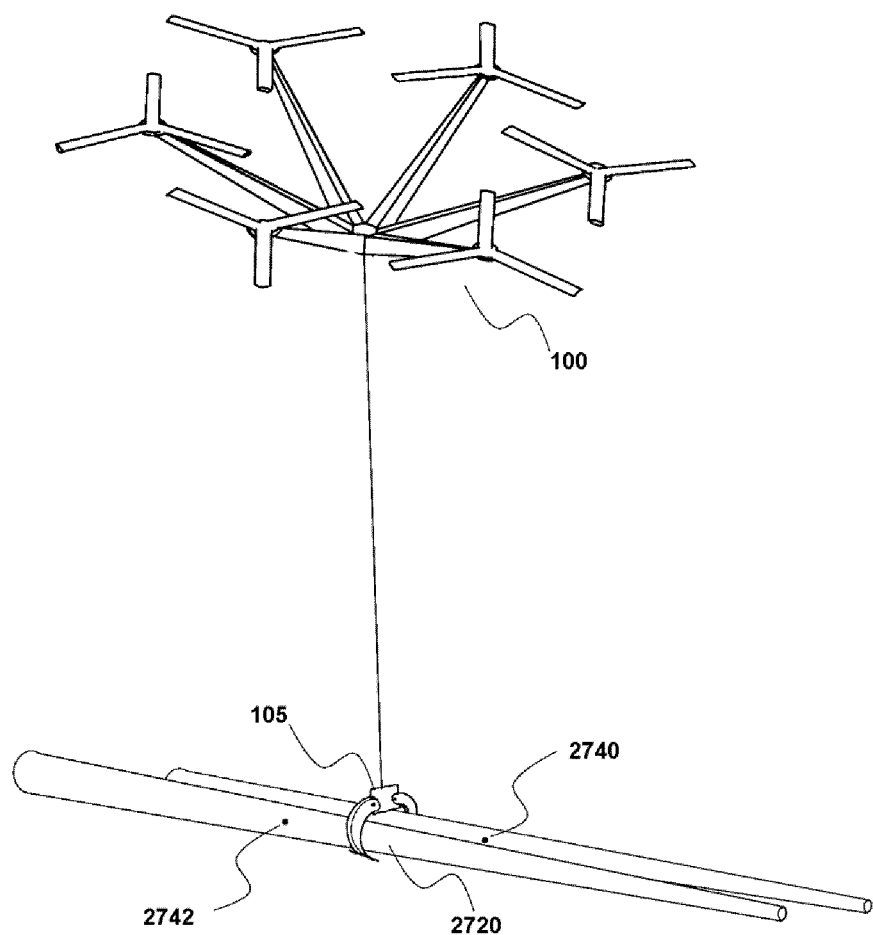

In FIG. 27 a UAV is provided with a means for holding 105. Said means for holding is here holding a first ligno trunk 2740 and a second ligno trunk 2742. The first ligno trunk 2740 is having a center of gravity at a first position whereas the second ligno trunk 2742 is having a centre of gravity at a second position. A combined centre of gravity of said first and second ligno trunks may result in a holding position 2720 being positioned at a distance from a from the larger diameter of said second ligno trunk 2742 and at a distance b from the smaller diameter of said second ligno trunk 2742. The combined center of gravity position of said two ligno trunks may when being held there result in a horizontal transport of said first and second ligno trunks 2740 and 2742 respectively.

Figure 28:
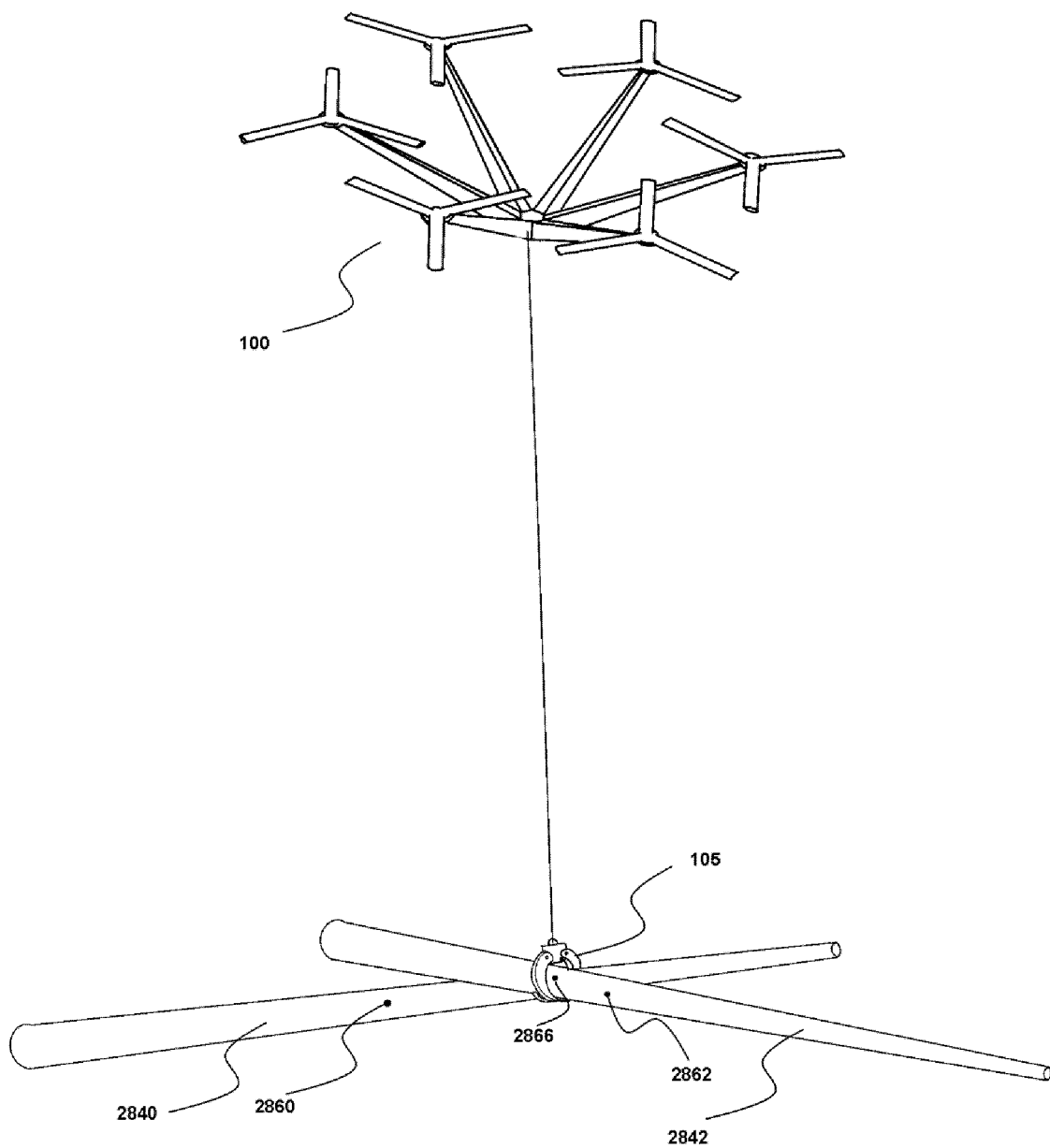

FIG. 28 depicts a first ligno trunk 2840 having a first centre of gravity 2860 and a second ligno trunk 2842 having a second centre of gravity 2862. A combined centre of gravity 2866 may result in a sprawled ligno trunk transportation which in most cases may not be optimal due to inter alia that the time for deposition of the ligno trunks may be increased. However, the ligno trunks may nevertheless be transported relatively safely using the depicted position.

Figure 29:
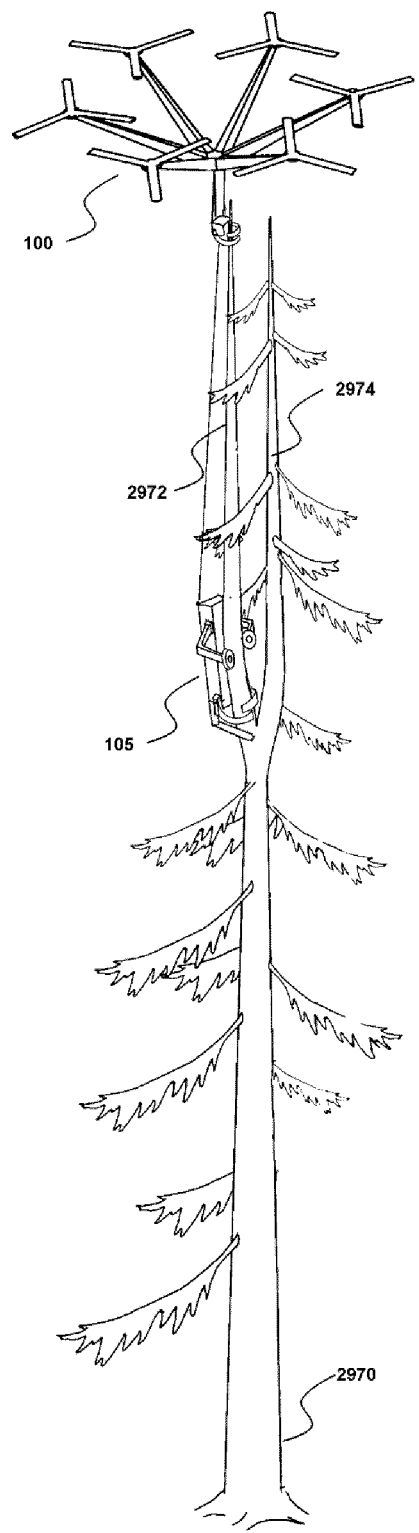

FIG. 29 depicts a ligno 2970 with a first ligno top 2972 and a second ligno top 2974. An UAV 100 with means for holding and/or means for cutting may cut off said first ligno top 2972, said second ligno top 2974 or both of them.

Figure 30:
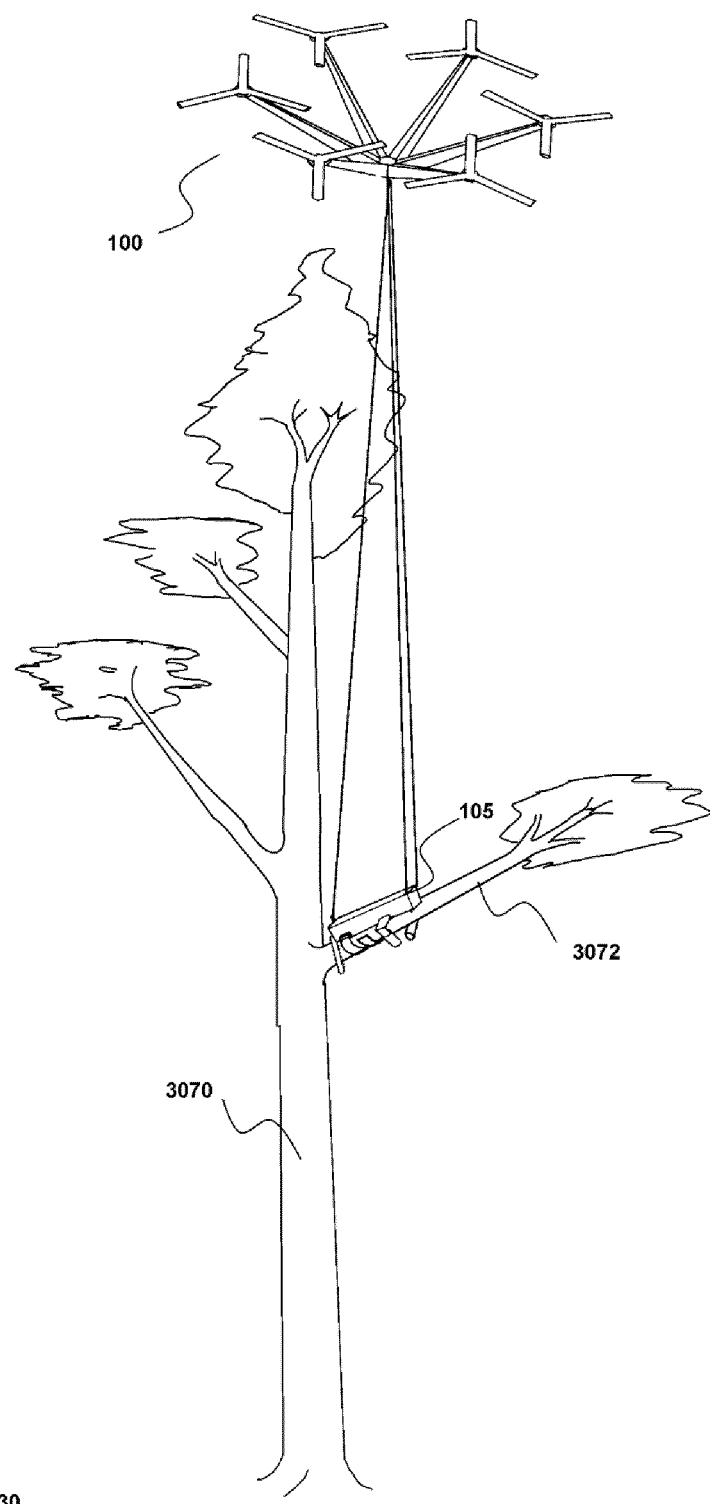

FIG. 30 depicts an UAV 100 with means for holding 105 and/or means for cutting. Said means for cutting may cut off one or a plurality of twigs/branches 3072 from a ligno 3070.

Figure 31:
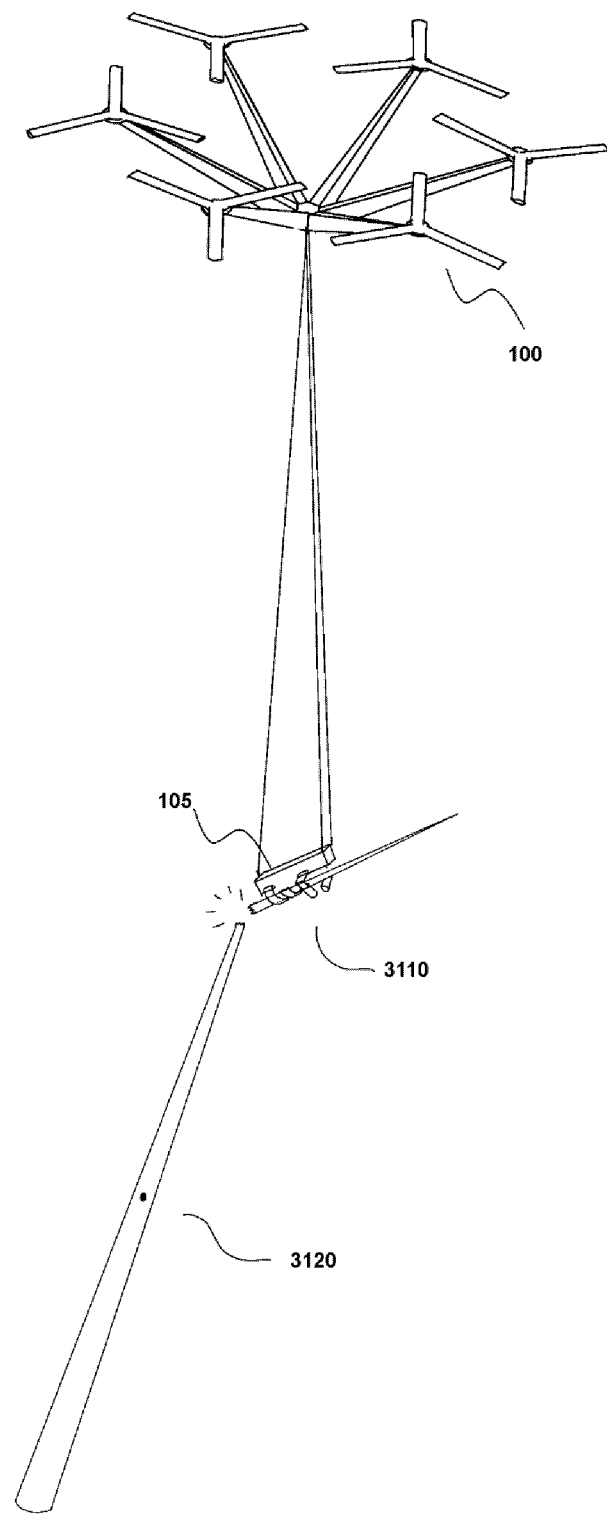

FIG. 31 depicts an UAV 100 with holding means 105. Due to a different strength of a tree trunk at a top portion and a bottom portion a holding position may be selected for prohibiting any cracking of the tree trunk during transportation. A holding position too close to the top of the ligno trunk may result in breaking the ligno trunk in two pieces as shown when holding at a first position 3110 too close to the ligno trunk top. A safe holding position 3120 may be provided from detected ligno parameters and/or camera detection and/or indirectly from one or a plurality of growing conditions for said ligno trunk for prohibiting any damage to the ligno trunk during transportation.

Figure 32:
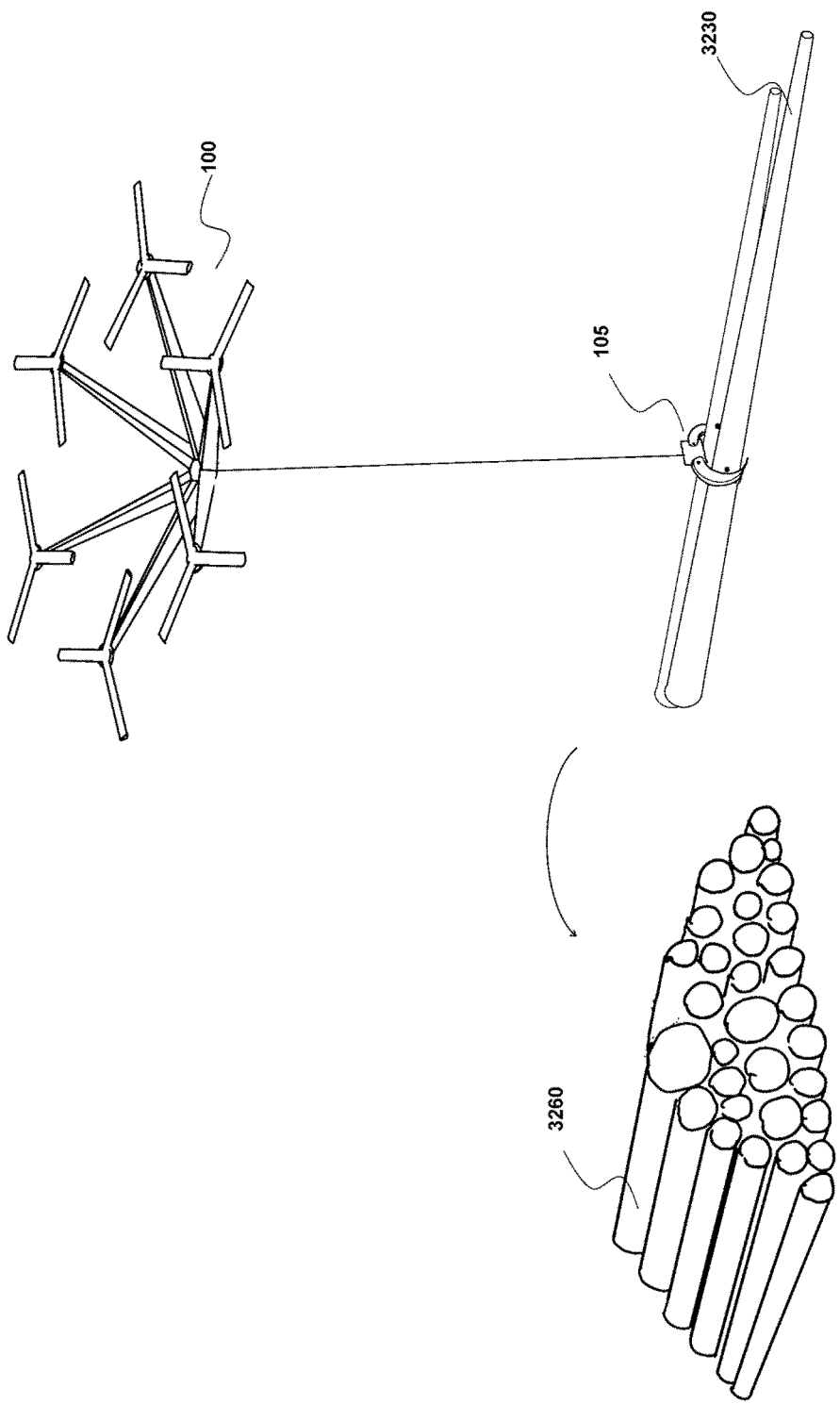

FIG. 32 depicts an UAV 100 provided with a holding means 105. A ligno trunk 3230 is held in a horizontal direction. Any deposition of ligno trunks starting from a horizontal holding is more efficient than a ligno trunk arriving at a final destination having any other direction. This may minimize the time it may take to deposit the ligno trunk 3230 in the same manner as the previously deposited ligno trunks 3260.

Figure 33:
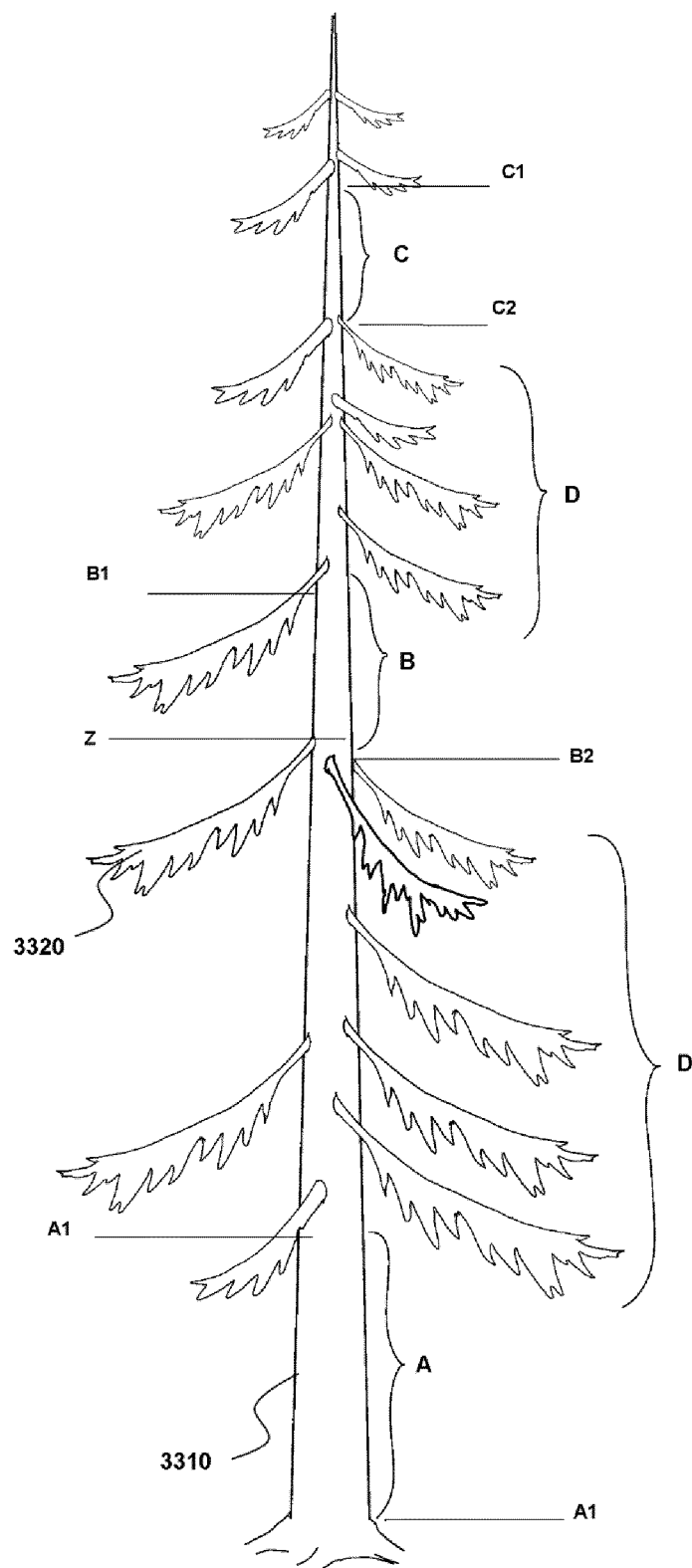

FIG. 33 depicts a ligno 3310 with numerous twigs/branches 3320. A suitable holding position for a means for holding may be where sufficient space between twigs/branches is present. In FIG. 33 3 suitable holding positions are denoted by A, B and C. At A, B and C the ligno trunk is free from twigs/branches between A1-A2, B1-B2 and C1-C2 respectively. Non suitable holding position are denoted by D where there are difficult to reach the ligno trunk because of twigs/branches.

Figure 34:
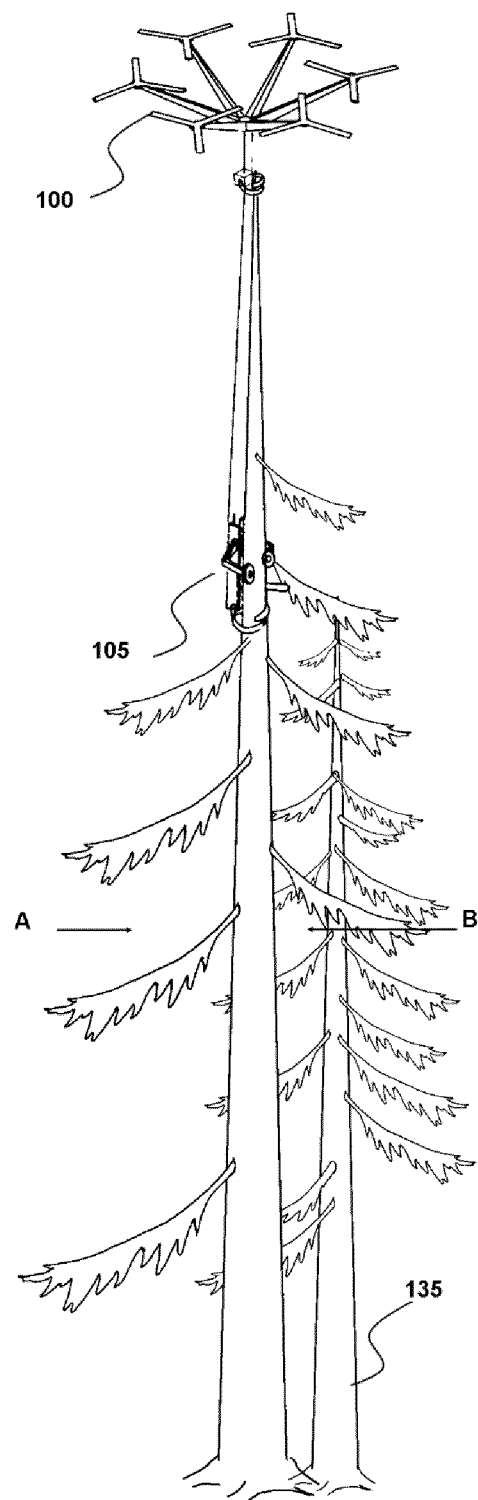

FIG. 34 depicts a first and a second ligno close to each other. Possible holding position in such case are not only limited by the location of twigs/branches of the ligno to be held but also the position of the nearby ligno and its twigs/branches.

Figure 35:
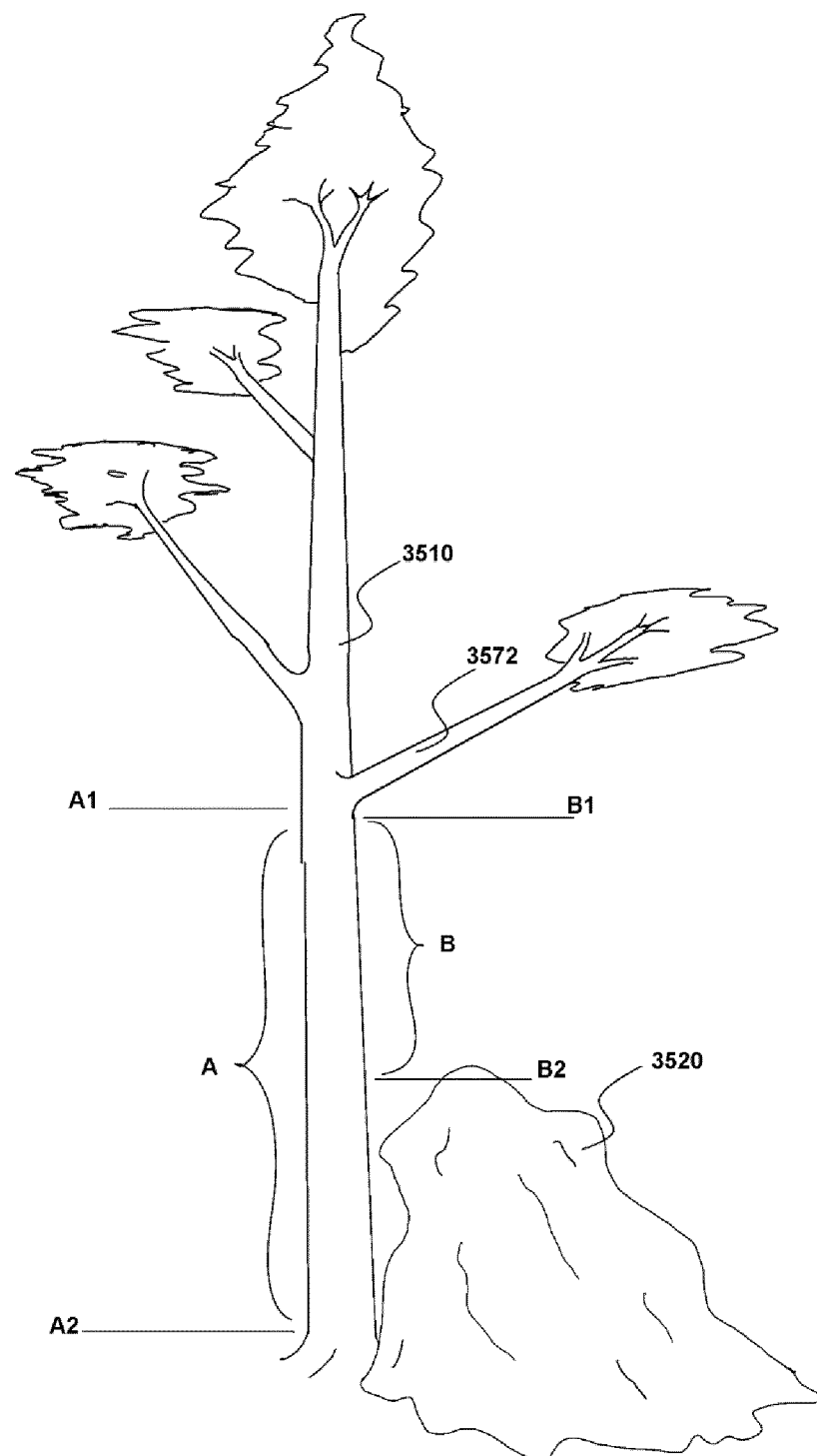

FIG. 35 depicts a scenario where a ligno 3510 is positioned close to a relatively large stone 3520. In such case the holding position is not only limited by the position of the twigs/branches of the ligno but also the location of the stone in relation to the ligno. Suitable holding positions are denoted by A and B. At A the ligno trunk is free from twigs/branches between A1-A2. At B the ligno trunk is free from twigs/branches between B1-132. At B2 and further down to the ground the stone 3520 is the limiting factor for any holding position.

Figure 36:
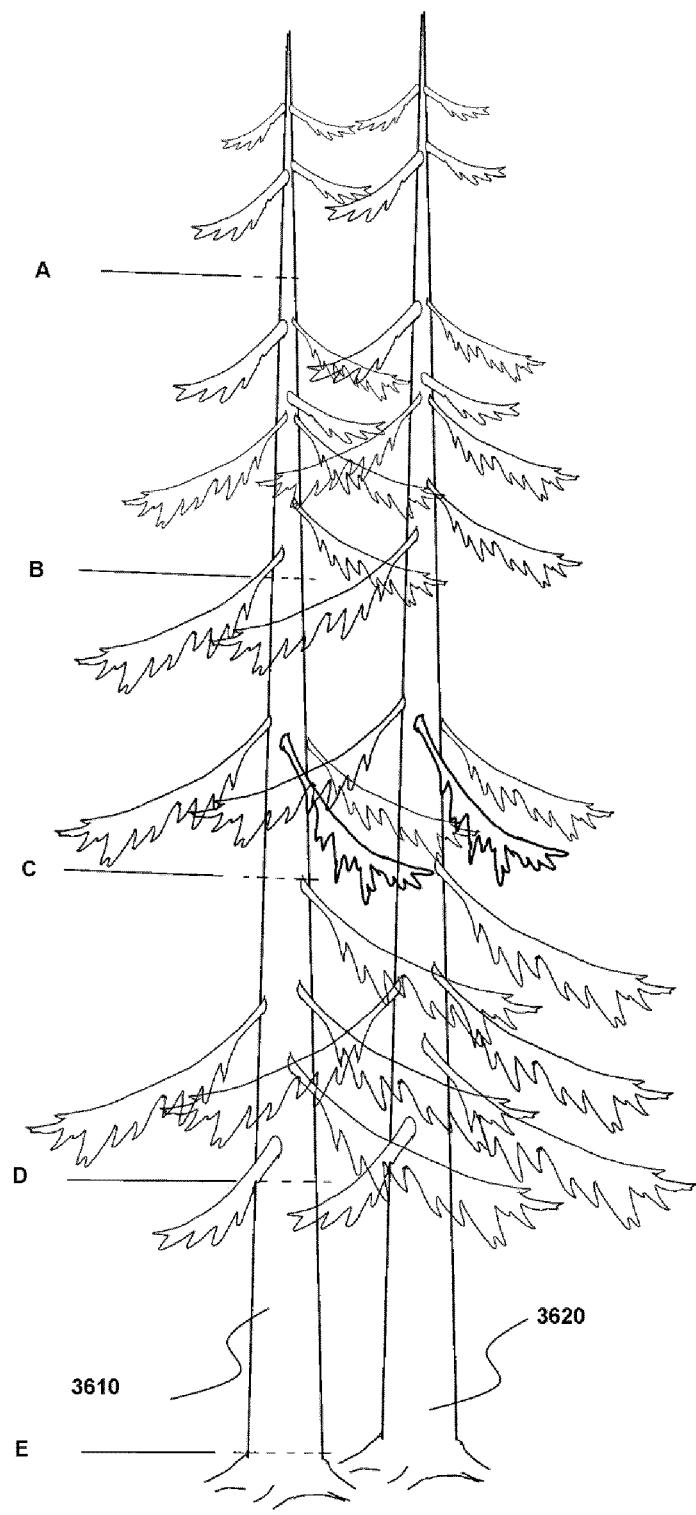

FIG. 36 depicts a first ligno 3610 and a second ligno 3620. The second ligno shall remain unharvested. The first ligno 3610 shall be harvested in small portions with cutting positions A-E. The second ligno shall remain unharvested due to its higher value/quality whereas the first ligno 3610 shall be removed for further increasing the value of said second ligno. The first ligno may be cut in portions for minimizing the risk of damaging the second ligno during harvesting. This may be the case in windy condition and during particular points of time of the year.

Figure 37:
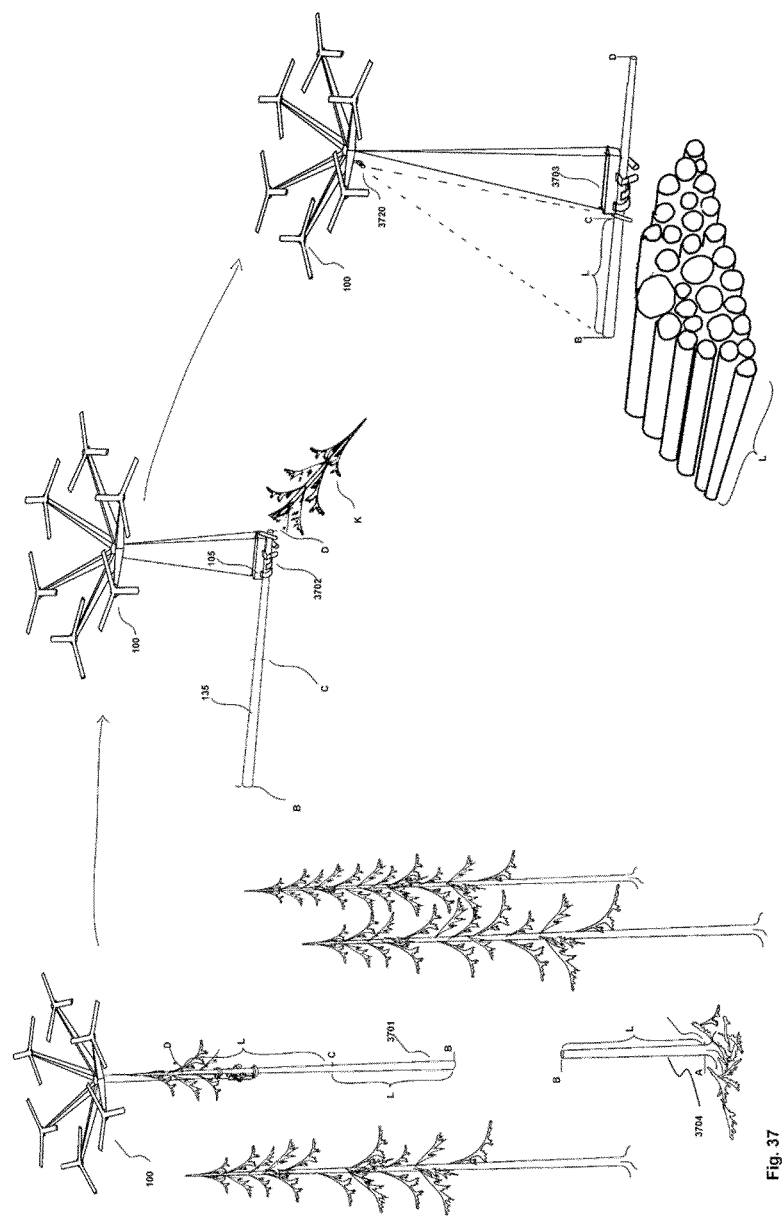

FIG. 37 depicts different cutting scenarios during harvesting. A ligno may be cut before transportation, during transportation or after transportation as shown in the top portion in the figure. A top portion of a ligno may be harvested first. The top portion may be harvested at a position determined by the remaining length of the ligno. In an example embodiment the remaining length of the ligno after the top portion has been taken off may be twice a length of ligno trunks provided at a final destination. The length may be detected by a camera or being provided from a data base. Any holding position of the ligno may be altered during transportation or at the final destination enabling cutting the ligno at predetermined positions.ln FIG. 37A-D denoted different cutting positions resulting in ligno trunks having the same length L. 3701-3704 denoted different holding positions of different portions of the ligno trunk.

Figure 38:
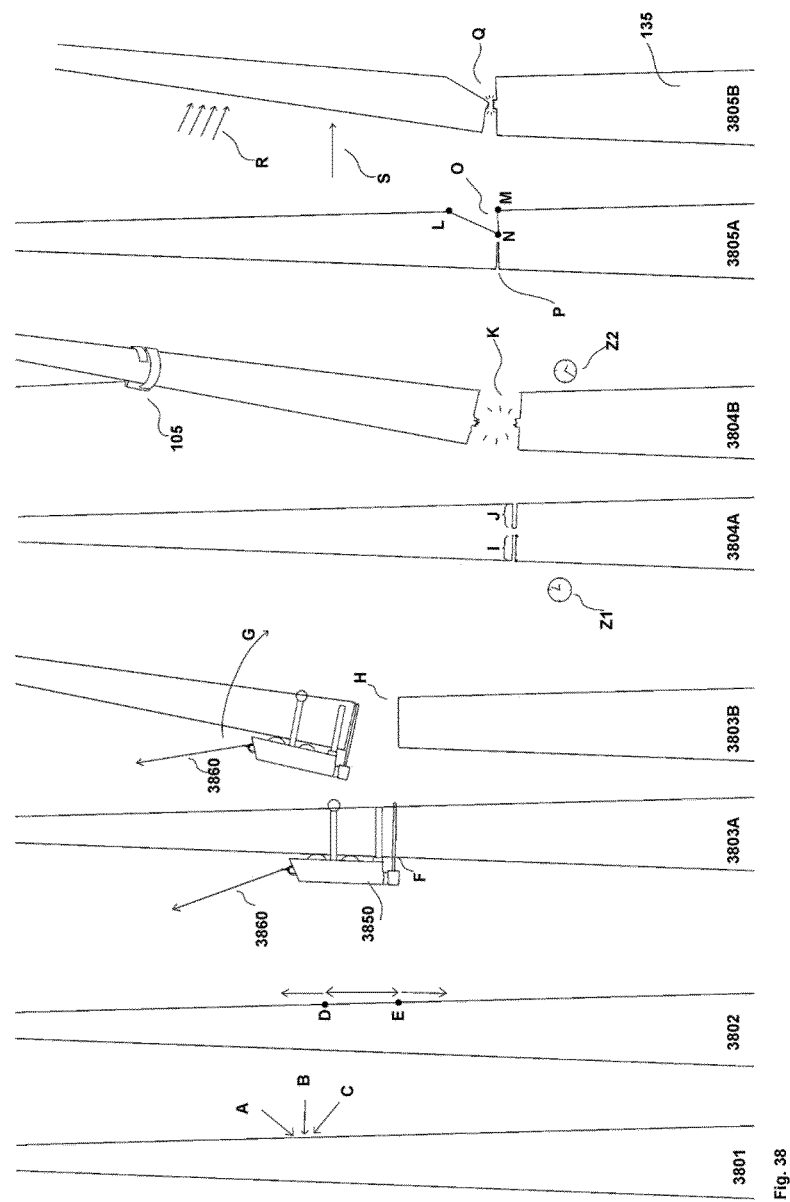

FIG. 38 depicts different cutting scenarios. Ligno trunk 3801 is illustrated to be cut at different angles with respect to the ligno trunk. A cutting may be essentially perpendicular to the ligno trunk as illustrated with B. A cutting may be angled with respect to the ligno trunk as illustrated with A and C. Ligno trunk 3802 illustrates that a cutting position may be at specific locations D, E or with in an interval D-E, or above a certain point D, or below a certain point E. Ligno trunk 3803A illustrates a means for cutting and holding 3850 a ligno trunk attached to said ligno trunk 3803A. A cutting position is determined to be at F. Ligno trunk 3803B is cut and has created a cutting area H. A wire attached to the UAV, may force the cut portion of the ligno trunk to rotate in a predetermined direction illustrated by G by reducing the length of said wire from said UAV to said cutting and holding means 3850. Ligno trunk 3804A illustrates that a first partial cut I may be made at a first position and a second partial cut J may be made at a second position. Said first and second position may be positioned essentially at the same height of said ligno trunk 3804A. Said first and second partial cut I and J respectively may be essentially in opposite to each. In various example embodiments more than 2 partial cuts may be made in order to destabilize a ligno trunk, for instance 3, 4, 5 or more. A ligno trunk 3804B may be separated by providing at least one means for holding 105 to said ligno trunk. Said at least one means for holding is attached via a wire to at least one UAV. The UAV may crack the ligno trunk 3804B by its drag force in horizontal and/or vertical direction. The partial cuts I, J may be made at a first point in time whereas the cracking by said UAV and said holding means 105 may be made at a second point in time. Said first and second point in time may be simultaneous or said second point in time may be second, minutes or days after said first point in time. Ligno trunk 3805A illustrates an example embodiment of partial cuts with an intention to crack the ligno in a predetermined direction by wind R or other external forces S. A first partial cut is denoted by P. A plurality of cuts may be made in order to remove a volume O of the ligno trunk. Volume O may be removed by a first cut between L and N and a second cut between M and N. Alternatively volume O may be removed by a number of cuts M-N stopping at imaginary line N-L. Ligno trunk 3805B is broken at Q by wind R or other external forces such as gravity, machine force and/or human or animal force.

A cutting position may be direct or indirect. A direct cutting position is determined by cutting the ligno trunk by a means for cutting. An indirect cutting position may be determined by first cutting a ligno and the part being cut off is further divided by its own weight during transportation or said cut off portion of the ligno trunk may be divided into pieces when falling to ground. A cutting position may be selected taking into account ligno parameters and/or growing conditions. A number of possible cutting position may be determined out of which a few may actually be used. A cutting position may be for removing a portion of a ligno trunk. Alternatively, a cutting position may be a partial cutting where no part of the ligno is removed, e.g., a cut less than half a diameter of the ligno. A partial cut may be less than 1 cm into the ligno trunk. A partial cut may be less than 3 cm into the ligno trunk. A partial cut may be less than 10 cm into the ligno trunk. A cutting position can be predetermined and it can change during cutting and/or during harvesting and/or transport etc. depending on growing conditions and/or ligno parameters.

In various example embodiments said UAV and said means configured for harvesting at least a portion of a ligno may be separated from each other end reconnected with each other. One or a plurality of cameras or other suitable position sensors may be used for the reconnection procedure.

Figure 39:
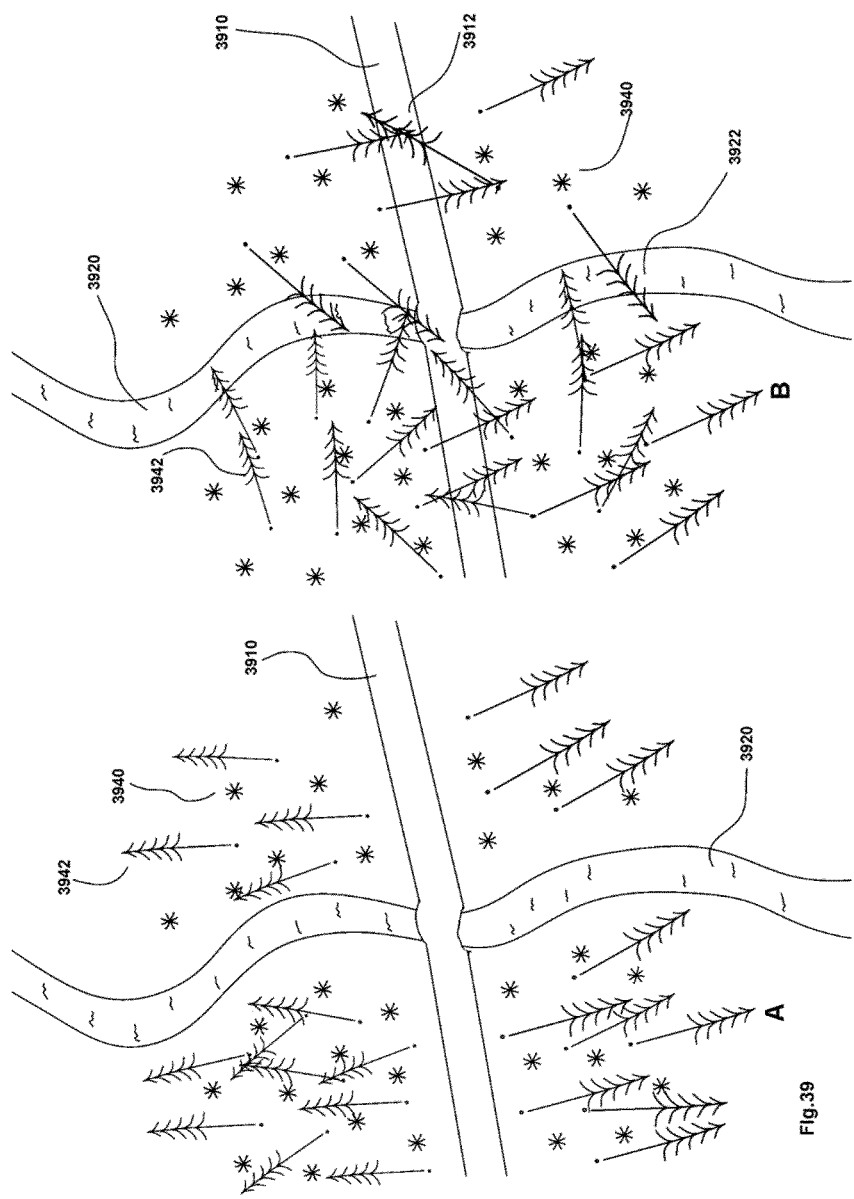

FIG. 39A depicts a road 3910, a river 3920, lignos laying on ground 3942 and stump or remaining portion of the ligno 3940. As can be seen from FIG. 39A the lignos laying on ground 3942 are not crossing the road 3910 and/or the river 3920. Lignos laying on ground 3942 are also provided in essentially the same direction to the right of the road and essentially in the same direction to the left of the road, here a large diameter of the ligno trunk is pointing in the direction towards the road 3910.

In FIG. 39B lignos are provided in random directions and/or positions. In FIG. 39B Ligno 3922 is crossing the river 3920 and ligno 3912 is crossing the road 3910. Lignos provided as in FIG. 39B will take more time and is more difficult to remove from its location compared to lignos arranged as in FIG. 39A. Lignos that are provided randomly on ground may be an obstacle for traffic on roads, make a forest more difficult to move around in for humans and/or animals. Transportation may also take longer time if lignos are in partial or complete disorder instead if providing them on ground systematically in predetermined directions.

Figure 40:
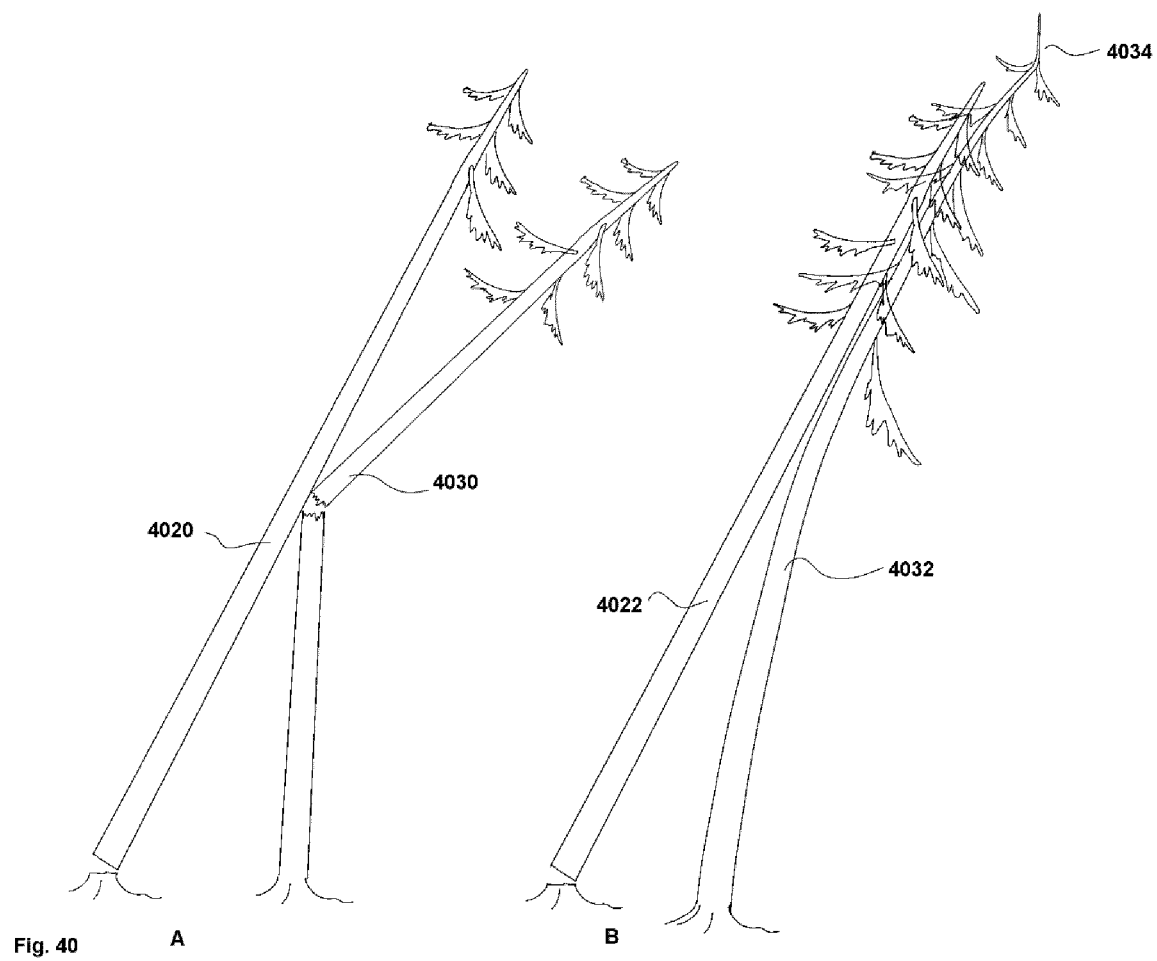

FIG. 40A illustrates a first ligno 4020 which is cut and hitting another nearby ligno 4030 in its fall to ground. Said another ligno 4030 may risk to be broken by the hit of said first ligno 4020. This may be remedied by harvesting using at least one UAV which will hold the ligno during cutting and prohibiting said ligno to damage other lignos. By using a UAV holding a ligno during a cut may also reduce the pressure on the cutting tool during cutting. By providing a force by said UAV in an upward direction of the ligno during cutting the weight of the ligno onto the cutting tool may be reduced or eliminated reducing or eliminating said cutting tool to be stuck while cutting said ligno. In windy conditions it may be necessary to cut from a predetermine direction in order to let the ligno trunk fall in a predetermined direction and not get stuck in other lignos in the vicinity. Lignos being inclined and/or having an uneven weight distribution may be cut in order to let said inclination and/or uneven weight distribution determine the falling direction, the cutting position may be chosen in order to reinforce such ligno parameter(s).

FIG. 40B illustrates a first ligno 4022 which has been cut intentionally or unintentionally and has been stuck during its fall a second ligno 4032. The second ligno 4032 is shown to be bent may the weight of the inclined first ligno 4022. Leaving this first ligno resting on said second ligno a prolonged time, months, years, may reduce the value of the second ligno. Said second ligno may start to grow in a vertical direction 4034 inclined from the reminder of the ligno 4032.

Figure 41:
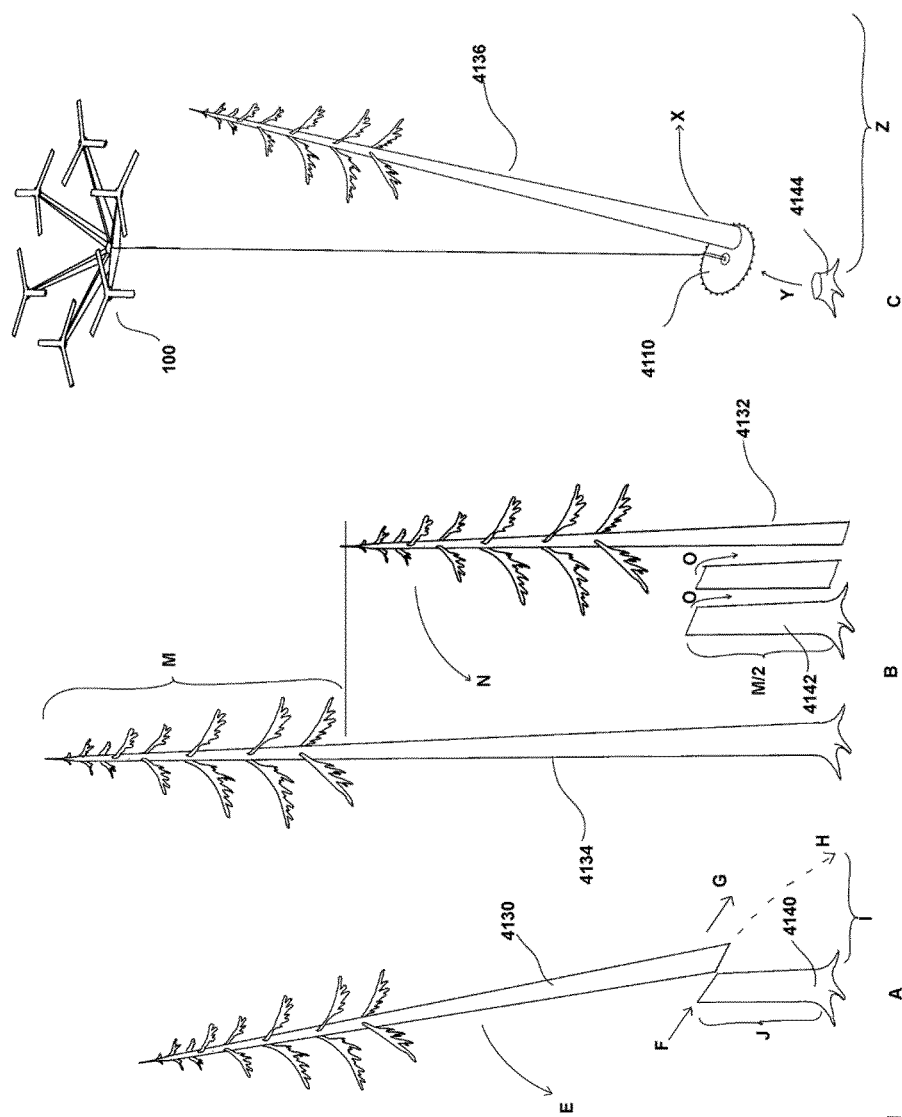

FIG. 41A illustrates a ligno 4130 which is cut with a non-perpendicular cutting area with respect to an axis parallel with the ligno trunk. By cutting in direction F, ligno 4130 may start to glide in direction G and fall in direction E. The cutting area of ligno 4130 may follow hatched lined H during its fall and land at a distance I from the stump/remaining portion of the ligno 4140. The height J of the stump/remaining portion of the ligno 4010 is one determining factor for said distance I.

FIG. 41B illustrates a first ligno 4134 and a second ligno 4132, 4142. By cutting the second ligno 4132 in sections M, M/2 it may be possible to reduce its length and prohibiting branches of said first ligno 4134 to stuck in branches of said second ligno 4132. By cutting said second ligno 4132 in sections of M it may be possible to reduce its top position to be below the lowest branch of said first ligno 4134 thereby allowing to fell said second ligno 4132 in direction N without risking to get stuck in branches of said first ligno 4134.

FIG. 41C illustrates a method of cutting a ligno using an UAV 100 and a means for cutting 4110. By accelerating the cutting in direction X during cutting it may be possible to throw/move a ligno 4136 a distance Z from its stump 4144. This may be useful when trying to avoid any ligno on a sensitive area in the Z region.

In various example embodiments a plurality of UAV is used for transporting a plurality of ligno.

The means configured for harvesting at least a portion of a ligno may optionally be capable for moving on ground. The movement may be with legs, wheels or other suitable moving means.

In various example embodiments of the present invention a digital transmitter may be attached to a ligno for communication with a control unit and/or at least one UAV and/or at least one means for harvesting at least a portion of a ligno. Said digital transmitter may not only send out the position of said ligno it is attached to but also send out information about distance to neighbour ligno, the terrain, the diameter of the ligno, the final destination of a non-harvested ligno and/or other quality parameters of the ligno such as type and/or curved trunk. The digital transmitter may be attached to the ligno by a UAV, land vehicle, robot or by a human. The digital transmitter function may also be implemented as a pure software digital recognition function by unique features of the ligno such as ligno rings, limb pattern or ligno bark.

The digital transmitter may be used to determine which ligno to be harvested, where to move the harvested ligno in order to simplify transportation logistics. A digital transmitter may be used to move ligno/timber of different quality to different locations by said UAV. A digital marking may be used to determine which UAV and/or means for harvesting at least a portion of a ligno trunk to be used. The digital information may be used for using one or a plurality of UAV depending on the size of the ligno to be harvested. The digital marking may be used for ligno thinning. The digital marking may be used in combination with a remote harvesting planning and/or ligno thinning process prior to the actual harvesting. With digital marking a map of ligno in a predetermined area may be used for guiding the UAV to the correct ligno to be harvested. The digital marking may also determine in which order the ligno shall be harvested in order to reduce the harvesting time. The digital marking may be used to estimate a future harvesting time. The digital marking may be used to determine which type of ligno there are in a particular area, the distance between ligno in a particular area, the topography of the land where ligno are to be harvested, the height of the ligno, the quality of the ligno, the form of the ligno, the diameter of the ligno. The digital marking may determine prior to harvesting of the ligno shall be cut in portions. The digital marking may be used to mark the different portion of the harvested ligno weight.

In various example embodiments of the present invention the quality of a harvested ligno may be predicted by studying at least one intrinsic parameter i.e., tree parameter and/or at least one extrinsic parameter i.e., growing condition.

In various example embodiments of the present invention detected spectral properties and/or spatial structures of a portion of a ligno may be used as input for detecting ligno parameters and/or growing conditions of at least a portion of said ligno. Spectral properties and spatial structures may be detected on a microscopic and/or macroscopic level.

In various example embodiments of the present invention detected spectral properties and/or spatial structures of a ligno's surrounding environment within a pre-determined distance may be used as input for detecting ligno parameters and/or growing conditions of a portion of a ligno. Spectral properties and spatial structures may be detected on a microscopic and/or macroscopic level.

Shape of leaves or fir needles may be used as a ligno parameter.

Spectral properties and/or spatial structures may be from a cut surface of a ligno, a ligno trunk, a ligno branch, ligno leaves/fir needles and/or a ligno leaves/fir needles. It may also be the spectral properties and/or spatial structures of vegetation, species and/or the ground within a pre-determined distance from said ligno. Spectral and/or spatial properties may be evaluated on pixel level.

In various example embodiments of the present invention spatial properties of the tree to be harvested and/or transported and/or the spectral properties and/or the spatial structure of the ground and/or surrounding may be used as input for determining the final destination of at least a portion of a ligno and/or for determining if a portion of a ligno is to be harvested. Spatial properties may be detected on a microscopic and/or macroscopic level. Spatial properties may be from a cut surface of a ligno, a ligno trunk, a ligno branch and/or a ligno leaves/fir needles. Spatial properties may be evaluated on pixel level.

The spatial properties of a tree may be used as an intrinsic parameter of a tree for predicting its quality. Various sensors may be used for determining temperature and/or humidity which in turn may be used for predicting the quality of the tree.

The length of a tree may be the cut portion laying on ground waiting for transportation. The length may be the total length above sea level. The length may be the total length above ground. The length may be the length of a particular tree in comparison with at least one other tree.

In various example embodiments a ligno parameter may vary within a single ligno (tree, bush). A ligno parameter may also vary between ligno of the same species. A ligno parameter may also vary between ligno of different species. A ligno parameter may be the temperature of the ligno. The temperature of the ligno may be an indication about the health and thereby the quality of the ligno.

A ligno parameter may for instance be a chest heigh diameter of the ligno trunk or a branch.

A ligno parameter may be various types of ligno deformations.

A ligno parameter may be the number of branches and its location on a ligno. A ligno parameter may be the shape of the branches. A ligno parameter may be the number of dry branches or a dry branch.

A ligno parameter may be defects generated by weather, e.g., storm, fire, torrential rain, dry periods etc. In various example embodiments a particular type of tree may not be harvested within a predetermined time period after a rainy season such as birch.

A ligno parameter may be a ligno gene or a set of genes. Ligno genes may be detected in a lab. Ligno genes may also be present together with the position of the ligno when sowing the ligno.

A ligno parameter may be the number of leaves or fir needles. The number of leaves or fir needles may be estimated by detecting a spectral density per unit area. A ligno parameter may be achieved by measuring speed and/or movement of vibrations in a ligno and/or by measuring the speed and sound of such vibrations through a ligno.

A growing condition may be hydrology of a predetermined area. Hydrology may be presence of running water and/or soil moisture.

A growing condition may be climate and/or meteorological variables such as wind, humidity, air pressure, radiation etc. A growing condition may be the weather during a particular season, a depth of snow, average wind speed, sensitivity to storm damage. A temperature, fire and/or snow depth etc. during a particular time-period may be a determining factor to harvest or not and/or if special equipment is needed.

Abiotic factors such as soil quality may be a growing condition and a determining factor for ligno parameter. Abiotic factors in combination with a detection of annual rings, the shape of the tree, surrounding vegetation may give a good indicator of the quality of a ligno. Visual inspection of a ligno in combination with historical weather data may give a strong indication of the quality/value of a ligno.

A final destination of a ligno may not only be determined in longitude and latitude but also in height above ground level or sea level. The height and/or spatial position in relation to other portions of trees, ground or other objects variable may be useful if different types of ligno parameters is to be stored on the same location but being transported to yet another location at different times. The final destination may be a fixed position, a vehicle, but also a position in relation to another object, portion of the landscape and/or a predetermined area or volume. The knowledge about the spatial location of a particular ligno parameter in a pile of ligno trunks may be logistically advantageous.

A direction of felling a ligno may not only be determined in longitude and latitude but also in height above ground level or sea level. The height and/or spatial position in relation to other portions of trees, ground or other objects variable may be useful if different types of ligno parameters is to be stored on the same location but being transported to yet another location at different times. The direction of felling may be to a fixed position, a vehicle, but also a position in relation to another object, portion of the landscape and/or a predetermined area or volume. The knowledge about the spatial location of a particular ligno parameter in a pile of ligno trunks may be logistically advantageous.

A growing condition and/or a ligno parameter may determine the final quality of wood such as flat bend, edge bend and/or skew.

In various example embodiments a ligno may be cut in several portions and said portions may be laid on ground. One of the smallest portions may be transported first and based on at least one of its tree parameters the weight of the remaining portions may be estimated.

Cutting a portion of a tree or a number of full trees may be performed for increasing the value of the remaining portion of the forest.

A cutting position may be chosen in order to damage the ligno but not removing any parts from the ligno, i.e., one or several cuts may be applied onto said ligno so that said ligno may die within a predetermined time period. A cutting position may be chosen in order not to harvest the ligno but in order to destabilize the ligno so that the ligno in a future windy condition may fall by itself. A cutting position may be chosen so that the ligno may dry up during one or several season and attain a greater energy value and harvested later when its dryness is better, and therefore have a better value as a fuel. Leaving av tree trunk to rotten may also in some circumstances be advantageous for biological diversity. Damaging a ligno intentionally ma also cause the ligno to lose its leaves or needles. Pick up may take place after the ligno has lost all its leaves or needles. This may be advantageous since lots of nutrition in said leaves/needles will return to the ground and feed other plants.

The cutting position may be chosen in order to remove a particular portion of a ligno such as a portion of a ligno trunk. The cutting position may be chosen in order to maximize the value of the harvested ligno trunk. The cutting position may be chosen in order to increase the value of the remaining unharvested portion of the ligno. The cutting position of a ligno trunk may depend on at least one detected ligno parameter and/or at least one detected growing condition of at least a portion of a ligno. The cutting position may depend on the final customer and/or the specific use of the harvested trunk. The cutting position may depend on the lifting capacity of one or a plurality of UAV. The cutting position may depend on the distance from the original cutting location and the final destination of the harvested ligno trunk. The cutting position may depend on the time of the year the ligno is harvested. The cutting position may depend on the weather condition during harvesting. The cutting position may depend on a specific load capacity of a timber truck. The cutting position may depend on specific defects in a ligno such as fungal infestation and insect infestation. The cutting position may be chosen in order to maximize the value of the lignos in the vicinity of the cut ligno.

In various example embodiments at least one remotely and/or autonomously controlled means for holding (105) at least a portion of a ligno trunk is attachable to said UAV. The means for holding (105) may be used for holding onto the ligno trunk while transport said ligno trunk and/or holding onto the ligno trunk while harvesting the ligno and/or holding onto the ligno while delimbing and/or debarking the ligno. Holding may mean gripping the ligno trunk or resting the ligno trunk against said means for holding. In various example embodiments means configured for directing said means for holding at least a portion of a ligno trunk to a particular position of said ligno trunk depending on said at least one detected ligno parameter and/or said at least one detected growing condition. The holding position may be dependent on the location of branches on said ligno trunk, the balancing of the ligno trunk while transporting it, the positioning of the ligno trunk in sad means for holding for prohibiting damaging of surrounding lignos/ligno trunks, prohibiting movement of the ligno trunk while debarking and/or delimbing and/or cutting and/or for a more efficient placement of said ligno trunk at its final destination. The holding position may vary depending on the number of tree trunk hat are held by said means for holding (105). If holding a first tree trunk the holding position may be a first position, if gripping a second tree trunk, the first position of said first tree trunk may be altered due to the simultaneous holding of said first and second tree trunk in order to achieve a desired balance. The holding position may also be depending on the weather condition, if wind still a first tree trunk may have a first gripping position but in a windy condition said first tree trunk may have s second gripping position. A holding position may be determined by a future operation such a debarking, cutting, delimbing and/or transportation etc.

The holding position may be altered during the handling of the ligno trunk. A first holding position may be during delimbing, a second holding position during debarking, a third holding position during cutting and a fourth holding position during transportation.

The holding position may also be chosen in order to minimize the damage to said tree trunk or other tree trunks.

The holding position and/or cutting position may also be dependent on surrounding parameters such as surrounding lignos, terrain etc.

The holding and/or cutting position may also be dependent on its forthcoming position in a pile of tree trunks. The holding position may also depend on removing a tree trunk from a pile of tree trunks onto a truck.

The holding and/or cutting position may also be real time adaptable by means of a camera. The holding position may take into account the movement of a ligno due to weather condition such as snow, wind etc.

The holding means (105) may be configured to move on ground and/or move up and/or down on a ligno trunk. The holding means is attachable to said UAV. The holding means may reach a predetermined ligno from ground or from air by a UAV. The holding means may be configured to climb the ligno trunk. The holding means may be attachable to a delimbing tool. The delimbing tool may have delimbed the ligno independently of the movement of said holding means. The holding means may be attachable to the UAV for transporting said at least a portion of the tree trunk away from its original location.

The holding means and/or cutting means may be one or a plurality of holding means. A plurality of holding means may be attachable to each other. A plurality of holding means may achieve a plurality of holding positions on one and the same ligno trunk or different ligno trunks. The plurality of holding means maybe connected to each other with a wire.

A coarse holding and/or cutting position may be made before reaching a predetermined ligno. The coarse holding and/or cutting position may be updated with a more accurate holding position while at or near the predetermined ligno by using a camera equipment. The more accurate holding/cutting position may be determined by a remote operator using the information form the camera equipment and/or automatically by using a library of prestored pictures of lignos together with holding positions using artificial intelligence (AI).

Holding may include any form of gripping, resting, loading and/or carrying at least a portion of a ligno trunk. Harvesting may be one or a plurality of sub-elements in a process of extracting at least a portion of a ligno from a particular land area or the full process chain of extracting at least a portion of a ligno from a particular area. Sub-elements may be delimbing, debarking, cutting, holding, detecting, transporting, reloading, storing, etc. Said sub-elements may take place at different points in time. A ligno trunk may be directly held by a means for holding by holding directly at said ligno trunk. A ligno trunk may be in-directly held by a means for holding by holding a twig and/or a branch of said ligno trunk. At least a portion of a ligno trunk may indirectly or directly be held by a UAV at least once before, during and/or after harvesting.

In various example embodiments of the present invention a cutting position may be selected a certain point in time, where said cutting position and/or said certain point in time is depending on tree parameters and or growing conditions of said ligno trunk or a ligno trunk within a predetermined area of said ligno trunk.

In various example embodiments of the present invention where said system may be directed to cut a certain point in time to direct a ligno to fall or not to fall in a certain direction depending on ligno parameters and/or growing conditions and/or on a certain point in time when said cut ligno trunk is transported away from its original location by said UAV. At least a portion of a ligno trunk may be cut and separated from the remainder of the ligno a certain point in time. Pick up may be made at a certain later point in time. In various example embodiments of the present invention said means for cutting may be configured to cut at said selected cutting positions a certain point in time. Said cutting position(s) and/or said a certain point in time may be depending on ligno parameter(s) and/or growing condition(s) on said cut ligno trunk or said ligno trunk within a predetermined distance from said cut ligno trunk. A ligno trunk may be directed to fell or not to fell in a certain direction a certain point in time depending on said selected cutting position and/or said cutting on said cutting position a certain point in time.

In various example embodiments selecting a cutting position and type of cut on a ligno trunk to be cut may depend on the type of ligno in order to allow said ligno trunk to fell in a predetermined direction. In various example embodiments a ligno trunk may be released and/or not to be released in a certain tree-felling direction a certain point in time. The at least one UAV may lift the tree during cutting. The UAV may force the ligno to fall in a predetermined direction by initiating a flying direction towards the desired falling direction while attached to said ligno trunk to be removed from the remainder of the ligno.

The system may further comprise means configured for directing during cutting, by means of cutting, holding, with or without UAV, wind and/or other external forces at least a portion of a ligno trunk to fall and/or not to fall in a certain direction. Said selected cutting position and/or said certain point in time may be depending on at least one detected ligno parameter and/or at least one detected growing condition of a ligno trunk. The system may further comprise means configured for directing said at least one remotely and/or autonomously controlled UAV with at least a portion of a ligno trunk to a final destination a certain point in time where said final destination and/or said certain point in time is depending on at least one detected ligno parameter and/or at least one detected growing condition of said transported portion of a ligno and/or of a remaining portion of a ligno and/or of at least one ligno grown within a predetermined distance from said transported portion of a ligno and/or at least one portion of a ligno at said final destination. A certain type of cut, direction, size, shape, location may be selected out of at least one ligno parameter and/or growing condition in order to allow said ligno trunk to fall in a predetermined direction. Said means for cutting may apply one or a plurality of partial cuts a certain point in time in order to allow a ligno trunk to be separated from the remainder of the ligno a cerain point in time.

A cutting position and/or the type of cut of a ligno trunk may be one parameter determining a falling direction of a ligno trunk. The falling direction may be within a predetermined angular interval for instance 0-180°, 20-160°, 40-120°, 60-100°. A cutting position and/or the type of cut of a ligno trunk may be one parameter determining a falling position of a cut ligno trunk away from its original location. A ligno trunk may be cut in order to fall onto a moving object or a stationary object such as a transport vehicle. The falling of a ligno trunk may be with a certain speed, spin, rotation or movement. The ligno trunk may glide, roll and/or blow towards a certain position. The ground may be a determining factor for the final position of a cut portion of a ligno trunk, e.g., slope, terrain and season may affect the final position.

A predetermined direction may involve simulation beforehand taking into account ligno parameters and growing conditions in order to predict and chose a cutting strategy fulfilling desired characteristics. A certain point in time may be within a predetermined time interval, after a predetermined time, before a predetermined time or at a specific time. A certain point in time may depend on other events, i.e., event B cannot start before event A has been finished or when after fulfilling one or several requiments in a harvesting or transporting chain or process, for instance reaching a ligno or a predetermined time. A specific choice of felling a ligno may be to reduce its total time, make as little damage to the nature, prohibiting the fell ligno to be an abstacle for animals, insects, traffic and/or water passage. Harvesting may be made for increasing the value of the remainder of the forest, not blocking infra structure, not damaging and/or blocking the harvesting tools, minimize safety issues, reduce damage of the surrounding lignos, ecosystem and/or infrastructure. Harvesting may also be performed for reducing damage of the harvested ligno such as cracks. A selected cutting position may determine the value of the removed/separated ligno trunk. The rotation speed of the cutting tool, the force and speed said cutting tool is forced towards said ligno trunk may determine the value of the separated ligno trunk. One or a plurality of UAV may during cutting force the ligno trunk to be separated from the ligno to fall in a predetermined direction. Said UAV may also assist in prohibiting said cutting tool to get stuck during cutting by lifting the ligno trunk to be removed/separated or to have a certain speed when cutting, or a certain cutting position, or at a certain point in time when the wind moves in the right direction. A holding position may be a certain enfolding size which may vary depending on the particular harvesting moment. Transportation may require a particular holding position whereas delimbing or cutting may require other holding positions. A cutting of a ligno trunk may be made at a certain point in time. A certain point in time may be a specific time during a day.A cutting of aligno trunk may be made with a particular force and speed in a particular direction while holding the ligno trunk to be removed with at least one holding means attachable to at least one UAV. The time for harvesting may be the actual cutting time for one or a plurality of ligno trunks. The time for harvesting may be the total time it takes to transport the means for cutting from a start position to a first ligno, cut said first ligno, transport said means for cutting to at least one other ligno, cut said other ligno and transport said means for cutting to a final destination.

Holding may include any form of gripping, resting, loading and/or carrying at least a portion of a ligno trunk. Harvesting may be one or a plurality of sub-elements in a process of extracting at least a portion of a ligno from a particular land area or the full process chain of extracting at least a portion of a ligno from a particular area. Sub-elements may be delimbing, debarking, cutting, holding, detecting, transporting, reloading, storing, etc. Said sub-elements may take place at different points in time. A ligno trunk may be directly held by a means for holding by holding directly at said ligno trunk. A ligno trunk may be indirectly held by a means for holding by holding a twig and/or a branch of said ligno trunk. At least a portion of a ligno trunk may indirectly or directly be held by a UAV at least once before, during and/or after harvesting. Said means for holding may hold said ligno trunk in a stationary position or said holding means may be configured to move up and/or down on said ligno trunk.

In various example embodiments of the present invention a cutting position may be selected a certain point in time, where said cutting position and/or said certain point in time is depending on ligno parameters and/or growing conditions of said at least a portion of a ligno trunk or a ligno trunk within a predetermined area of said ligno trunk.

In various example embodiments of the present invention where said system may be directed to cut a certain point in time to direct a ligno to fall or not to fall in a certain direction depending on ligno parameters and/or growing conditions and/or on a certain point in time when said cut ligno trunk is transported away from its original location by said UAV. At least a portion of a ligno trunk may be cut and separated from the remainder of the ligno a certain point in time. Pick up may be made at a certain later point in time. In various example embodiments of the present invention said means for cutting may be configured to cut at said selected cutting positions a certain point in time. Said cutting position(s) and/or said a certain point in time may be depending on ligno parameter(s) and/or growing condition(s) on said cut ligno trunk or said ligno trunk within a predetermined distance from said cut ligno trunk. A ligno trunk may be directed to fell or not to fell in a certain direction a certain point in time depending on said selected cutting position and/or said cutting on said cutting position a certain point in time. The cutting may be made with a certain speed through a ligno trunk. The speed may be the moving speed of the means for cutting. Alternatively said speed may be a rotational speed of a saw chain or saw blade.

In various example embodiments selecting a cutting position and type of cut on a ligno trunk to be cut may depend on the type of ligno in order to allow said ligno trunk to fell in a predetermined direction. In various example embodiments a ligno trunk may be released and/or not to be released in a certain tree-felling direction a certain point in time. The at least one UAV may lift the tree during cutting. The UAV may force the ligno to fall in a predetermined direction by initiating a flying direction towards the desired falling direction while attached to said ligno trunk to be removed from the remainder of the ligno.

The system may further comprise means configured for directing during cutting, by means of cutting, holding, with or without UAV, wind and/or other external forces at least a portion of a ligno trunk to fall and/or not to fall in a certain direction. Falling direction may depend on ligno parameters and/or growing conditions. Said selected cutting position, cutting through, speed through and/or said certain point in time may be depending on at least one detected ligno parameter and/or at least one detected growing condition of a ligno trunk.

During transporting, cutting and/or harvesting delimbing may take place a certain point in time. Delimbing may be performed for increasing or decreasing the internal tension of the ligno trunk which may be helpful in harvesting, transporting. Delimbing may be performed taking into account ligno parameters and/or growing conditions. The system may further comprise means configured for directing said at least one remotely and/or autonomously controlled UAV with at least a portion of a ligno trunk to a final destination a certain point in time where said final destination and/or said certain point in time is depending on at least one detected ligno parameter and/or at least one detected growing condition of said transported portion of a ligno and/or of a remaining portion of a ligno and/or of at least one ligno grown within a predetermined distance from said transported portion of a ligno and/or at least one portion of a ligno at said final destination. A certain type of cut, direction, size, shape, location may be selected out of at least one ligno parameter and/or growing condition in order to allow said ligno trunk to fall in a predetermined direction. Said means for cutting may apply one or a plurality of partial cuts a certain point in time in order to allow a ligno trunk to be separated from the remainder of the ligno a cerain point in time. A UAV may be configured to blow with at least one of its rotors forcing said ligno trunk to fall in a predetermined direction. Blowing direction may take into account ligno parameters and/or growing condition.

A cutting speed may be chosen so that the means for cutting will not get stuck during the cutting operation. An optimal cutting speed may vary depending on growing condition or ligno condition. The cutting speed may vary depending on the type of tree, diameter, inclination, weather condition or the like. The UAV may lift the ligno trunk while cutting to reduce or increase tension and/or pressure on the means for cutting and/or within a ligno trunk when cutting and/or harvesting and/or harvesting. Ligno parameter and/or growing condition may be used for determining a required lifting force and/or required number of drones for prohibiting said means for cutting to get stuck during cutting. A cutting position may be selected and/or said UAV and/or other external forces acting on said ligno to be cut in order to increase or decrease required cutting force and/or cutting speed. A falling process can start while cutting or when a tree is prepared to be cut by changing the pressure and /or tension within the tree trunk. A change in pressure and/or tension within the tree trunk during cutting or before cutting. Wind blowing from at least one rotor of at least one UAV may be used for pushing or pulling a particular portion of a ligno. At least one means for holding and/or at least one means for cutting may cut and/or hold taking at different position depending on ligno parameters and/or growing conditions. A certain point in time may depend on ligno parameters and/or growing conditions. A falling can also be a change in pressure and tension within the tree trunk.

A system and/or method for system (10) for remote and/or autonomous cutting, holding, harvesting, transporting etc., may be one or a plurality of systems and/or subsystems working together by sharing information and/or preparing a ligno for each other. A first system and a second system may be synchronized with each other. Said systems may perform different steps on different locations, in different manners and/or at different points in time. At least one system may perform at least one step with a land based (stationary or movable) device. Said land-based device may be a land-based vehicle or a robot. A first system may at a first point in time detect at least one ligno parameter and/or growing condition for at least one ligno. A second system may use at least one of said ligno parameter(s) and/or growing condition(s) detected by said first system at a second point in time. Said second point in time may be seconds, hours, days, months or years later. A first system may select at least a ligno to cut. A second system may use a selection data about lignos to be cut from said first system and perform said cutting with at least one means for cutting. Said cutting may be performed at a later time compared to said selection. A first system may select one or a plurality of lignos to be transported at a certain point in time. A second system may perform said transport by at least one means for transporting by using the information from said first system. A first system may select and/or detect a holding position of at least a portion of a ligno trunk and/or at least one cutting position of at least one ligno trunk. A second system performs said holding and/or cutting at said selected and/or detected cutting position by means of at least one means for holding at least a portion of a ligno trunk and/or at least one means for cutting at least a portion of a ligno trunk respectively. A first system may generate information at a first point in time to be used in another system at a second point in time.

Systems that work together may have several system owners and/or system manufacturer. One or several systems can contribute to a step. For instance, one system may detect a ligno and/or ligno parameters and another system may detect growing conditions. A system may have detected ligno parameters and/or growing conditions a number of years ago and saved the position in relation to said detected ligno parameters and/or growing conditions. This saved information may be used at a later point in time to predict ligno prameters. Growing conditions may be the same for several year but may dramatically change if a major part of a forest is cut. Information about growing condition may be saved in a data base and may be used later by one or a plurality of system as a base for one or a plurality of harvesting decisions.

Ligno parameters and/or growing conditions may last or evolve over time. A ligno having a ligno parameter A year X may be predicted to have a ligno parameter B year Y. Future ligno parameters may be predicted with a certain probability. Environment, such as terrain and climate may change slowly whereas ecosystem and ligno(s) evolve over time. Lignos may disappear. A system may perform a first moment which is dependent on a second moment having been performed by a second system.

A system may be a system of several system dependent or independent of each other. One or a plurality of sub-systems may go active or inactive while another system is performing a particular event. One system may be a master to the other system members (servants). One system may direct another system. One system may be a reserve system to another system. A detection by a first system may be a confirmation of a previous detection by a second system. A system may be a system of systems. A system may perform sub-elements in a chain of events. A first system may detect growing conditions and/or ligno parameters, a second system may detect the ligno to be harvested, and a third system may direct the means for cutting to a particular ligno. A system may act on lack on information from another system. A system may change the number of sub-system members over time due to various labour intense process steps. It may be advantageous to use only relevant subsystems for a particular task, i.e., one or a plurality of subsystems may be inactive. This may save battery time and/or process speed.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

In various example embodiments it is provided a system (10) for remote and/or autonomous harvesting at least a portion of a tree, said system (10) comprising:
 a first remotely and/or autonomously controlled Unmanned Aerial Vehicle (100), UAV, comprising, at least one means for holding (105) said harvested portion of said tree and being configured for transporting said harvested portion of said tree away from the original location of the tree, and
 a second remotely and/or autonomously controlled Unmanned Aerial Vehicle (100), UAV, comprising, at least one means for harvesting at least a portion of a tree,
 at least one means for detecting said tree to be harvested,
 a base station (120) for communication with said first and/or second UAV.
Said means for detecting said tree to be harvested may be arranged on said first UAV, said second UAV and/or a third UAV and/or a remotely and/or autonomously controlled land-based vehicle. Said third UAV and/or said autonomously controlled land-based vehicle may be in direct communication with said base station and/or indirect communication with said base station. Indirect communication may be via said first and/or said second UAV.

In various example embodiments it is provided a system (10) for remote and/or autonomous selecting at least a portion of a ligno to be cut, said system (10) comprising:
 a remotely and/or autonomously controlled Unmanned Aerial Vehicle (100), UAV, comprising, at least one means for cutting said at least a portion of a ligno,
 means for detecting said at least a portion of a ligno to be cut,
 means for detecting at least one ligno parameter of at least a portion of a ligno and/or at least one growing condition of at least a portion of a ligno,
 a base station (120) for communication with said UAV, and
 means configured for selecting at least a portion of a ligno to be cut depending on at least one detected ligno parameter and/or at least one detected growing condition of said cut ligno and/or of a remaining portion of a ligno and/or of at least one ligno grown within a predetermined distance from said cut ligno.

Harvesting may mean felling of ligno and preparing them for transport away from its original location. Harvesting may include both thinning and clearfelling operations. Harvesting may be made depending on current demand for a particular tree parameter. Harvesting may be made depending on current available storage capacity. Harvesting may be made depending on season/temperature for maximizing a particular tree parameter. Harvesting may be made for maximizing the quality/growth potential of the remaining ligno in a particular area. Harvesting may also be made for maintaining a forest having a diverse age. Harvesting may also be made for maintaining a forest of a particular species, age and/or composition. Harvesting may be made for maintaining cultural and/or aesthetic values.

For instance, the disclosed system may also transport already harvested ligno or portions of ligno laying on ground. A plurality of UAV may be used for removing a plurality of ligno laying on ground to a final destination. A plurality of UAV working together in synchronism may take one or a plurality of ligno or portions of ligno at the same time. The selection of ligno to be transported may be made depending on the total weight of the ligno or portions of ligno to be transported. The plurality of UAV may have a maximum load capacity and maximum range capacity. Ligno or portions of ligno may be selected depending on their location, weight, time and the current state of the UAV, i.e., remaining charge and/or fuel. Harvesting may include all steps from locating a ligno to fell to transportation of said ligno trunk to a final customer. Harvesting may mean any single step in a harvesting procedure such as cutting, delimbing, debarking, holding, transportation, identification etc. Harvesting may mean removing at least a portion if a ligno trunk and transporting it for further use at another location, which another location typically is an end user far away from the original location of the ligno trunk. Harvesting may be made by multiple tools. I first tool may be a debarking tool, a second tool may be a delimbing tool and a third tool may be a cutting tool. Said tools may be arranged on the ligno trunk simultaneously or separately with a predetermined time interval.

The means for cutting may be released form an UAV onto a ligno trunk which is not to be harvested. Said means for cutting may move downwards on said ligno trunk and move to a particular tree on ground to be cut. In various example embodiments the means for cutting may be released on a first ligno trunk not to be harvested. Said means for cutting may move directly from said first ligno trunk to a second ligno trunk, i.e., without any ground transportation.

In various example embodiments of the present invention at least a portion of a ligno is removed and left on ground. Said portion can be anything from a branch, a top section to a full ligno. Full ligno may be removed without being taken care of, a so-called scrap ligno. A scrap ligno may have a relatively low value in comparison with other surrounding trees and/or for letting the remaining ligno in a particular area to obtain the best possible growing conditions.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps. Ligno is the generic term for any bush or tree.

The invention claimed is:

1. A system (10) for at least one of remote or autonomous holding at least one of: at least a portion of a harvested tree trunk, at least a portion of a tree trunk selected for harvesting, at least a portion of a tree trunk during harvesting, or at least a portion of a tree trunk at least one of before, during or after transporting said at least a portion of a tree trunk, said system (10) comprising:
   at least one of a remotely or an autonomously controlled Unmanned Aerial Vehicle (100), UAV,
   at least one means for holding (105) at least one of: directly or indirectly onto at least a portion of a tree trunk attachable to or integrated with said UAV,
   at least one means for detecting at least a portion of a tree,
   at least one means for detecting at least one of at least one tree parameter of at least a portion of a tree or at least one growing condition of at least a portion of a tree,
   at least one base station (120) for communication with said UAV,
   at least one means configured for directing said at least one means for holding onto at least a portion of a tree trunk, where said holding is directly or indirectly onto at least a portion of a tree trunk, to a particular position of at least a portion of a tree trunk depending on at least one of said at least one detected tree parameter and/or said at least one detected growing condition of a tree, and
   at least one means configured for directing at least a portion of a tree trunk to a particular position, where said particular position is directly or indirectly onto said at least one means for holding, depending on said at least one of said at least one detected tree parameter or said at least one detected growing condition of a tree, wherein at least one of: said at least one means for holding is configured to be transported by said at least one UAV to said at least a portion of a tree trunk to be held by said at least one means for holding or is transported by said at least one UAV away from said at least a portion of a tree trunk held by said means for holding, or said at least one means for holding is attached to said at least one UAV at least once when holding during transporting or harvesting said tree trunk.

2. The system according to claim 1, wherein said at least one means configured for directing said at least one means for holding or said at least one means configured for directing at least a portion of a tree trunk is at least one of remotely or autonomously controlled.

3. The system according to claim 1, wherein said system further comprising at least one means for delimbing, at least one means for debarking, at least one means for cutting, or at least one means for harvesting.

4. The system according to claim 1, wherein said at least one remotely or autonomously controlled means for holding (105) indirectly or directly at least a portion of tree trunk is configured to at least one of: move directly or indirectly on ground, or move directly or indirectly up or down on a tree ligne trunk, or configured to move directly or indirectly from one tree to another tree.

5. The system according to claim 1, wherein said means for detecting said at least one tree parameter or at least one growing condition comprising a camera or using a database with digital information about at least one of said at least a portion of a tree or a tree within a predetermined distance from said at least a portion of a tree.

6. The system according to claim 1, wherein said UAV and said means configured for holding directly or indirectly at least a portion of a tree trunk is communicating with each other via one or more of Wifi, Bluetooth, radio communication, optical fibre, or electrical wire.

7. The system according to claim 1, further comprising means configured to at least one of automatically detect a final destination, locate a tree in a predetermined area, or locate a tree at a final destination.

8. The system according to claim 7, wherein said means configured for automatically locating a tree in a predetermined area comprise at least a Global Navigation Satellite System, GNSS or a digital transmitter configured to be attached to a tree and to communicate with the UAV.

9. The system according to claim 1, further comprising a synchronization unit for synchronizing the movement of at least two UAV for at least one of cutting, holding, delimbing, harvesting, or debarking said at least a portion of a tree trunk.

10. The system according to claim 1, further comprising means for determining the number of UAV used together for at least one of transporting, cutting, delimbing, harvesting, debarking or holding said at least a portion of a tree trunk depending on at least one of: at least one tree parameter or the distance between an original location of said at least a portion of a tree trunk to a final destination.

11. The system according to claim 1, further comprising means configured for selecting at least a portion of a tree trunk identified for transporting, cut, held, delimbed, harvested or debarked depending on at least one of: at least one detected tree parameter, or at least one detected growing condition of said tree trunk identified for transporting, or another portion of a tree from which said tree trunk originates, or at least one tree grown within a predetermined distance from said tree trunk identified for transporting, or a tree at said final destination.

12. The system according to claim 1, further comprising means configured for selecting at least one cutting position on at least a portion of a tree trunk depending on at least one of the at least one detected tree parameter or the at least one detected growing condition of at least a portion of a tree.

13. The system according to claim 1, further comprising means configured for directing said at least one remotely or autonomously controlled UAV with at least a portion of a tree trunk to a final destination a certain point in time where said final destination or said certain point in time is depending on at least one of: at least one detected tree parameter, or at least one detected growing condition of said transported portion of a tree, a remaining portion of a tree, at least one tree grown within a predetermined distance from said transported portion of a tree.

14. The system according to claim 1, further comprising means configured for selecting at least a portion of a tree trunk selected for harvesting or transported depending on at least one of: at least one detected tree parameter, at least one detected growing condition of said harvested or transported portion of a tree trunk, a remaining portion of a tree trunk, or at least one tree grown within a predetermined distance from said transported or harvested portion of a tree trunk.

15. A method for remotely or autonomously holding during, before, or after harvesting at least a portion of a tree trunk or holding at least a portion of a tree trunk during, before, or after transporting said at least a portion of a tree trunk, said method comprising the steps of:
controlling remotely or autonomously at least one Unmanned Aerial Vehicle, UAV,
identifying said at least a portion of a tree trunk for holding thereof,
operating at least one means for directly or indirectly holding said at least a portion of a tree trunk, where said at least one means for directly or indirectly holding said at least a portion of a tree trunk is integrated with or attachable to said at least one UAV, and
detecting at least one tree parameter of at least one of: said at least a portion of a tree trunk, at least one growing condition of said at least a portion of a tree trunk, at least one tree parameter, at least one growing condition of at least one tree grown within a predetermined distance from said at least a portion of a tree trunk, at least one tree parameter, at least a growing condition of a another portion of a tree from which said tree trunk originates, wherein a direct or indirect holding position of said at least a portion of a tree trunk is depending on at least one of: at least one tree parameter of said at least a portion of a tree trunk, at least one growing condition of said at least a portion of a tree trunk, at least one tree parameter, at least one growing condition of at least one tree grown within a predetermined distance from said at least a portion of a tree trunk, on at least one tree parameter, at least a growing condition of a another portion of a tree from which said tree trunk originates, wherein said means for holding is attached to said at least one UAV at least once when holding during transporting or harvesting said tree trunk.

16. The method according to claim 15, further comprising the step of determining the number of UAV used together for transporting said at least a portion of a tree trunk depending on at least one of: said at least one detected tree parameter, said at least one detected growing condition, or the distance between the original position of said at least a portion of a tree trunk and a final destination of said at least a portion of a tree trunk.

17. The method according to claim 15, further comprising the step of setting up a communication link between said UAV and said means for holding said at least a portion of a tree trunk via one or more of WiFi, Bluetooth, radio communication, tele communication, optical fibre, or electrical wire.

18. The method according to claim 15, further comprising the step of identifying a first predetermined area within which a tree trunk is to be held by means of a GNSS-system by means of at least one of a camera or at least one optical sensor.

19. The method according to claim 15, further comprising the step of synchronizing a movement of at least two UAV for transportation of said at least a portion of a tree trunk away from the original location of the tree trunk to a final destination.

20. The method according to claim 15, wherein the detection of said at least one tree parameter or said at least one growing condition is performed by means of a camera or using a database with digital information of tree in a predetermined area.

21. The method according to claim 15, further comprising the step of selecting said at least a portion of a tree selected for harvesting or transported depending on at least one of: at least one detected tree parameter, at least one detected growing condition of said harvested or transported portion of a tree, a remaining portion of a tree, at least one tree grown within a predetermined distance from said transported or harvested portion of a tree, or at least one tree at a final destination for said harvested or transported tree.

22. The method according to claim 15, further comprising the step of selecting a cutting position of a tree trunk of said at least a portion of a harvested tree trunk, at least a portion of a tree trunk selected for harvesting, at least a portion of a tree trunk during harvesting or at least a portion of a tree trunk during transporting depending on at least one of: at least one detected tree parameter, at least one detected growing condition of said harvested portion of a tree trunk, a remaining portion of a tree trunk, at least one tree grown within a predetermined distance from said harvested portion of a tree, or at least one tree at a final destination for said harvested or transported tree.

23. The method according to claim 15, further comprising the step of transporting said at least a portion of a tree trunk, by said at least one UAV, away from the original location of said at least a portion of a tree trunk to a final destination a certain point in time, where said final destination or said certain point in time is depending on at least one of: said at least one detected tree parameter, said at least one detected growing condition of said at least a portion of a tree trunk, a remaining portion of a tree trunk, at least one tree grown within a predetermined distance from said at least a portion of a tree trunk, or at least one tree at a final destination for said harvested or transported tree.

24. The method according to claim 15, wherein said at least one means for holding or said means for detecting at least a portion of a tree or at least one means for detecting at least one tree parameter of at least a portion of a tree or at least one growing condition of at least a portion of a tree is remotely or autonomously controlled.

25. An Unmanned Aerial Vehicle, UAV, configured to be used in a system according to claim 1.

26. The UAV according to claim 25, further comprising a synchronization unit for synchronizing the movement of at least two UAV.

27. At least one means configured for holding at least a portion of a tree trunk and configured to be used in a system according to claim 1.

* * * * *